US012367771B2

(12) United States Patent
Quirynen et al.

(10) Patent No.: US 12,367,771 B2
(45) Date of Patent: Jul. 22, 2025

(54) HIERARCHICAL OPTIMIZATION-BASED COORDINATED CONTROL OF TRAFFIC RULES AND MIXED TRAFFIC IN MULTI-INTERSECTION ENVIRONMENTS

(71) Applicant: Mitsubishi Electric Research Laboratories, Inc., Cambridge, MA (US)

(72) Inventors: Rien Quirynen, Cambridge, MA (US); Nilesh Suriyarachchi, College Park, MD (US); Stefano Di Cairano, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 158 days.

(21) Appl. No.: 18/180,888

(22) Filed: Mar. 9, 2023

(65) Prior Publication Data

US 2024/0331535 A1 Oct. 3, 2024

(51) Int. Cl.
*G08G 1/16* (2006.01)
*G08G 1/01* (2006.01)
(Continued)

(52) U.S. Cl.
CPC ........... *G08G 1/164* (2013.01); *G08G 1/0112* (2013.01); *G08G 1/0116* (2013.01);
(Continued)

(58) Field of Classification Search
CPC .... G08G 1/164; G08G 1/0112; G08G 1/0116; G08G 1/0129; G08G 1/0133;
(Continued)

(56) References Cited

U.S. PATENT DOCUMENTS 9,129,519 B2 * 9/2015 Aoude ..................... G08G 1/00
10,235,882 B1 * 3/2019 Aoude ................... G08G 1/164
(Continued)

FOREIGN PATENT DOCUMENTS

CN 111738474 A * 10/2020 ............. G06Q 10/04
EP 3594920 A1 * 1/2020 ........... G08G 1/0133

OTHER PUBLICATIONS

Translation of CN-111738474-A, 20 pages (Year: 2020).*

*Primary Examiner* — Dale W Hilgendorf
(74) *Attorney, Agent, or Firm* — Gene Vinokur

(57) ABSTRACT

The present disclosure provides a system and a method for jointly controlling one or multiple connected and automated vehicles (CAVs) and one or multiple human-driven vehicles (HDVs) subject to integer constraints for crossing each of multiple intersections on a road. The method comprises collecting digital representation of states of each of the CAVs, HDVs, and traffic signs, solving an optimization problem jointly optimizing traffic flows based on a macroscopic traffic flow model in a centralized traffic controller (CTC) subject to convex relaxation of the integer constraints, solving a multi-variable mixed-integer programming (MIP) problem in each of multiple intersection traffic controllers (ITCs) optimizing a cost function and minimizing tracking errors in traffic flow values of a microscopic traffic flow model with respect to relaxed traffic flow values from the CTC, and transmitting the optimized values of the control commands to the corresponding CAVs and corresponding traffic signs.

22 Claims, 35 Drawing Sheets

(51) Int. Cl.
*G08G 1/081* (2006.01)
*G08G 1/09* (2006.01)

(52) U.S. Cl.
CPC ......... *G08G 1/0129* (2013.01); *G08G 1/0133* (2013.01); *G08G 1/0145* (2013.01); *G08G 1/081* (2013.01); *G08G 1/091* (2013.01); *G08G 1/166* (2013.01)

(58) Field of Classification Search
CPC ...... G08G 1/0145; G08G 1/081; G08G 1/091; G08G 1/166
See application file for complete search history.

(56) References Cited

U.S. PATENT DOCUMENTS

| | | | | | |
|---|---|---|---|---|---|
| 10,810,883 | B1 * | 10/2020 | Rander | G01C 21/3691 | |
| 11,443,631 | B2 * | 9/2022 | Manohar | G08G 1/096758 | |
| 11,981,351 | B2 * | 5/2024 | Qi | G08G 1/163 | |
| 2017/0320481 | A1 * | 11/2017 | Johannesson Mardh | B60L 58/12 | |
| 2018/0343176 | A1 * | 11/2018 | Hui | H04L 41/0823 | |
| 2019/0012909 | A1 * | 1/2019 | Mintz | G06Q 30/0206 | |
| 2019/0318620 | A1 * | 10/2019 | Yang | G08G 1/0133 | |
| 2020/0234582 | A1 * | 7/2020 | Mintz | G08G 1/096811 | |
| 2023/0316920 | A1 * | 10/2023 | Di Cairano | B60W 30/18159 | 701/26 |
| 2024/0308506 | A1 * | 9/2024 | Quirynen | B60W 30/14 | |
| 2024/0371264 | A1 * | 11/2024 | Budan | G06N 3/04 | |

* cited by examiner

800B

| | TL State 1 (821) | TL State 2 (822) | TL State 3 (823) | TL State 4 (824) | TL State 5 (825) | TL State 6 (826) | TL State 7 (827) | TL State 8 (828) | TL State 9 (829) |
|---|---|---|---|---|---|---|---|---|---|
| 801 $d_1$ | Red | Red | Green | Green | Red | Green | Red | Red | Green |
| 802 $d_2$ | Red | Red | Red | Green | Red | Red | Red | Red | Green |
| 803 $d_3$ | Red | Red | Red | Red | Green | Red | Red | Red | Green |
| 804 $d_4$ | Red | Green | Red | Red | Green | Red | Green | Red | Green |
| 805 $d_5$ | Red | Green | Red | Red | Red | Red | Green | Red | Red |
| 806 $d_6$ | Red | Red | Green | Red | Red | Red | Green | Red | Red |
| 807 $d_7$ | Red | Red | Green | Green | Red | Red | Green | Green | Red |
| 808 $d_8$ | Red | Red | Red | Green | Red | Red | Red | Green | Red |
| 809 $d_9$ | Red | Red | Red | Red | Green | Red | Red | Green | Red |
| 810 $d_{10}$ | Red | Green | Red | Red | Green | Green | Red | Green | Red |
| 811 $d_{11}$ | Red | Green | Red | Red | Red | Green | Red | Red | Red |
| 812 $d_{12}$ | Red | Red | Green | Red | Red | Green | Red | Red | Red |

Traffic light states and mapping to values for each of the crossing directions

830

FIG. 8B

800C

840

841 842 843 844

| | Time step 1 | Time step 2 | Time step 3 | Time step 4 | ... |
|---|---|---|---|---|---|
| $d_1$ | 2.3 | 1.1 | 0.3 | 0 | |
| $d_2$ | 1.0 | 1.5 | 1.2 | 0 | |
| $d_3$ | 0.7 | 1.4 | 0 | 0 | |
| $d_4$ | 0 | 0 | 0 | 0 | |
| $d_5$ | 0 | 0 | 0 | 0 | |
| $d_6$ | 0 | 0 | 0 | 0 | |
| $d_7$ | 0 | 0 | 0.8 | 1.1 | |
| $d_8$ | 0 | 0 | 1.7 | 2.3 | |
| $d_9$ | 0 | 0 | 0 | 0.6 | |
| $d_{10}$ | 0 | 0 | 0 | 0 | |
| $d_{11}$ | 0 | 0 | 0 | 0 | |
| $d_{12}$ | 0 | 0 | 0 | 0 | |

Relaxed traffic flow values for each of the crossing directions

FIG. 8C

| | Time Step 1 | Time Step 2 | Time Step 3 | Time Step 4 | |
|---|---|---|---|---|---|
| $s_{k,1}$ | 4 | 4 | 4 | 3.3 | |
| $s_{k,2}$ | 6 | 5 | 4.4 | 3.7 | |
| $s_{k,3}$ | 5 | 4.5 | 4 | 4 | |

Vehicle density values for road segment $k$ in each direction

1000C

1000D

1040

| | Time Step 1 (1055) | Time Step 2 (1056) | Time Step 3 (1057) | |
|---|---|---|---|---|
| 1041 $d_1$ | 2.3 | 1 | 0 | |
| 1042 $d_2$ | 1.7 | 0 | 0 | |
| 1043 $d_3$ | 0 | 0 | 0 | |
| 1044 $d_4$ | 0 | 0.5 | 0.5 | |
| 1045 $d_5$ | 0 | 2.5 | 2 | |
| 1046 $d_6$ | 0 | 0 | 1.5 | |

Traffic flow values for all crossing directions in intersection $j$

FIG. 10D

1000F

1020

| | | 1035 | 1036 | 1037 | 1038 | |
|---|---|---|---|---|---|---|
| | | Time Step 1 | Time Step 2 | Time Step 3 | Time Step 4 | |
| 1021 | $s_1$ | 8 | 5.7 | 4.7 | 4.7 | |
| 1022 | $s_2$ | 4 | 2.3 | 2.3 | 2.3 | |
| 1023 | $s_3$ | 0 | 0 | 0 | 0.75 | |
| 1024 | $s_4$ | 0 | 0 | 0 | 0.75 | |
| 1025 | $s_5$ | 0 | 0 | 0 | 0 | |
| 1026 | $s_6$ | 1 | 1 | 0.5 | 0 | |
| 1027 | $s_7$ | 2 | 2.85 | 4.1 | 5.1 | |
| 1028 | $s_8$ | 3 | 3.85 | 5.1 | 6.1 | |
| 1029 | $s_9$ | 8 | 8 | 5.5 | 3.5 | |
| 1030 | $s_{10}$ | 7 | 7 | 7 | 5.5 | |
| 1031 | $s_{11}$ | 4 | 5.15 | 5.9 | 6.15 | |
| 1032 | $s_{12}$ | 2 | 3.15 | 3.9 | 4.15 | |

FIG. 10F

HIERARCHICAL OPTIMIZATION-BASED COORDINATED CONTROL OF TRAFFIC RULES AND MIXED TRAFFIC IN MULTI-INTERSECTION ENVIRONMENTS

TECHNICAL FIELD

The present disclosure relates generally to optimization-based control, and more particularly to methods and apparatus of hierarchical optimization-based coordinated control of dynamic traffic rules and mixed traffic in a transportation network of multiple interconnected traffic intersections.

BACKGROUND

Automated transportation systems, even in the case of partial automation, lead to reduced road accidents and more efficient usage of a road network. Therefore, connected and automated vehicles (CAVs) show large promises for improving safety and traffic flow, and as a consequence for reducing congestion, travel time, emissions and energy consumption. While this has been known for decades, most of the successful developments have been accomplished in recent years due to the technological advances in sensing, computing, control and connectivity. While the on-road scenarios often are highly dynamic, i.e., the vehicle participants and their behavior changes rapidly and significantly, vehicle-to-vehicle (V2V) and vehicle-to-infrastructure (V2I) communication, also known as vehicle-to-everything (V2X) communication for short, enables efficient planning and decision making by providing access to real-time information on all the vehicles in a certain planning area.

Significant progress has been made in planning and control for automated driving, which typically involves a multi-layer guidance and control architecture implemented on-board. At the highest level, an intelligent navigation system finds a route through the transportation network from the current vehicle position to the requested destination. A decision maker selects the appropriate driving behavior at any point of time, given the route plan, the current environment condition, and the behavior of the other traffic participants, e.g., using automata combined with set reachability or formal languages and optimization. Given the target behavior, including lane following, lane changing or stopping, a motion planning algorithm computes a dynamically feasible and safe trajectory that may be tracked in real-time by a low-level feedback controller. A popular approach uses the combination of a sampling-based motion planner and model predictive control (MPC) for reference tracking. For CAVs, the guidance and control architecture may look similar to that for standard automated driving, but some of the modules may be implemented in the infrastructure, e.g., in mobile edge computers (MECs) and provide decisions to multiple vehicles in the area, while other modules may still be implemented on board of each vehicle individually.

Coordination of cooperative agents allows to reach a socially optimal behavior for the transportation network. One example describes a first come, first serve (FCFS) policy for autonomous traffic management at intersections. More recently, coordination strategies for intersection control have been proposed using nonlinear optimization or using mixed-integer linear programming (MILP). The latter has been extended to a distributed MILP algorithm for scheduling a grid of interconnected intersections. In addition, a MILP-based approach for on-ramp merging of CAVs was proposed. Alternative techniques for coordination of CAVs may be found in the references below, where it may be also noted that the intersection and merging control problems are very similar in nature.

For specific areas, for example, such as parking lots and shipping yards, specific urban networks, automated highways, or industrial complexes, the operation of CAVs may be coordinated from a central infrastructure computer, such as an edge-computer or a cloud computer, to achieve optimization of the overall transportation network, such as minimizing the average or worst-case travel time, the overall idling time, etc. Such central coordination system is hereafter referred to as central traffic coordinator (CTC). In some cases, only autonomous driving vehicles may be present on the road, which means that the CTC has direct control of all the vehicles in the network.

However, in most scenarios, it is reasonable to expect that for many years, possibly even indefinitely, autonomous vehicles will share the road with conventional, i.e., human driven vehicles (HDVs). Hence, guaranteeing a proper interaction of automated vehicles with manual vehicles will be of paramount importance to optimize the traffic behavior of the entire transportation network. In these cases, the CTC may only directly control the CAVs, while assuming a specific behavior for the HDVs. In some approaches, the HDVs are always given priority as nothing could change their behavior, and the CAVs would always adjust their operation to the expected behavior of HDVs. However, that solution is inherently suboptimal because only partial control of the vehicles in the scenario is possible.

In other scenarios with only HDVs, the traffic flow of HDVs is controlled through controllable road infrastructure elements, such as traffic lights. The flow of HDVs is affected by the timing and sequencing of the traffic lights so that the overall operation of the transportation network is positively affected. However, in such models, the vehicles are driven by a human driver so that the control impact on the vehicle is only to make it stop at certain locations at specific times. Thus, the control of only traffic lights yields limited control over the transportation network. To address this problem, a central coordination system and method are used to coordinate the operation of the CAVs and controllable infrastructure elements capable of impacting HDV traffic, such as traffic lights, are used to achieve the overall optimization of the transportation network with mixed CAVs and HDVs along with multiple connected traffic intersections. However, the resulting centralized optimization problem is a large-scale mixed-integer programming (MIP) problem that is computationally difficult to solve in real time.

Thus, there is a need to consider hierarchical optimization-based systems and methods that are computationally tractable and coordinate real-time operation of the CAVs and controllable infrastructure elements capable of impacting HDV traffic, such as traffic lights, by solving one or multiple decoupled optimization problems to achieve the overall optimization of the transportation network with mixed CAVs and HDVs and including multiple connected traffic intersections.

SUMMARY

Some embodiments are based on realization that a solution for overall optimization of the transportation network with mixed traffic is required, which is computational tractable and of high computational performance than previous solutions as described above.

It is an object of some embodiments to provide a hierarchical optimization-based system and method for the joint coordination and control of dynamic traffic rules and mixed traffic, including connected and automated vehicles (CAVs) and human driven vehicles (HDVs), in a transportation network of multiple connected traffic intersections. In some embodiments of the disclosure, the hierarchical system computes dynamic traffic rules that affect HDVs over a prediction horizon by means of controllable infrastructure elements referred to herein as traffic signs. Examples of the traffic signs include traffic light signals, electronic lane enabling displays, and variable speed limits. In some embodiments of the disclosure, the hierarchical system computes a sequence of velocity targets over a prediction horizon for each of the CAVs in the traffic transportation network, and these target trajectories may be executed by an on-board planning and control architecture for each of the CAVs.

Some embodiments are based on the recognition that both computational tractability and high control performance is achieved for the hierarchical optimization-based system and method, by dividing the problem into a high-level global central traffic controller (CTC), using a simplified macroscopic traffic model, and into a set of low-level locally decoupled intersection traffic controllers (ITCs) based on a more accurate microscopic traffic model. Some embodiments of the disclosure are based on the realization that the global CTC optimization problem is computationally tractable due to the simplified macroscopic traffic model, and each of the local ITC optimization problems is computationally tractable due to a restriction of the decision variables to vehicles in a local neighborhood around one particular traffic intersection in the transportation network. At each control time step, the global CTC controller computes high-level targets for the traffic flow in the multi-intersection network. Based on the global CTC targets, at each control time step, the local ITCs independently compute safe and optimal control trajectories for one or multiple dynamic traffic rules and for one or multiple CAVs within a neighborhood around each of the traffic intersections in the transportation network.

In an embodiment, the hierarchical system is based on a multi-layer guidance and control architecture, in which some modules are implemented on board of each CAV and other modules operate as centralized or decentralized in the infrastructure of the transportation network, e.g., in a mobile edge computer, in order to exploit V2X connectivity. Specifically, in each CAV, given a target behavior representative of actions such as lane following, lane changing or stopping, a motion planning algorithm computes a dynamically feasible and safe trajectory that may be tracked in real-time by a vehicle controller of a corresponding CAV. Some embodiments are based on a probabilistic sampling-based motion planner, and an MPC algorithm for reference tracking, in each CAV.

Some embodiments are based on the realization that, depending on the infrastructure of the transportation network, obtaining a precise prediction for the HDVs may prove challenging. Accordingly, in some embodiments, a hierarchical vehicle coordination and scheduling module is implemented in a receding horizon fashion based on the most recent information. Some embodiments are based on the realization that the CTC controller may compute high-level targets over a medium-or long prediction horizon at a relatively low frequency, while the ITC controllers may compute control trajectories over a short or medium prediction horizon at a relatively higher frequency, for example, using an update period of 0.5-1 second for each of the ITC controllers versus an update period of 1-2 seconds for the global CTC controller. Any discrepancies in the predictions may be adjusted by the intrinsic feedback mechanism of the receding horizon strategy for the coordination system.

Some embodiments are based on the realization that the presence of other traffic participants, e.g., including bicycles and pedestrians, may be managed as obstacles by on-board modules in the multi-layer guidance and control architecture for each CAV, e.g., the motion planning and/or the vehicle control algorithm. Due to their relatively smaller computational cost, compared to that for the hierarchical vehicle coordination system, the motion planning and vehicle control algorithms may be run at a relatively fast sampling rate in order to have a fast reaction time to unexpected changes in the behavior of the other traffic participants, e.g., including bicycles, pedestrians and other vehicles in the transportation network. For example, vehicle control algorithms are often executed with an update period of 50-100 milliseconds.

In some embodiments, the global CTC controller solves a medium or long horizon optimization problem that computes high-level targets for the traffic flow in the multi-intersection network, based on a simplified macroscopic traffic model for the network of connected intersections. In some embodiments, the high-level targets for each of the traffic intersections correspond to a percentage of the traffic intersection's capacity that should be assigned to each of the traffic directions in which vehicles may pass through the traffic intersection. In this case, the high-level targets may be either a time-varying sequence of percentage values or a constant set of average percentage values over the prediction horizon. These high-level targets may be used to prioritize traffic flow in particular directions through the one or multiple connected traffic intersections, in order to reduce the overall congestion, travel time, emissions and energy consumption for vehicles in the transportation network.

In some embodiments, the simplified macroscopic traffic model may be based on a representation of the transportation network as a directed graph, for example, in which each road segment is represented as a node and each traffic direction is represented as an edge in the directed graph. The state for the macroscopic traffic model may include the number of vehicles that are planning to drive straight, turn left or turn right in each of the road segments represented as nodes in the directed graph. The inputs for the macroscopic traffic model may include the number of vehicles that are transitioning from one road segment to a next, given the directed graph, given the maximum capacity of each traffic intersection, and given time delay constraints that enforce the expected travel time of vehicles in each of the road segments. In other embodiments, the simplified macroscopic traffic model may be based on a cell transmission model (CTM).

In some embodiments, the optimization problem of the global CTC controller is a convex optimization problem for which a globally optimal solution may be computed at each time step of the global CTC controller. For example, the CTC controller may use a linear traffic flow model, linear inequality constraints and a linear objective function, resulting in a convex linear programming (LP) problem that may be solved using an LP optimization algorithm, e.g., a simplex method, active-set method or interior point method. In some embodiments, the optimization problem of the global CTC controller is a non-convex smooth nonlinear programming (NLP) or a mixed-integer programming (MIP) optimization problem for which a locally optimal or suboptimal solution may be computed at each time step of the global CTC controller.

In some embodiments, each of the ITC controllers solves a short or medium horizon optimization problem that computes a sequence of velocity targets and lane change commands for each of the CAVs, and a sequence of commands for one or multiple dynamic traffic rules, e.g., traffic light signals, within a neighborhood of the traffic intersection. The resulting optimization problem is an MIP, e.g., a mixed-integer linear programming (MILP) or mixed-integer quadratic programming (MIQP) problem. Some embodiments of the disclosure are based on the realization that each of the ITC controller solves an MIP based on a microscopic traffic model that includes the prediction and control for each of the vehicles and dynamic traffic rules within the transportation network.

In an example, the microscopic traffic model includes a prediction for the motion of each of the CAVs based on a controlled discrete-time system subject to constraints. The constraints include the physical limitation of the CAVs in terms of acceleration, velocity, lane changing and steering, obstacle avoidance constraints and traffic rules that the CAVs need to satisfy. The traffic rules may be represented as mixed-logical inequality constraints in the MIP. For example, these traffic rules may enforce that a CAV may enter a traffic intersection in a particular direction only if the corresponding traffic light signal is green at that time step. The MIP objective involves the maximization of traffic throughput, while minimizing a combination of waiting time and fuel consumption.

In some embodiments, the microscopic traffic model includes a prediction for the behavior of HDVs using a switched dynamical system to represent reactions of HDVs to the, possibly changing, traffic rules. In an example, state-dependent switched dynamics may include: (1) HDV stops at a traffic light of a particular intersection, if the traffic light for the HDV's desired traffic direction is red and the HDV is within a predetermined distance from a stopping zone of the intersection. (2) Otherwise, HDV follows a leading vehicle and maintains a safe following distance, if the leading vehicle is within a particular predetermined distance in front of the HDV in the transportation network. (3) Otherwise, HDV travels at a desired target speed in the network.

In some embodiments, HDV modeling may be used to model both HDVs and CAVs that are controlled by a different ITC. To that end, each CAV may be assigned to a particular ITC for either control or for prediction only. This technique is used to increase safety of the traffic controller, especially when vehicles transition from one ITC to the next. In some embodiments, assignment of vehicles to each of the ITC controllers may be performed, but not limited to, the given steps: (1) Each HDV is assigned to their next traffic intersection's ITC for prediction, if it is within a predetermined distance.

(2) Each CAV is assigned to their next traffic intersection's ITC for control, if it is within a predetermined distance.

(3) Each CAV is assigned to their previous traffic intersection's ITC for prediction, i.e., it will be treated as HDV by that ITC controller, if it is within a predetermined distance.

In some embodiments of the disclosure, each ITC computes CAV velocities and lane change trajectories as well as the traffic light phase switching trajectories for its particular traffic intersection, and the computations for each ITC may be executed in parallel on separate computing units.

Some embodiments are based on the realization that the optimization problems for the CTC controller and the ITC controllers may be solved exactly or inexactly. Exact solutions are feasible and locally or globally optimal, while inexact solutions may be approximately feasible or suboptimal. Examples of exact optimization algorithms may include, but are not limited to, interior point methods, active-set methods, gradient methods, operator splitting methods, sequential quadratic programming, sequential convex programming, branch-and-bound, branch-and-cut, and branch-and-price methods. Examples of inexact optimization algorithms may include, but are not limited to, heuristic rules, early termination of exact optimization algorithms, rounding methods, machine learning-based approximations of optimal solutions, or approximate dynamic programming.

In some embodiments, one or both of CTC and ITC control policies may be approximated by a deep neural network architecture. In an example, but not limited to, reinforcement learning may be used to directly maximize a reward function for reducing congestion, travel time, emissions and energy consumption in the transportation network. In other embodiments, one or both of the CTC and the ITC control policies may be implemented using the deep neural network architecture, based on imitation learning that aims to approximate expert solutions of the corresponding optimization problems using exact optimization algorithms.

Accordingly, some embodiments disclose a traffic control system for jointly controlling one or multiple connected and automated vehicles (CAVs) and one or multiple human-driven vehicles (HDVs) moving across multiple intersections of roads subject to integer constraints for crossing each of the multiple intersections. The traffic control system comprises least one processor and a memory having instructions stored thereon that, when executed by the at least one processor, cause the traffic control system to collect digital representation of states of each of the CAVs, each of the HDVs, and each of traffic signs regulating traffic on the roads. The at least one processor further causes the traffic control system to solve an optimization problem jointly optimizing traffic flows based on a macroscopic traffic flow model in a centralized traffic controller (CTC) for the multiple intersections using convex optimization subject to convex relaxation of the integer constraints for crossing each of the multiple intersections. The at least one processor further causes the traffic control system to solve, individually for each of the multiple intersections, a multi-variable mixed-integer programming (MIP) problem in each of multiple intersection traffic controllers (ITCs) optimizing a cost function, and minimizing tracking errors in traffic flow values of a microscopic traffic flow model with respect to relaxed traffic flow values from the CTC, subject to the integer constraints to produce values of control commands changing states of each of the CAVs associated with an intersection of the multiple intersections and values of control commands changing states of each of the traffic signs associated with the intersection, wherein the cost function is optimized subject to a motion model of a CAV associated with the intersection described by a differential equation relating a control command to the CAV with a change of a state of the CAV, and subject to a motion model of an HDV described by a switch function relating a dynamic traffic rule for the HDV with a state of the HDV and a state of a corresponding traffic sign. The at least one processor further causes the traffic control system to transmit the optimized values of the control commands to the corresponding CAVs and corresponding traffic signs.

According to another embodiment, a method is disclosed for jointly controlling one or multiple connected and automated vehicles (CAVs) and one or multiple human-driven vehicles (HDVs) moving across multiple intersections of roads subject to integer constraints for crossing each of the multiple intersections. The method comprises collecting digital representation of states of each of the CAVs, each of the HDVs, and each of traffic signs regulating traffic on the roads. The method further comprises solving an optimization problem jointly optimizing traffic flows based on a macroscopic traffic flow model in a centralized traffic controller (CTC) for the multiple intersections using convex optimization subject to convex relaxation of the integer constraints for crossing each of the multiple intersections. The method further comprises solving, individually for each of the multiple intersections, a multi-variable mixed-integer programming (MIP) problem in each of multiple intersection traffic controllers (ITCs) optimizing a cost function, and minimizing tracking errors in traffic flow values of a microscopic traffic flow model with respect to relaxed traffic flow values from the CTC, subject to the integer constraints to produce values of control commands changing states of each of the CAVs associated with an intersection of the multiple intersections and values of control commands changing states of each of the traffic signs associated with the intersection, wherein the cost function is optimized subject to a motion model of a CAV associated with the intersection described by a differential equation relating a control command to the CAV with a change of a state of the CAV, and subject to a motion model of an HDV described by a switch function relating a dynamic traffic rule for the HDV with a state of the HDV and a state of a corresponding traffic sign. The method further comprises transmitting the optimized values of the control commands to the corresponding CAVs and corresponding traffic signs.

Accordingly, yet another embodiment discloses a non-transitory computer-readable storage medium embodied thereon a program executable by a processor for performing a method for jointly controlling one or multiple connected and automated vehicles (CAVs) and one or multiple human-driven vehicles (HDVs) moving across multiple intersections of roads subject to integer constraints for crossing each of the multiple intersections. The method comprises collecting digital representation of states of each of the CAVs, each of the HDVs, and each of traffic signs regulating traffic on the roads. The method further comprises solving an optimization problem jointly optimizing traffic flows based on a macroscopic traffic flow model in a centralized traffic controller (CTC) for the multiple intersections using convex optimization subject to convex relaxation of the integer constraints for crossing each of the multiple intersections. The method further comprises solving, individually for each of the multiple intersections, a multi-variable mixed-integer programming (MIP) problem in each of multiple intersection traffic controllers (ITCs) optimizing a cost function, and minimizing tracking errors in traffic flow values of a microscopic traffic flow model with respect to relaxed traffic flow values from the CTC, subject to the integer constraints to produce values of control commands changing states of each of the CAVs associated with an intersection of the multiple intersections and values of control commands changing states of each of the traffic signs associated with the intersection, wherein the cost function is optimized subject to a motion model of a CAV associated with the intersection described by a differential equation relating a control command to the CAV with a change of a state of the CAV, and subject to a motion model of an HDV described by a switch function relating a dynamic traffic rule for the HDV with a state of the HDV and a state of a corresponding traffic sign. The method further comprises transmitting the optimized values of the control commands to the corresponding CAVs and corresponding traffic signs.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 8B shows an example of a mapping between multiple collision-free states of the traffic light signals and traffic light signal values for each of crossing directions of a traffic intersection within a transportation network that is controlled by a hierarchical traffic control system, according to some embodiments of the present disclosure.

FIG. 8C shows an example of a traffic flow plan computed by a central traffic coordinator (CTC) using a table of traffic flow values for each of the crossing directions of a traffic intersection within a transportation network that is controlled by a hierarchical traffic control system, according to some embodiments of the present disclosure.

FIG. 10D illustrates an example of traffic flow values for multiple crossing directions over a prediction time horizon for a 3-way traffic intersection in a transportation network, which is used in a macroscopic traffic flow model of the hierarchical traffic control system, according to some embodiments of the present disclosure.

FIG. 10F illustrates an example of vehicle density values for multiple crossing directions over a prediction time horizon for a 3-way traffic intersection in a transportation network, which is used in a macroscopic traffic flow model of the hierarchical traffic control system, according to some embodiments of the present disclosure.

DETAILED DESCRIPTION

Some embodiments of the present disclosure provide a system and a method for controlling one or multiple connected and automated vehicles (CAVs) within a transportation network that consists of one or multiple interconnected traffic intersections and that includes a dynamic environment. The dynamic environment includes, but not limited to, one or multiple human-driven vehicles, traffic participants or dynamic obstacles.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
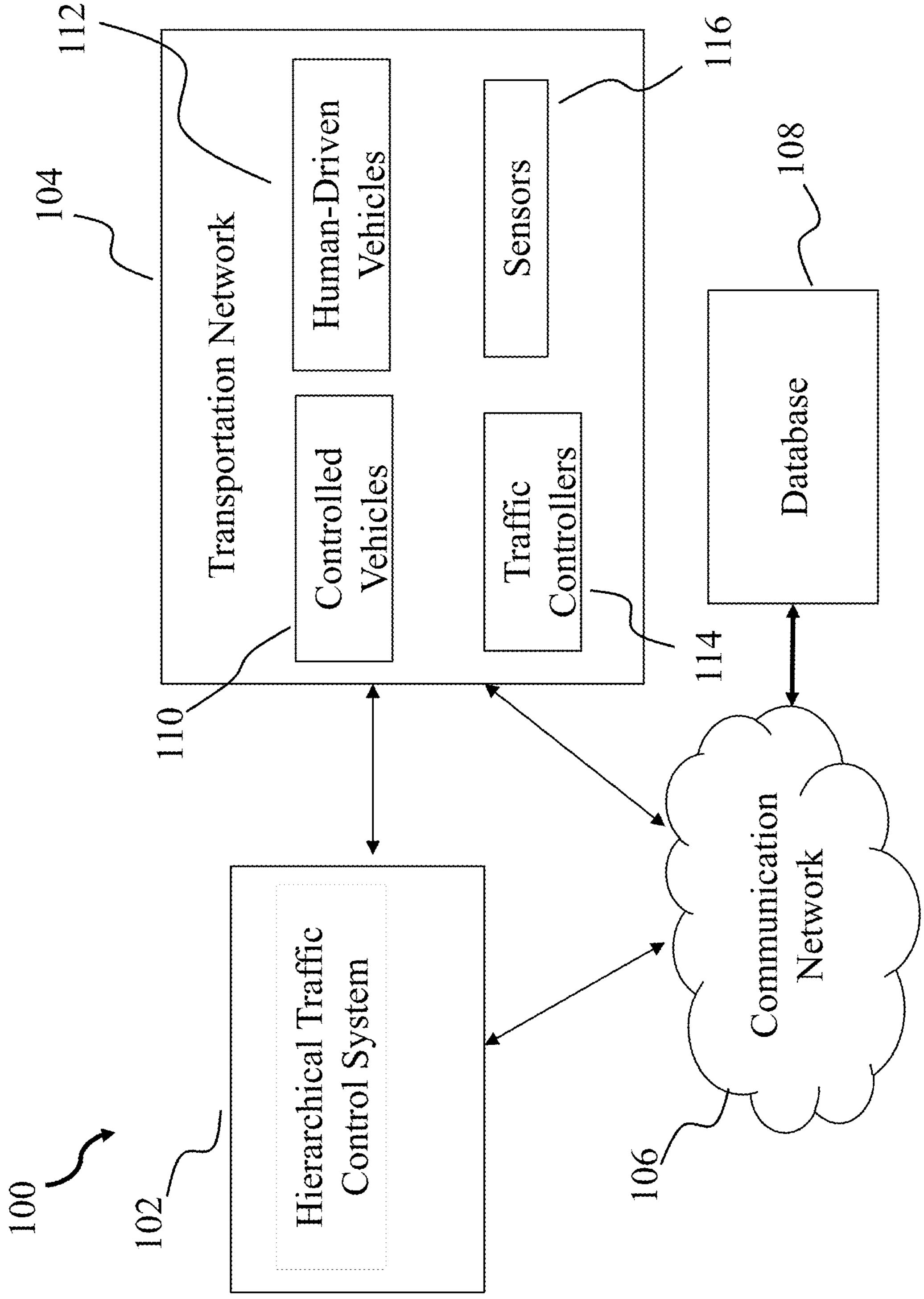
FIG. 1 is a block diagram that illustrates an exemplary network environment for hierarchical optimization-based traffic control of controlled and non-controlled vehicles, in accordance with some embodiment of the disclosure.

FIG. 1 is a block diagram that illustrates an exemplary network environment for hierarchical optimization-based traffic control of controlled and non-controlled vehicles, in accordance with an embodiment of the disclosure. With reference to FIG. 1, there is shown a network environment 100. The network environment 100 may include a hierarchical traffic control system 102 and a transportation network 104 communicatively coupled to the hierarchical traffic control system 102. There is further shown a communication network 106 and a database 108 which is accessible to the hierarchical traffic control system 102 via the communication network 102. In FIG. 1, the hierarchical traffic control system 102, the communication network 106, and the database 108 are shown as separate devices; however, in some embodiments, the entire functionality of the hierarchical traffic control system 102, the communication network 106, and the database 108 may be incorporated in the hierarchical traffic control system 102, without a deviation from the scope of the disclosure.

The hierarchical traffic control system 102 may include suitable logic, circuitry, code, and/or interfaces that may be configured to generate control commands changing states of controlled vehicles and control commands changing states of traffic signs or traffic lights associated with multiple intersections in the transportation network 104. The hierarchical traffic control system 102 transmits the generated control commands to the controlled vehicles and the traffic signs or traffic lights. Examples of the hierarchical traffic control system 102 may include, but are not limited to, a server, a computer work-station, a mainframe machine, and/or a laptop.

The transportation network 104 may include controlled vehicles 110, human driven vehicles 112, traffic controllers 114, and sensors 116. In FIG. 1, the sensors 116 are shown to be separate from the controlled vehicles 110 and human driven vehicles 112; however, in some embodiments, the entire functionality of the sensors 116 may be incorporated in the controlled vehicles 110 or the human driven vehicles individually, without a deviation from the scope of the disclosure. Examples of the controlled vehicles 112 may include, but are not limited to driverless vehicles, connected and automated vehicles (CAVs), and/or connected and semi-automated vehicles. Examples of the human driven vehicles 112 may include, but are not limited to, manually driven vehicles which are mostly governed and controlled by humans. Examples of the traffic controllers 114 may include, but are not limited to traffic lights or traffic signs which control the movement of the traffic on the roads and across the intersections in the transportation network 104. The color of the traffic light or the traffic sign defines whether to stop, continue to move, or to slow down the vehicles moving on the roads or intersections in the transportation network 104. Examples of sensors 116 may include, but are not limited to distance range finders, radars, lidars, or cameras to accurately detect the state of the vehicles and the dynamic environment, including both connected and non-connected vehicles, autonomous, semi-autonomous and manually operated vehicles and other traffic participants such as bicycles and pedestrians.

The communication network 106 may include a communication medium through which the hierarchical traffic control system 102 may communicate with the transportation network 104 and other devices which are omitted from disclosure for the sake of brevity. The communication network 106 may be one of a wired connection or a wireless connection. Examples of the communication network 106 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 106 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zigbee®, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth® (BT) communication protocols.

The database 108 may include suitable logic, circuitry, and/or interfaces that may be configured to store a traffic model for the transportation network 104. In another embodiment, the database 108 may store program instructions to be executed by the hierarchical traffic control system 102. The traffic model may include a microscopic traffic model or a macroscopic traffic model. Example implementations of the database 108 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

Figure 2:
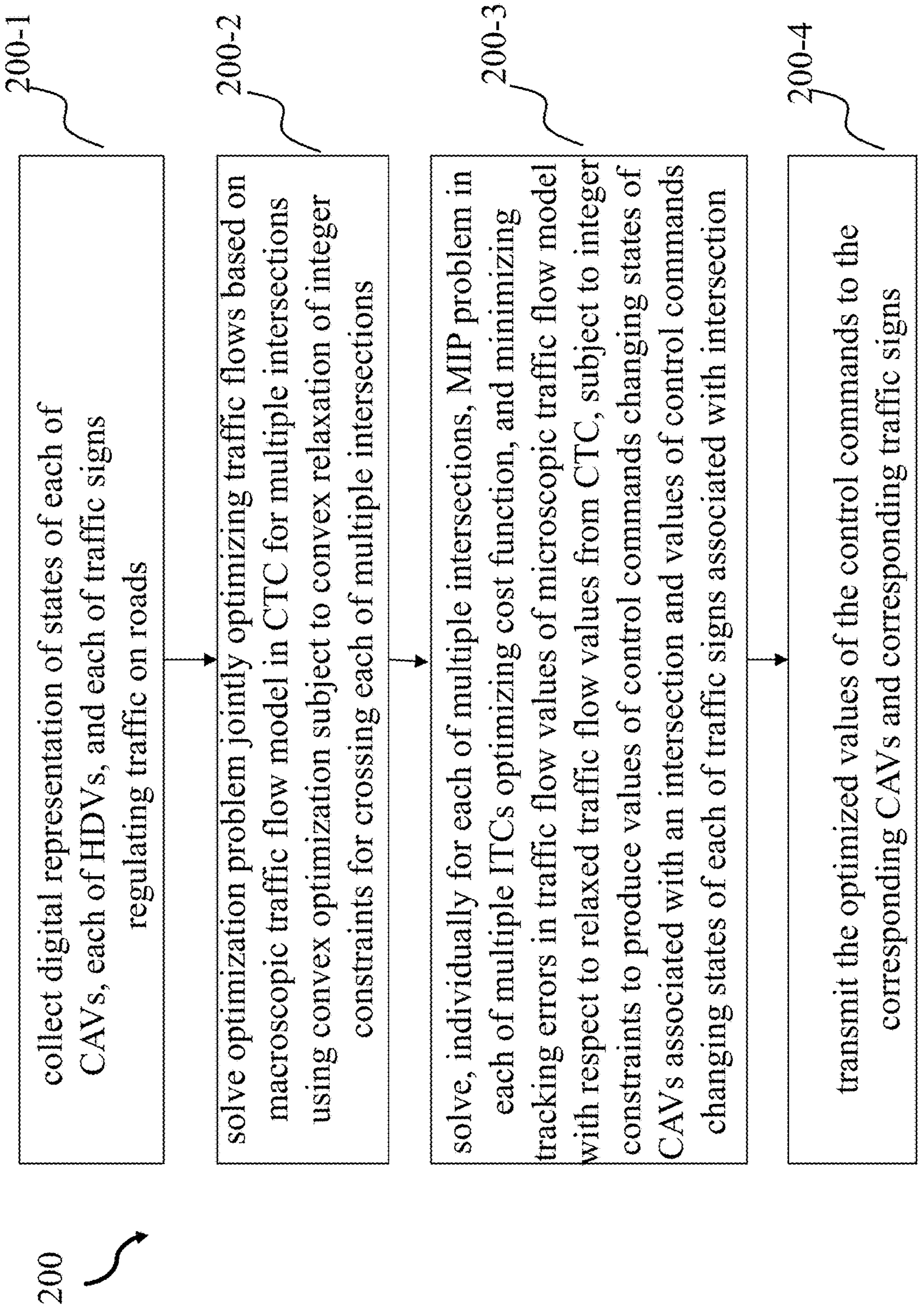
FIG. 2 is a flowchart that illustrates an exemplary method for hierarchical optimization-based traffic control of controlled and non-controlled vehicles, in accordance with an embodiment of the disclosure.

FIG. 2 is a flowchart that illustrates an exemplary method for hierarchical optimization-based traffic control of controlled and non-controlled vehicles, in accordance with an embodiment of the disclosure. FIG. 2 is explained in conjunction with elements from FIG. 1. With reference to FIG. 2, there is shown a flowchart 200. The method illustrated in the flowchart 200 may be executed by any computing system, such as by the hierarchical traffic control system 102 for jointly controlling one or multiple connected and automated vehicles (CAVs) and one or multiple human-driven vehicles (HDVs) moving across multiple intersections of roads subject to integer constraints for crossing each of the multiple intersections. The method may start at 200-1 and proceed to 200-4.

At 200-1, digital representation of states of each of the CAVs, each of the HDVs, and each of traffic signs or traffic lights regulating traffic on the roads is collected. Details of the collection of the states of each of the CAVs, each of the HDVs, and each of traffic signs are describes, for example, with reference to FIG. 3. In an example, the state of the CAVs includes, but is not limited to, at least one of a position, a velocity, an acceleration, and a lane of the CAVs. In an example, the state of the traffic signs or traffic lights includes, but is not limited to, a color of the traffic sign or traffic light. The color of the traffic sign or traffic light is one of red, yellow, or green. In an example, the state of the HDVs includes, but is not limited to, at least one of a position, a velocity, an acceleration, and a lane of the HDVs.

At 200-2, an optimization problem for jointly optimizing traffic flows is solved based on a macroscopic traffic flow model in a centralized traffic controller (CTC) for the multiple intersections using convex optimization subject to convex relaxation of the integer constraints for crossing each of the multiple intersections. In an embodiment, optimizing traffic flows include optimizing traffic flow values by convex relaxation of the integer constraints for crossing each of the multiple intersections. The optimization of the traffic flow values results in relaxed traffic flow values. Integer constraints are carefully designed and incorporated into the optimization problem, for example, to avoid collisions while crossings an intersection. Integer constraints restrict some or all the variables in the optimization problem to take on only integer values. This enables accurate modeling of the optimization problem involving discrete quantities such as the discrete representation of the states of each of the CAVs, each of the HDVs, and each of traffic signs or traffic lights regulating traffic on the roads. The convex optimization of the integer constraints is a problem where all of the constraints are convex functions, and the objective is a convex function if minimizing, or a concave function if maximizing. In general, relaxation denotes a technique of simply dropping certain constraints from the optimization problem. Specifically, convex relaxation means that upon relaxation or upon dropping certain constraints, the problem becomes convex. In an embodiment, the convex relaxation of the integer constraints that enforce multiple traffic rules includes the convex relaxation of the integer constraints for vehicles crossing each of the intersections and for the switching behavior of the traffic lights. To this end, the traffic flow values are relaxed using the convex relaxation, which includes dropping certain constraints, to result in relaxed traffic flow values that make the optimization problem convex.

At 200-3, a multi-variable mixed-integer programming (MIP) problem is solved in each of multiple intersection traffic controllers (ITCs) to produce values of control commands changing states of each of the CAVs associated with an intersection of the multiple intersections and values of control commands changing states of each of the traffic signs associated with the intersection. The multi-variable MIP problem optimizes a cost function and minimizes tracking errors in traffic flow values of a microscopic traffic flow model with respect to the relaxed traffic flow values from the CTC, subject to the integer constraints to produce the values of the control commands changing the states of each of the CAVs associated with the intersection and the values of the control commands changing the states of each of the traffic signs associated with the intersection. In an embodiment, the cost function is optimized subject to a motion model of a CAV associated with the intersection described by a differential equation relating a control command to the CAV with a change of a state of the CAV, and subject to a motion model of an HDV described by a switch function relating a dynamic traffic rule for the HDV with a state of the HDV and a state of a corresponding traffic sign.

At 200-4, the optimized values of the control commands are transmitted to the corresponding CAVs and corresponding traffic signs or traffic lights.

Although the flowchart 200 is illustrated as discrete operations, such as 200-1, 200-2, 200-3, and 200-4, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 3:
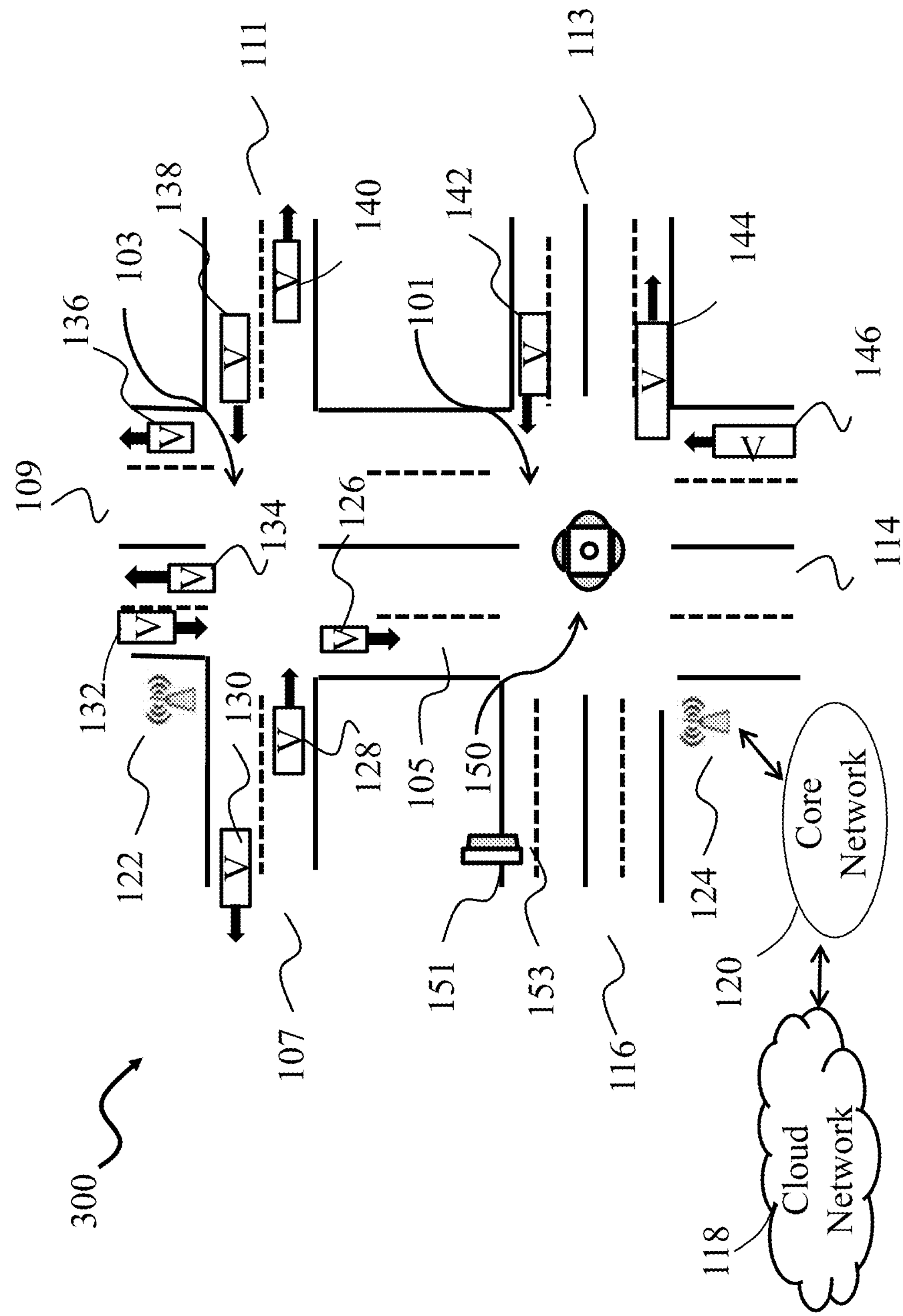
FIG. 3 shows an example of a traffic scenario in a local area of multiple interconnected traffic intersections for hierarchical optimization-based traffic control of controlled and non-controlled vehicles, according to some embodiments of the present disclosure.

FIG. 3 shows an example of a traffic scenario in a local area of multiple interconnected traffic intersections for hierarchical optimization-based traffic control of controlled and non-controlled vehicles, according to some embodiments of the present disclosure. FIG. 3 shows an example of a traffic scenario that illustrates the need for hierarchical optimization-based coordination and control of traffic rules, traffic lights, controlled vehicles, and human-driven vehicles within a local area of multiple interconnected conflict zones, for example, at interconnected intersections of road segments. The interconnected conflict zones include physically interconnected conflict zones and communicably interconnected conflict zones. Examples of physically interconnected conflict zones are intersections or merging points where vehicles can travel from one conflict zone to another conflict zone. Examples of communicably interconnected conflict zones are traffic intersections or merging points that share traffic information from one conflict zone to another conflict zone via communication channels.

The example of the traffic scenario FIG. 3 shows a transportation network that includes multiple interconnected traffic intersections 101 and 103 which are physically interconnected to each other via a road segment 105. The transportation network further includes road segments 107, 109, 111, 113, 114, 116, a cloud network 118, core network 120, one or more road-side units (RSUs) 122 and 124, vehicles 126, 128, 130, 132, 134, 136, 138, 140, 142, 144, 146, a traffic light display 150, and a lane access status display 151.

The transportation network may include one or more conflict zones and one or more conflict-free zones. The multiple interconnected traffic intersections 101 and 103 are examples of the one or multiple conflict zones or merging points in the transportation network. The multiple interconnected traffic intersections 101 and 103 may connect multiple lanes or the road segments 105, 107, 109, 111, 113, 114, 116. Examples of the one or more conflict-free zones are the road segments 105, 107, 109, 111, 113, 114, 116, consisting of one or multiple lanes that allow either a single direction or multiple directions of traffic.

In an embodiment, each of the vehicles 126, 128, 130, 132, 134, 136, 138, 140, 142, 144, 146 in the transportation network may be either an autonomous, semi-autonomous or manually operated vehicle. In an example, the autonomous and semi-autonomous vehicles are connected and automated vehicles (CAVs). Alternatively, the autonomous and semi-autonomous vehicles may be referred as controlled vehicles. In an example, the manually operated vehicles or other traffic participants may be an examples of human-driven vehicles (HDVs). In another example, the vehicles 126, 128, 130, 132, 134, 136, 138, 140, 142, 144, 146 include two-wheeler vehicles, such as motor bikes, four-wheeler vehicles, such as cars, or more than four-wheel vehicles, such as trucks.

In an embodiment, the vehicles 126, 128, 130, 132, 134, 136, 138, 140, 142, 144, 146 follow general traffic rules. In an example, the general traffic rules include, but are not limited to, rules of crossing intersections, avoiding collision with neighbor vehicles, occupying an open lane, or satisfying lane speed limits. In an embodiment, the general traffic rules may include dynamic traffic rules that dynamically change upon receiving corresponding control commands. In an example, the general traffic rules include constraints for crossing through an intersection of the multiple intersections based on a collision-free state of a corresponding traffic sign, capacity limit constraints for each of the multiple intersections or each of road segments in the transportation network, collision avoidance constraints between pairs of vehicles, lane change constraints for overtaking of vehicles, speed limit constraints, and traffic sign timing constraints. Examples of the dynamic traffic rules include traffic signs such as traffic lights, which can receive control commands to change their timing to let more or fewer vehicle pass through in a certain crossing direction, variable speed limits, that can receive control commands to change the maximum speed of vehicles in certain lanes, and dynamically enabled lanes, which can receive control commands to open or block access to the lane, and the like. The dynamic traffic rules may be displayed on digital displays on the road segments 105, 107, 109, 111, 113, 114, 116 to inform the vehicles 126, 128, 130, 132, 134, 136, 138, 140, 142, 144, 146 of state of the dynamic traffic rules. For example, the traffic light display 150 may be configured to display a state of the traffic light for the multiple interconnected traffic intersection 101, a lane speed display configured to display a lane speed limit. In an example, the lane access status display 151 may be configured to display a status indicating whether access to a lane 153 of the transportation network is enabled or disabled.

The one or more RSUs 122, 124 may be used for infrastructure-based real-time sensing of the state of the vehicles 126, 128, 130, 132, 134, 136, 138, 140, 142, 144, 146 and other traffic participants in a local area around each of the RSUs 122, 124. In an embodiment, the traffic scenario FIG. 3 shows one RSU 122 and another RSU 124, the core network 120, and the cloud network 118 to establish an Internet of Vehicles (IoV) environment, including vehicle-to-vehicle (V2V) and vehicle-to-infrastructure (V2I) communication, also known as vehicle-to-everything (V2X) communication.

In an embodiment, a multi-hop communication is established among different vehicles, for example, the vehicles 126, 128, 130, 132, 134, 136, 138, 140, 142, 144, 146 in the transportation network. A communication between the cloud network 118 and a vehicle, such as the vehicle 126 on the road segment 105, needs to propagate through the RSU 122 or the RSU 124 and the core network 120. In some embodiments, safe mobility of the vehicles 126, 128, 130, 132, 134, 136, 138, 140, 142, 144, 146 is controlled by a hierarchical optimization-based traffic control system using a cloud-based or edge-based network. In an example, the cloud network 118 and core network 120 may be used to implement the hierarchical optimization-based traffic control system. In another embodiment, the hierarchical optimization-based traffic control system is implemented using one or multiple mobile edge computers (MECs). As an example of implementation, but not limited to, the MECs may be embedded as part of the one or more RSUs 122, 124 or they may be separate devices that are connected to one or more network elements such as the RSUs 122, 124, the cloud network 118 and core network 120. Embodiments of the present disclosure include the solution of one or multiple constrained optimization problems at each sampling time step for coordinated control of the dynamic rules, the traffic lights, and the vehicles in the transportation network, for which the computations can be executed either in the cloud network 118 or in the one or multiple MECs.

In some embodiments, the traffic scenario 300 in FIG. 3 corresponds to a public metropolitan area, where the road segments 105, 107, 109, 111, 113, 114, 116 form multiple intersections, such as the multiple interconnected traffic intersections 101 and 103. In the metropolitan area, traffic conditions at the multiple interconnected traffic intersections 101 and 103 determine traffic flow because traffic congestion usually starts at a traffic intersection, such as the intersection 103, and it propagates further to the road segments, for example, road segments 105, 107, 109, 111, 113, 114, 116. The traffic conditions at the interconnected traffic intersections 101 and 103 are interdependent such that a variation at one intersection, for example, at the intersection 103, propagates further to other interconnected intersections, such as the intersection 101 which is a neighboring intersection for the intersection 103.

In other embodiments, the traffic scenario 300 in FIG. 3 may correspond to a private transportation network, for example, including one or multiple parking areas and interconnected road segments for a valet parking system. Other examples of similar traffic scenarios, including a transportation network with multiple interconnected traffic intersections and road segments, are smart distribution centers and/or shipping yards. Examples of types of the CAVs include personal vehicles in case of the valet parking system, commercial vehicles such as trucks in case of the yard management system, or shuttles for pick-up and drop-off of passengers.

Figure 5:
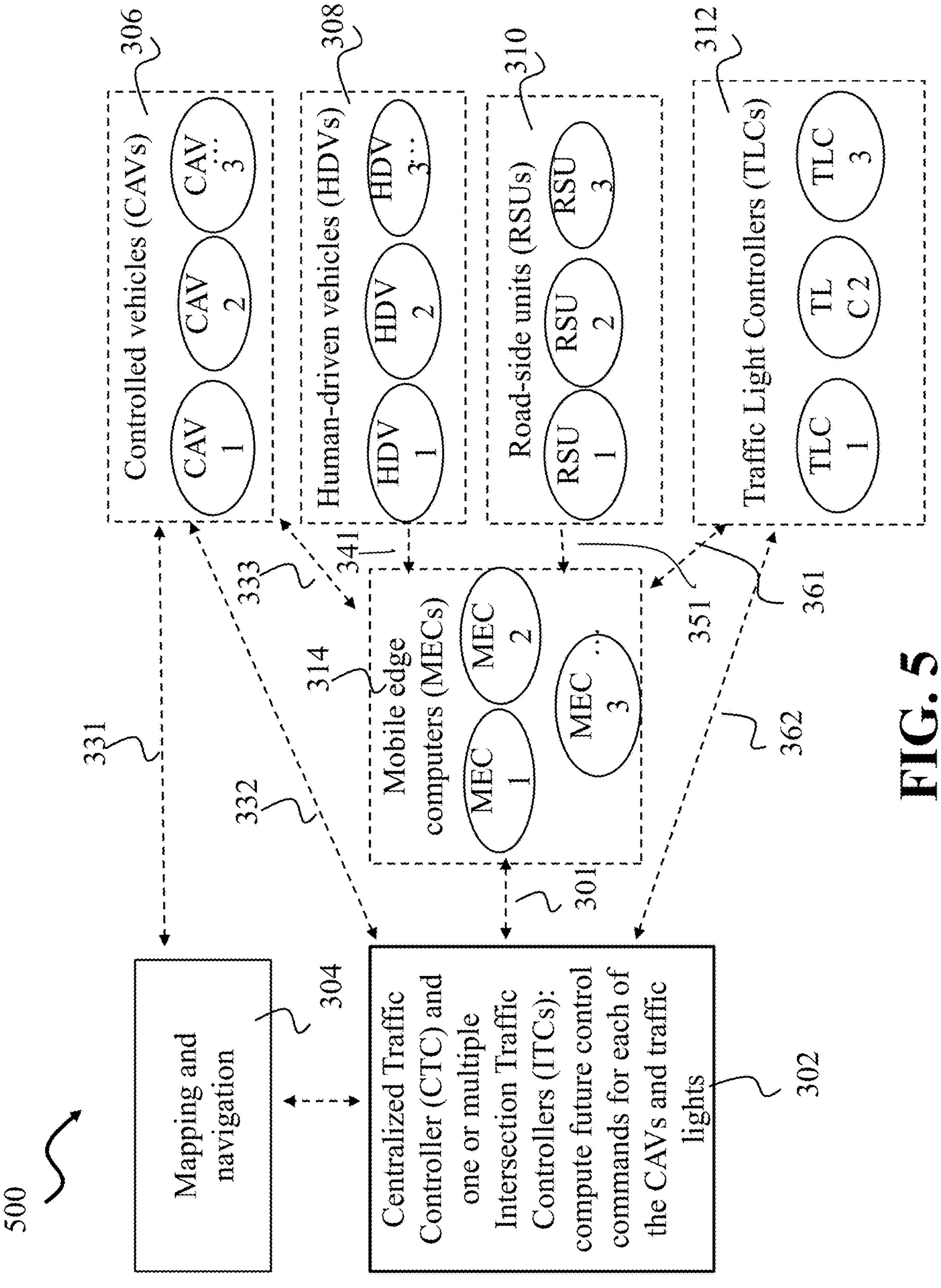
FIG. 5 shows a schematic diagram of possible interactions among a hierarchical traffic control system, a mapping and navigation system, one or multiple controlled and human-driven vehicles, road-side units, traffic light controllers, and mobile edge computers, according to some embodiments of the present disclosure.

In the transportation network of the traffic scenario 300 in FIG. 3, on-board control devices of the vehicles, such as the vehicle 146, cannot obtain information about neighboring vehicles such as the vehicle 142, pedestrians and environment conditions that are out of visible range of the vehicle 146. For instance, the vehicle 146 traveling on the road 114 intends to cross the intersection 101 after the vehicle 144 that is bigger in size than the vehicle 142 crosses the intersection 101, and a small sized vehicle such as the vehicle 142 is also moving into the intersection 101. In such a scenario, visibility of the vehicle 142 is blocked, for the vehicle 146, by the vehicle 144 as shown in FIG. 5. The vehicle 144 prevents the vehicle 142 from getting noticed by the vehicle 146 if communication link between the vehicle 142 and the vehicle 146 is affected or if vehicle 142 and vehicle 146 use different communication protocols. As a result, the vehicle 142 and the vehicle 146 might collide. In another embodiment, the multi-hop communication between the cloud network 118 and a vehicle 146 may result in a long communication delay, which may not be acceptable in real-time scenarios of cloud-based vehicle control.

Some embodiments are based on the realization that different communication technologies may be utilized to support vehicular communications. For example, IEEE Dedicated Short-Range Communications/Wireless Access in Vehicular Environments (DSRC/WAVE) standard family for vehicular networks, 3GPP Cellular-Vehicle-to-Anything (C-V2X), and the like. However, due to high cost reasons, it is impractical for vehicles, for example the vehicles 126, 128, 130, 132, 134, 136, 138, 140, 142, 144, 146, to support more than one short-range communication technologies which leads to compatibility issues among the vehicles to communicate with each other. Therefore, the vehicles equipped with the IEEE DSRC/WAVE cannot communicate with other vehicles equipped with the 3GPP C-V2X, and vice versa. Consequently, the accuracy of real-time control decisions by the on-board, multi-layer guidance and control architecture in each individual vehicle would be severely affected because the real-time decisions would be based on incomplete information of the traffic scenario FIG. 3. To that end, embodiments of the present disclosure use a hierarchical optimization-based traffic control system, using real-time information from each of the vehicles, dynamic traffic rules and traffic lights in the transportation network, to ensure safety, time and energy efficiency.

Some embodiments of the present disclosure are based on the realization that edge infrastructure devices, for example the RSU 122 and the RSU 124, have advantages for controlling multi-vehicle traffic over usage of only the cloud network or only the on-board device including the multi-layer guidance and control architecture. For example, the edge infrastructure devices may be installed at intersections or merging points, such as the multiple interconnected traffic intersections 101, 103, and they could directly communicate with the vehicles approaching the intersection or merging point. In addition, the edge infrastructure devices may be equipped with multiple communication technologies to be able to communicate with all the connected vehicles. In an embodiment, the edge infrastructure devices may be stationary, which enable them in providing reliable communication with vehicles as well as in collecting relatively high-quality environmental data.

The edge infrastructure devices are capable of continuously monitoring multi-vehicle traffic and the environment for accurate decision making. In an example, the edge infrastructure devices use sensors, but not limited to, distance range finders, radars, lidars, or cameras to accurately detect the state of the vehicles and the dynamic environment, including both connected and non-connected vehicles, autonomous, semi-autonomous and manually operated vehicles and other traffic participants such as bicycles and pedestrians. In another example, the edge infrastructure devices may use sensor fusion technologies in order to accurately detect the state of the vehicles and the dynamic environment. Accordingly, the edge infrastructure devices are appropriate to use for coordinated control of dynamic traffic rules and mixed traffic, within the transportation network of the multiple interconnected traffic intersections.

In an embodiment, the CAVs may be controlled continuously at any point in time and space from the edge infrastructure devices, to achieve optimization of the transportation network, such as minimizing an average or worst-case travel time, an overall idling time, and the like. In contrast, the HDVs are non-controlled vehicles. In other words, it is impossible or at least impractical to control motion of the HDVs at each point in time and space. In different traffic scenarios with only HDVs, the motion of the HDVs is controlled through the traffic signs. For example, a flow of the HDVs is affected by timing and sequencing of the traffic lights so that an overall operation of the transportation network is positively affected. As such, the motion of the HDVs is controlled indirectly by controlling the traffic signs. However, since the HDVs are driven by human drivers and are controlled indirectly based on the traffic signs, the control of the HDVs is possible only at specific locations, which yields limited control over the transportation network.

Some embodiments are based on the recognition that it can be beneficial to jointly control the CAVs and the HDVs to optimize overall benefits for the CAVs and the HDVs such as minimizing the average or worst-case travel time, the overall idling time, and the like. To that end, it is an object of some embodiments to provide a traffic control system for jointly controlling the CAVs and HDVs. In some embodiments, the traffic control system is implemented using the one or multiple MECs, which may be either embedded as part of the one or more RSUs 122, 124 or they can be separate devices that are connected to the one or more RSUs 122, 124, the cloud network 118 or core network 120.

Figure 4A:
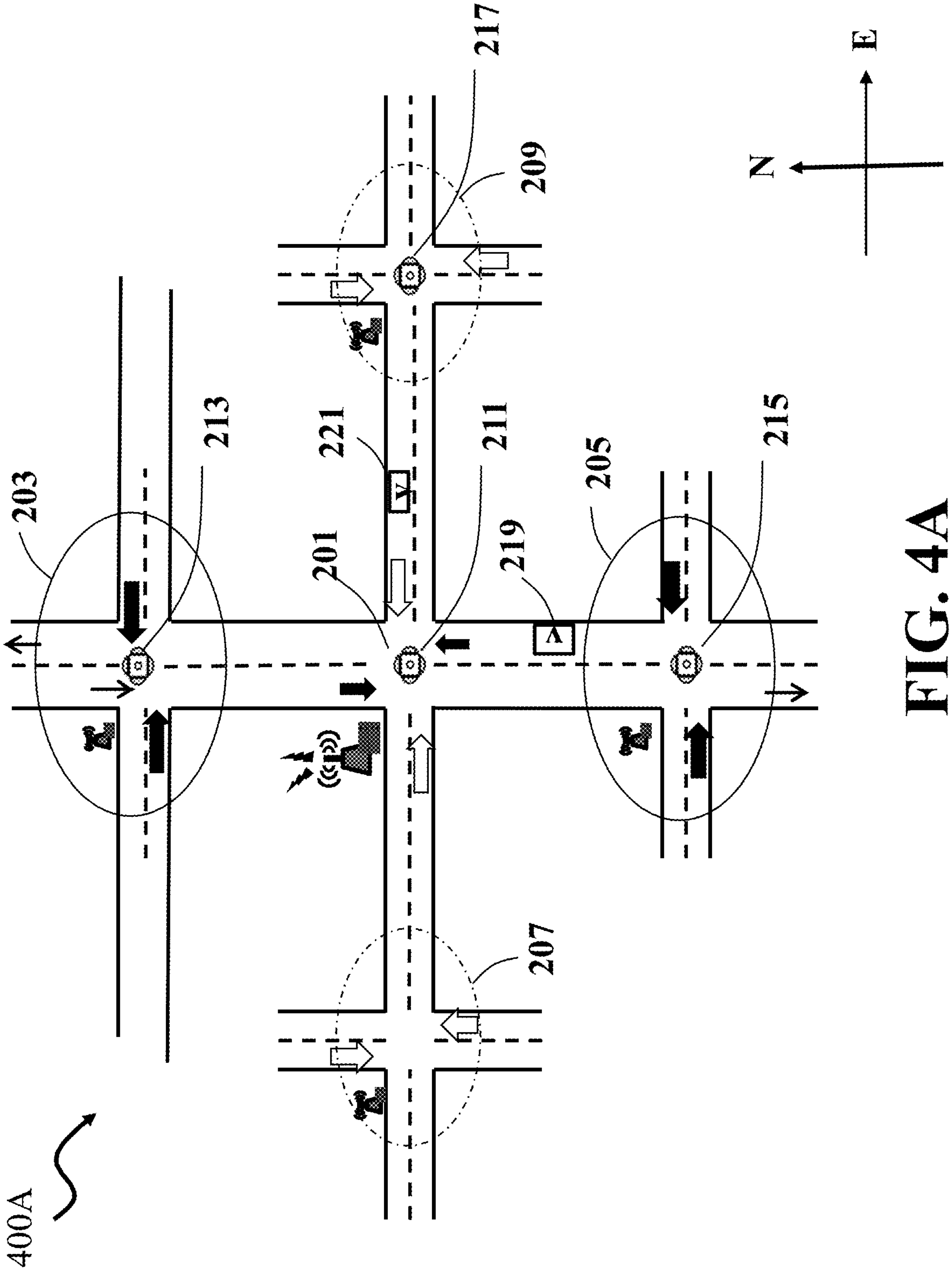
FIG. 4A shows an example of controlling traffic in a local area of multiple interconnected traffic intersections using hierarchical optimization-based coordinated control of dynamic traffic rules and mixed traffic, according to some embodiments of the present disclosure.

FIG. 4A shows an example of controlling traffic in a local area of multiple interconnected traffic intersections using hierarchical optimization-based coordinated control of dynamic traffic rules and mixed traffic, according to some embodiments of the present disclosure. FIG. 4A shows an example of a traffic scenario 400A illustrating application of the traffic control system in a transportation network including multiple interconnected intersections 201, 203, 205, 207 and 209. The overall safety, time efficiency and energy efficiency of the traffic flow in this transportation network can be controlled by the traffic control system, according to embodiments of the present disclosure. In some embodiments, the traffic control system computes a coarse motion plan for each CAV in the transportation network along its route from the current position of the CAV to a desired destination of the CAV and at the same time computes the control commands for the controllable traffic rules (CTRs) lights or signs 211, 213, 215, 217 that affect both CAVs and HDVs. The CTRs refer to the dynamic traffic rules. The coarse motion plan may include a sequence of entering and exit times and of average velocity values for each CAV at each intersection along the CAV's route from its current position to its desired destination. Furthermore, the traffic control system controls the CTRs lights or signs 211, 213, 215, 217 in the entire area, thus affecting behaviors of CAVs and HDVs. CTRs may not need to be present on all intersections, as, for instance, the intersection 207 does not have a CTR light or sign.

In an illustrative example traffic scenario 400A in FIG. 4A, traffic in a north-south direction at the intersections 203 and 205 is more highly congested than traffic in an east-west direction at the intersections 207 and 209. The traffic control system controls planned future timing and velocity trajectories for CAVs, such as the vehicle 219, that plan to cross the intersection 201 and plan to travel towards south-north direction of the intersection 203, which is highly congested. To improve overall safety, time efficiency and energy efficiency of traffic flow in the transportation network, the traffic control system generates commands that causes the vehicle 219 to slow down its speed before and after crossing the intersection 201, such that the vehicle 219 is predicted to arrive at the intersection 203 at a later time in order to reduce the traffic congestion at the intersection 203 and in order to reduce overall waiting time for one or multiple of the vehicles in the transportation network.

Additionally, the traffic control system also controls the CTRs lights or signs. For instance, it may reduce green light duration of CTR traffic lights 211, 213, 215 in the east-west direction, and hence increase the green light duration in the north south direction, so that the more congested north-south direction is allowed to flow more so that the traffic congestion should reduce. However, the traffic control system may enable the green light to be turned on in 211, 213, 215, exactly when specific vehicles such as the vehicle 219 is able to pass through, as opposed to in a way related to average traffic. This allows to enable green lights when needed according to the specific vehicle objectives. For instance, the CTR light or sign 211 may be green in East-west direction, but it may be turned red when both HDV 221 and the vehicle 219 are approaching the intersection 201, so that HDV 221 stops to let the vehicle 219 pass.

Figure 4B:
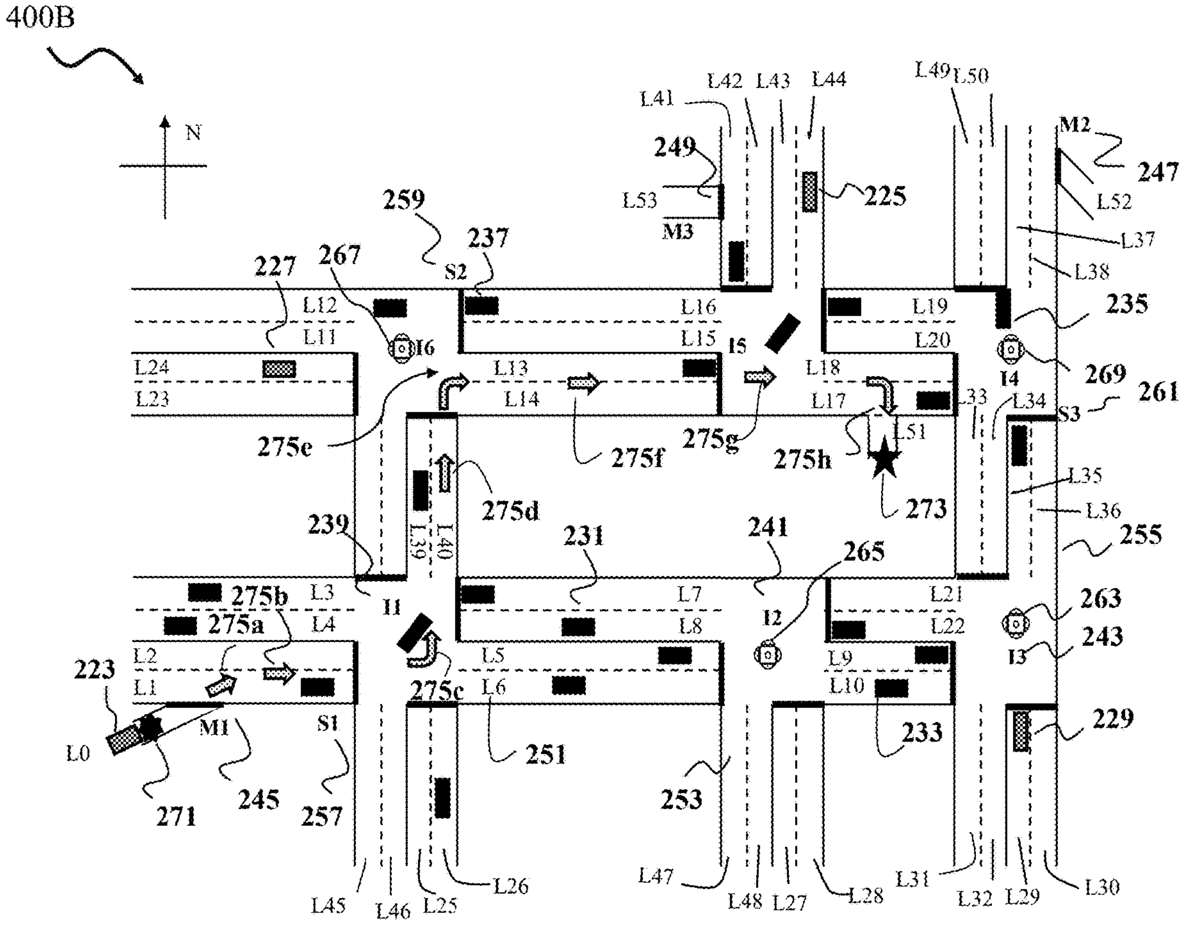
FIG. 4B shows an example of a traffic scenario in a local area of interconnected intersections and routing information for multiple connected and automated vehicles, according to some embodiments of the present disclosure.

FIG. 4B shows an example of a traffic scenario in a local area of interconnected intersections and routing information for multiple connected and automated vehicles, according to some embodiments of the present disclosure. FIG. 4B illustrates an exemplary traffic scene 400B, within a transportation network of multiple interconnected intersections and merging points. The transportation network includes one or multiple controlled vehicles, referred to as CAVs, for example, vehicles 223, 225, 227 and 229. The transportation network further includes one or multiple non-controlled traffic participants, referred to as HDVs, for example 231, 233, 235 and 237. The transportation network itself may include multiple interconnected intersections, such as 239 (I1), 241 (I2) and 243 (I3), as well as multiple interconnected merging points, such as 245 (M1), 247 (M2) and 249 (M3). Other intersections such as 14, 15, and 16 are also shown in FIG. 4B. Both intersections and merging points are referred to as conflict zones. The conflict zones are interconnected by multiple conflict-free road segments that each may include one or multiple lanes, for example, 251 (L6), 253 (L47) and 255 (L36). FIG. 4B also shows other lanes such as L0, L1 through L5, L7 through L35, L37 through L46, and L48 through L53. In addition, FIG. 4B depicts stop lines that denote a position for the vehicles to potentially wait for a particular time period before entering an intersection, for example, stop lines 257 (S1), 259 (S2) and 261 (S3). Furthermore, CTRs 263, 265, 267, 269 are present as controlled traffic lights in some of the intersections.

FIG. 4B additionally illustrates routing information that may be provided by a routing or navigation module for each of the CAVs, for example, for the vehicle 223. For the vehicle 223 in current position 271, and with desired destination 273, a routing or navigation module provides a sequence of roads and turns indicated by arrows 275*a*, 275*b*, 275*c*, 275*d*, 275*e*, 275*f*, 275*g*, 275*h* for the vehicle 223. Similarly, the same or different individual routing or navigation modules can provide the sequence of roads and turns from the current position to the desired destination for other vehicles, for example, for the CAVs 225, 227, and 229. Some embodiments of the disclosure are based on the realization that a relatively short sequence of roads and turns, starting from the current position, may be predicted accurately for one or multiple non-controlled traffic participants, such as the HDVs 231, 233, 235, and 237.

However, it may be noted that each of the sequence of roads and turns 275*a*, 275*b*, 275*c*, 275*d*, 275*e*, 276*f*, 275*g*, 275*h* by itself does not yet specify a motion plan or a path for the vehicle 223. There are a number of discrete decisions to take such as in what lane the vehicle is to drive, if the vehicle should change lane or stay in a current lane, if the vehicle should start decelerating to stop at the stop line or not, if the vehicle is allowed to cross the intersection, and likewise. Furthermore, there are a number of continuous decisions to make, such as timed sequence of positions and orientations that the vehicle should achieve during the predicted travel from its initial position to its destination. Furthermore, it is also necessary to decide behavior of the CTRs which affect operation of both CAVs and HDVs. According to some embodiments, a motion plan, which includes a sequence of one or multiple of the aforementioned discrete and/or continuous decisions along the route from the current position to the desired destination, may be computed by the traffic control system for one or multiple CAVs, for example, the vehicles 223, 225, 227 and 229 and for one or multiple CTRs, e.g., 263, 265, 267, and 269.

FIG. 5 shows a schematic diagram of possible interactions among the hierarchical traffic control system, a mapping and navigation system, one or multiple controlled and human-driven vehicles, road-side units, traffic light controllers, and mobile edge computers, according to some embodiments of the present disclosure. FIG. 5 shows an exemplary diagram 500 of possible interactions between the traffic control system 302, a mapping and navigation system 304, one or multiple CAVs 306, one or multiple HDVs 308, one or multiple RSUs 310, one or multiple traffic light controllers (TLCs) 312, and one or multiple MECs 314. Embodiments of the disclosure are based on the realization that the traffic control system 302 can be implemented efficiently using a hierarchical traffic control architecture that includes a centralized traffic controller (CTC) and one or multiple intersection traffic controllers (ITCs), to compute future control commands for each of the CAVs and for each of the TLCs. The CTC computes a high-level plan based on a macroscopic traffic flow model for the transportation network of multiple interconnected intersections. The one or multiple ITCs executes the high-level plan by computing control commands for the CAVs 306 and TLCs 312 based on a microscopic traffic model, by minimizing the average travel time, wait time, and fuel consumption for all vehicles in the transportation network. Real time information may be communicated via communication interface 331 between the mapping and navigation system 304 and each of the CAVs 306.

In some embodiments, the mapping and navigation system 304 computes real-time routing information for each of the CAVs 306 from a current position to a desired destination or a desired sequence of destinations for each of the CAVs 306. In an example, the mapping and navigation system 304 may be implemented as a centralized system. In another example, the mapping and navigation system 304 may be decentralized by being embedded as part of the CAVs 306. The routing information for each of the CAVs is communicated from the mapping and navigation system 304 to the hierarchical traffic control system 302 and to each of the CAVs 306. Similarly, the mapping and navigation system 304 may receive information either from the hierarchical traffic control system 302 or from each of the CAVs 306. Additionally, real time information may be communicated via communication interface 332 between traffic control system 302 and each of the CAVs 306.

In some embodiments, the hierarchical traffic control system 302 computes a sequence of future traffic light commands for each of the TLCs 312 and a coarse motion plan for each of the CAVs 306 in the transportation network along its route from the current position of the CAV to the desired destination or sequence of desired destinations of the CAV. This motion plan is then communicated from the hierarchical traffic control system 302 to each of the CAVs 306. In another example, the motion plan may be communicated from the hierarchical traffic control system 302 to each of the CAVs 306 indirectly via communication with the one or multiple MECs 314 that provide up to date information from the hierarchical traffic control system to the CAVs 306. Similarly, the sequence of traffic light commands is communicated from the hierarchical traffic control system to each of the TLCs directly 312, or instead indirectly via communication with one or multiple MECs 314 that provide up to date information from the hierarchical traffic control system 302 to the TLCs 312.

In an embodiment, the real time information may be communicated directly to the hierarchical traffic control system 302 from the CAVs 306, HDVs 308, RSUs 310, and TLCs 312. In another embodiment, the real time information may be communicated indirectly via communication interface 301 from the MECs 314. In some embodiments, the MECs 314 may collect real-time information about the state of traffic participants and of the dynamic environment in a local area of the transportation network, by communicating with CAVs 306, HDVs 308, RSUs 310, and TLCs 312 that are currently present in a local area of the transportation network. In some embodiments, the RSUs 310 use additional sensors, for example, distance range finders, radars, lidars, or cameras to accurately detect the state of the vehicles and the dynamic environment, including the CAVs 306, HDVs 308, and other traffic participants such as bicycles or pedestrians. In another embodiment, sensor fusion technology may also be used to accurately detect the state of the vehicles and the dynamic environment. Lastly, real time information may be communicated via communication interface 333 between MECs 314 and each of the CAVs 306, as well as between HDVs 308 and MECs 314 via communication interface 341. Real time information may also be communicated between MECs 314 and RSUs 310 via communication interface 351 as well as between MECs 314 and TLCs 312 via communication interface 361.

Some embodiments are based on the realization that the number of MECs 314, CAVs 306, HDVs 308, RSUs 310, and TLCs 312 may vary at each sampling time step for the hierarchical traffic control system 302. Most importantly, the number of vehicles may vary significantly as traffic participants enter and exit the transportation network in which the hierarchical traffic control system 302 operates. Lastly, real time information may be communicated via communication interface 362 between TLCs 312 and traffic control center 302.

Figure 6A:
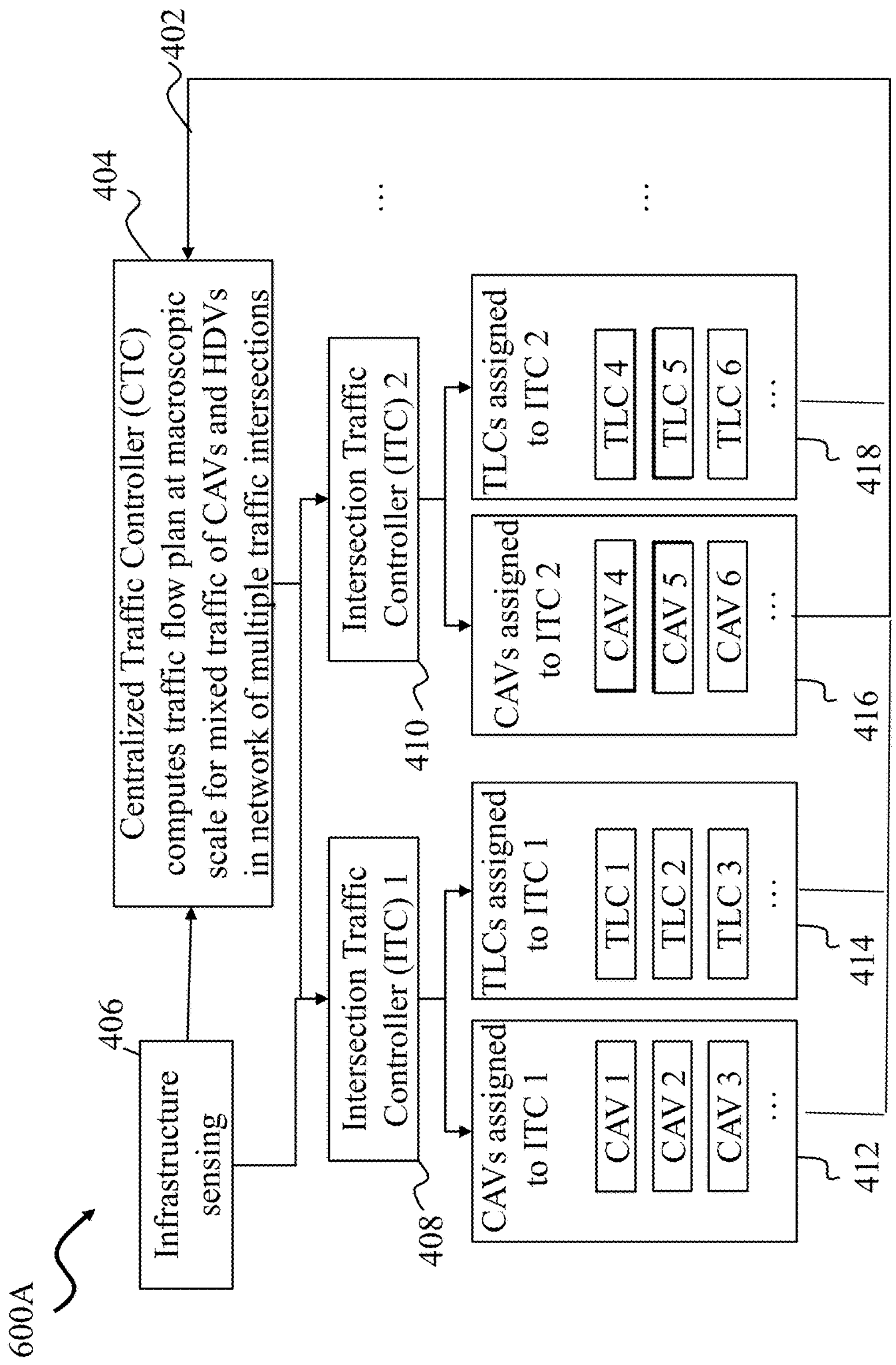
FIG. 6A shows a schematic diagram of a feedback loop for a hierarchical traffic control system in a transportation network, according to some embodiments of the present disclosure.

FIG. 6A shows a schematic diagram of a feedback loop for a hierarchical traffic control system in a transportation network, according to some embodiments of the present disclosure. FIG. 6A shows a schematic diagram of the feedback loop 402 for the hierarchical traffic control system 600A that computes a sequence of future control commands for each of the CAVs 306 and each of the TLCs 312 in the transportation network using real-time information from the infrastructure sensing module 406. The hierarchical traffic control system 600A includes a centralized traffic controller (CTC) 404 that computes a high-level traffic flow plan based on a macroscopic traffic flow model for mixed traffic of the CAVs 306 and the HDVs 308 in the transportation network of multiple interconnected intersections. The hierarchical traffic control system 600A further includes one or multiple intersection traffic controllers (ITCs) 408, 410 that execute the high-level plan based on a microscopic traffic model by computing the control commands for CAVs 306 and the TLCs 312 that are assigned to each of the ITCs 408, 410. In an example, ITC 408 computes the control commands for a group of CAVs 412 and a group of TLCs 414. The group of CAVs 412 and the group of TLCs 414 are assigned to the ITC 408. The group of CAVs 412 may include, but are not limited to, CAV1, CAV2, and CAV3. The ITC 408 directly or indirectly controls the traffic flow in a local area around one or multiple intersections within the transportation network. Similarly, ITC 410 computes the control commands for a group of CAVs 416 and a group of TLCs 418. The group of CAVs 416 and the group of TLCs 418 are assigned to the ITC 410. The group CAVs 416 includes CAV4, CAV5, and CAV6. The group of TLCs 418 includes TLC4, TLC5, and TLC6. The ITC 410 directly or indirectly controls the traffic flow in a local area around one or multiple intersections within the transportation network.

In an embodiment, the CTC 404 performs one more computation. The computations in the CTC 404 include the solution of a convex optimization problem subject to a macroscopic traffic flow model for the entire transportation network of multiple interconnected intersections and subject to a convex relaxation of mixed-integer constraints that enforce each of the multiple traffic rules. In an example, the convex relaxation of the mixed-integer constraints that enforce each of the multiple traffic rules may include, but are not limited to, a convex relaxation of mixed-integer constraints for vehicles crossing each of the intersections or for the switching behavior of the traffic lights. In an embodiment, the macroscopic traffic flow model defines a high-level approximate representation of the traffic flow in the transportation network, where modeling of the behavior for individual vehicles is omitted and instead the general behavior of vehicles at the level of the transportation network is modeled using traffic flow values, density values and mean speed values of traffic streams. Some embodiments are based on the realization that the use of the macroscopic traffic flow model in combination with the convex relaxation of multiple mixed-integer traffic constraints allows the efficient computation of a high-level traffic flow plan for the entire transportation network of multiple interconnected intersections by the CTC 404. The operations performed for the efficient computation of a high-level traffic flow plan for the entire transportation network are explained in detail with reference to FIG. 7.

In some embodiments of the disclosure, computations in each of the ITCs 408, 410 include the solution of a mixed-integer programming (MIP) problem subject to a microscopic traffic flow model for a local area around one or multiple intersections within the transportation network and subject to mixed-integer constraints that enforce each of the multiple traffic rules within the network. In an example, the mixed-integer constraints that enforce each of the multiple traffic rules within the network includes mixed-integer constraints for vehicles crossing each of the intersections, collision avoidance constraints, mixed-integer constraints for the switching behavior of the traffic lights. In an embodiment, the microscopic traffic flow model is a detailed representation of the traffic flow in the transportation network that includes modeling the behavior of each individual vehicle, using a motion model to control and predict the behavior of CAVs and a switched dynamical model to predict the behavior of HDVs and to predict their reactions to the CAVs and to the changing traffic lights. Some embodiments of the disclosure are based on the realization that the use of a microscopic traffic flow model in a restricted local area around one or multiple intersections within the transportation network, for each of the ITCs 408, 410, allows the efficient computation of a low-level motion plan and a sequence of future control commands for each CAV in the groups of CAVs 412, 416 and each TLC in the groups of TLCs 414, 418, by minimizing the average travel time, wait time, and fuel consumption for all vehicles in the local area of the transportation network that is assigned to the ITC 408, 410.

In an embodiment, one particular ITC may be assigned to a set of CAVs and a set of TLCs which are inside a local area around one particular traffic intersection and having that particular ITC within the transportation network of multiple interconnected intersections. In an example, the group of CAVs 412 and the group of TLCs 414 are assigned to the ITC 408 if the group of CAVs 412 and the group of TLCs 414 are inside the local area around the traffic intersection belonging to the ITC 408. Similarly, the group of CAVs 416 and the group of TLCs 418 are assigned to the ITC 410 if the group of CAVs 416 and the group of TLCs 418 are inside the local area around the traffic intersection belonging to the ITC 410. This results in a total number of ITCs that is equal to the number of traffic intersections in the network. In other embodiments, each ITC may be assigned to a local area around a group of multiple traffic intersections within the transportation network. For example, in some embodiments of the disclosure, traffic intersections within the transportation network may be divided into disjoint subsets of traffic intersections, and the CAVs and TLCs in each of these subsets can be controlled by one ITC. This results in a total number of ITCs that is less than the number of traffic intersections.

In some embodiments, both the computations in the CTC 404 and the computations in each of the ITCs 408, 410 are performed in real time in order to account for the dynamically changing traffic situation in the transportation network. In an example, the sampling period for the CTC 404 may be the same or different from the sampling period for each of the ITCs 408, 410. For example, in some embodiments, the sampling period for both the CTC 404 and for each of the ITCs 408, 410 may be set equal to 1 second, which means that the CTC 404 computes a new traffic flow plan every second and each of the ITCs 408, 410 individually computes new control commands for their respective CAVs and TLCs every second. In some embodiments of the disclosure, the sampling period for the CTC 404 can be longer than the sampling period for each of the ITCs 408, 410. For example, in some embodiments, the sampling period for the CTC 404 may be in a range of 1-2 seconds and the sampling period for each of the ITCs 408, 410 may be in a range of 0.5-1 seconds.

In an embodiment, the CTC 404 predicts, in the macroscopic traffic model, a number of external vehicles entering the transportation network from each of in-flow directions at each time step in a prediction time window, based on historical data that is collected for a similar transportation network during a time period in the past similar to the prediction time window. In another embodiment, the CTC 404 computes at least one of values for each pair of the road segment and a traffic flow maneuver in the transportation network for the prediction time window based on historical data that is collected for a similar transportation network during a time period in the past similar to the prediction time window.

In some embodiments, the convex optimization problem in the CTC 404 is a convex linear programming (LP), including a linear objective, linear equality constraints and linear inequality constraints, or a convex quadratic programming (QP) problem, including a linear-quadratic objective, linear equality constraints and linear inequality constraints. Examples of optimization algorithms to efficiently solve the convex LPs or convex QPs may include, but are not limited to, active-set methods, interior point methods, projected gradient methods, operator splitting methods, or the alternating direction method of multipliers (ADMM).

In some embodiments, the MIP problem in each of the ITCs is a mixed-integer linear programming (MILP) or a mixed-integer quadratic programming (MIQP) problem. Some embodiments of the disclosure are based on the realization that the MILPs or MIQPs may be solved efficiently if they are formulated as mixed-integer convex programming (MICP) problems. In other words, the MILPs or MIQPs may be solved efficiently if the optimization problem becomes convex when relaxing each of the integer feasibility constraints. For example, the MILP becomes a convex LP or the MIQP becomes a convex QP when relaxing the integer feasibility constraints. Examples of efficient optimization algorithms for the solution of the MICPs include, but are not limited to, branch-and-bound, branch-and-cut and branch-and-price methods.

A set of values is convex if for any two points in the set, points on a line segment joining the two points lies entirely within the set. Particularly, a set $C \in R^n$ is deemed as a convex set if for any two points $x_1$ and $x_2$ in C and any scalar $$\lambda x_1 + (1-\lambda)x_2 \in R^n \tag{1}$$

wherein, $\lambda \in [0,1]$.

A function f: C→R is said to be convex if for any $x_1$, $x_2$ $\in C$ and $\lambda \in [0,1]$relation (2) is satisfied:

$$f(\lambda x_1 + (1-\lambda)x_2) \leq \lambda f(x_1) + (1-\lambda) f(x_2) \tag{2}$$

The relation (2) implies that any point, on the line segment joining two points on a convex function, lies above the value of the function at that point.

If $C \subseteq R^n$ is a nonempty convex set and f: C→R be a convex function then a convex programming problem is defined as min f(x) such that $x \in C$. Property of the convex function may include that every local minimum of the convex function is a global minimum and set of all optimal solutions to a convex programming problem form a convex set.

The convex programming problem may be modified such that inequality or equality are added to it. If $C \subseteq R^n$ is a nonempty convex set and f: C→R be a convex function then a constrained convex programming problem is defined as min f(x) such that $h_i(x) \leq 0$, wherein h is a convex function and i=1 to m. $e_j(x=0$, wherein $e(x)=a^T+b$ and therefore convex and j=1 to n. Solutions to h(x) and e(x) i.e. the constraints to the convex function f(x), are also convex sets.

In some embodiments, heuristic search techniques may be used in the CTC 404 and in each of the ITCs 408, 410 to compute a feasible but possibly suboptimal solution to the MICP, for example, including rounding schemes, a feasibility pumping method, approximate optimization algorithms, or the use of deep learning or supervised learning. For example, in some embodiments, a deep neural network may be used to predict the optimal values for each of the binary or integer optimization variables in the CTC 404 or in each of the ITCs 408, 410, resulting in the solution of one or multiple convex programming (CP) problems after fixing each of the binary or integer optimization variables.

Figure 6B:
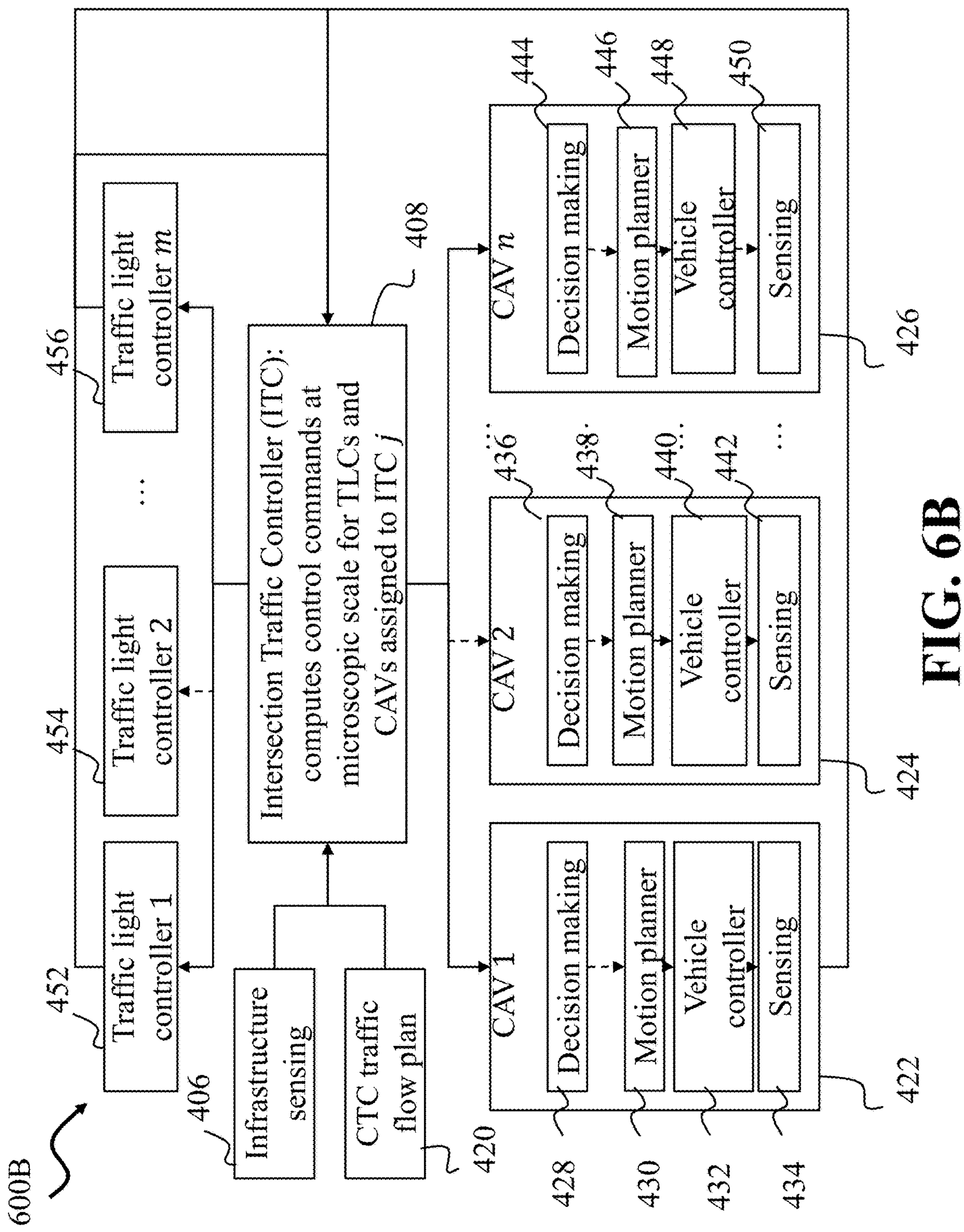
FIG. 6B shows a schematic diagram of a feedback loop for one intersection traffic controller (ITC) of a hierarchical traffic control system in a transportation network, according to some embodiments of the present disclosure.

FIG. 6B shows a schematic diagram of a feedback loop for one ITC of a hierarchical traffic control system, according to some embodiments of the present disclosure. FIG. 6B shows an example schematic diagram 600B of the feedback loop for the ITC 408, which is one of the multiple ITCs 408, 410 in the hierarchical traffic control system 600A. The ITC 408 computes a sequence of future control commands for each CAV of the group of CAVs 412 and a sequence of future control commands for each TLC of the group of TLCs 414 that are assigned to the individual ITC 408 in a local neighborhood of the transportation network, using the real-time information from the infrastructure sensing module 406 and a high-level traffic flow plan 420 from the CTC 404. The group of CAVs 412 may include CAVs 422, 424, 426. The group of TLCs 414 may include TLCs 452, 454, 456. In some embodiments, the ITC 408 computes a solution of an MIP subject to a microscopic traffic flow model for a local area around one or multiple traffic intersections within the transportation network and subject to mixed-integer constraints that enforce each of the multiple traffic rules within the network, for example, including mixed-integer constraints for vehicles crossing each of the intersections, for collision avoidance constraints and for the switching behavior of the traffic lights.

At each control time step, given the current sensing information from the infrastructure sensing module 406 and the current CTC traffic flow plan 420, the ITC 408 computes a sequence of future control commands at microscopic scale and these control commands are sent to each of the TLCs 452, 454, 456 and to each of the CAVs 422, 424, 426. In some embodiments, each of the TLCs 452, 454, 456 control one or multiple traffic light signals for one traffic intersection in the transportation network. For example, in some embodiments, the TLC 452 controls the timing of one traffic light signal for a particular crossing direction of one traffic intersection. In other embodiments of the disclosure, the TLC 454 controls the timing of multiple traffic light signals for the multiple crossing directions of one traffic intersection in the transportation network.

Some embodiments are based on the realization that planning and control for (semi-)automated driving may be implemented effectively using a multi-layer guidance and control architecture, typically implemented on board of each individual vehicle, including one or multiple layers of algorithms and technologies for decision making, motion planning, vehicle control or estimation. In some embodiments, a multi-layer guidance and control architecture is used in each of the CAVs 422, 424, 426 to execute the sequence of future control commands that is computed by the ITC 408, given real-time information from the infrastructure sensing 406, given the CTC traffic flow plan 420 and given real-time information from one or multiple on-board sensors 434, 442, 450 of each individual CAVs 422, 424, 426.

In an example, the CAVs 422, 424, 426 includes decision making layers 428, 436, 444, motion planners or motion planning algorithms 430, 438, 446, vehicle controllers 432, 440, 448, and one or multiple on-board sensors 434, 440, 448 respectively. The decision-making layer 428 for the CAV 422 selects the appropriate driving behavior at any point of time, given the motion plan from the ITC 408, the current environment condition, the behavior of other traffic participants, for example, using automata combined with set reachability or formal languages and optimization for vehicle decision making. Given the target behavior from the decision making layer 428, including either lane following, lane changing or stopping, the motion planning algorithm 430 computes a dynamically feasible and safe motion trajectory that can be tracked in real-time by a low-level vehicle controller 432. Real-time sensor fusion and estimation using on-board and infrastructure sensing information may be performed in each vehicle, for example the CAVs 422, 424, 426, in order to provide feedback to the higher-level algorithms for decision making, motion planning and control. A similar, but potentially different, multi-layer guidance and control architecture may be used for (semi-) automated driving in one or multiple CAVs in the transportation network.

In an example, an approach for (semi-)automated driving uses the combination of a finite-state machine (FSM) for decision making in the decision making layers 428, 436, 444, a sampling-based motion planning algorithm in the motion planners 430, 438, 446, and a model predictive control (MPC) algorithm for reference trajectory tracking in the vehicle controllers 432, 440, 448. One example of an algorithm for sampling-based motion planning uses probabilistic particle filtering to sample the input space and adds an additional correction term based on one or multiple driving requirements. One example of a predictive algorithm for vehicle control uses one or multiple iterations of a sequential quadratic programming (SQP) method to solve a linear time-varying or nonlinear MPC problem in real time. Some embodiments are based on the realization that the use of predictive algorithms for motion planning and reference tracking control for (semi-)automated driving can more effectively benefit from the predictive information in the motion plan that is computed by the hierarchical traffic control system 600A. Examples of algorithms for sensor fusion and estimation are based on, but not limited to, moving horizon estimation (MHE), extended or linear-regression Kalman filtering, or particle filtering.

In some embodiments, the different components of the multi-layer guidance and control architecture 428, 430, 432, 434 may be implemented on board of each controlled vehicle such as the CAV 422, while other modules such as the hierarchical traffic control system 600A, the mapping and navigation system 304, and some or all of the sensor fusion technologies for the infrastructure sensing 406 may be implemented in the infrastructure such as the cloud network 118 or the one or multiple MECs 314, in order to provide decisions or feedback information to multiple connected vehicles in the transportation network.

In some embodiments of the disclosure, the infrastructure sensing 406 corresponds to the one or more RSUs, such as the RSUs 122, 124 that include one or multiple sensors, for example, distance range finders, radars, lidars, or cameras, as well as sensor fusion technologies in order to accurately detect the state of the vehicles and the dynamic environment in the transportation network, including both connected and non-connected vehicles, autonomous, semi-autonomous and manually operated vehicles and other traffic participants such as bicycles and pedestrians.

Some embodiments are based on the realization that safety constraints with respect to other dynamic traffic participants such as vehicles, bicycles, or pedestrians, may be handled by obstacle avoidance techniques in on-board modules of the multi-layer guidance and control architecture for each CAV. The obstacle avoidance techniques may be implemented by, for example, the motion planning or the vehicle control algorithm. Due to their relatively smaller computational cost, compared to that for the hierarchical traffic control system 600A, the motion planning and vehicle control algorithms may be run at a relatively fast sampling rate in order to have a fast reaction time to unexpected changes in the dynamic behavior of other vehicles or the other traffic participants. For example, real-time vehicle control algorithms are typically executed with an update period of 50-100 milliseconds but, in some embodiments of the disclosure, the sampling period for the CTC 404 can be equal to 1-2 seconds and the sampling period for each of the ITCs 408, 410 may be equal to 0.5-1 seconds.

Some embodiments are based on the realization that a different vehicle motion model, with a different modeling accuracy or a different computational complexity, may be used by one or multiple of the components in the architecture as illustrated by FIG. 6B. Some embodiments are based on the realization that a vehicle motion model with a higher modeling accuracy, and possibly with a higher computational complexity, may be used by the components in the lower levels of the multi-layer guidance and control architecture as depicted in FIG. 6B. For example, a relatively simple and linear kinematic model may be used in the hierarchical traffic control system 600A or in the navigation module such as the RSUs 310, while a higher-dimensional or nonlinear kinematic model may be used to describe the motion of the vehicle in the decision maker 428, 436, 444, the motion planner 430, 438, 446, the vehicle controller 432, 440, 448, or the on-board sensors 434, 442, 450 for each individual vehicle 422, 424, and 426.

Alternatively, one or multiple of the lower levels of the multi-layer guidance and control architecture could use a higher-dimensional or nonlinear dynamic model to describe the motion of the vehicle based on force-torque balances, for example, in a nonlinear MPC-based vehicle controller. In an example, a single-track nonlinear vehicle model may be used in an MPC-based vehicle controller for which the state is described by the two-dimensional position, the longitudinal and lateral velocities, the yaw angle and yaw rate of the vehicle. The single-track vehicle model lumps together the left and right wheel on each axle. In some embodiments, a vehicle model with an even higher modeling accuracy and computational complexity may be used. For example, the vehicle model with higher modeling accuracy may be based on a double-track vehicle model such that the longitudinal and lateral load transfer between the four wheels of the vehicle could be accurately modeled. In some embodiments, the nonlinear relation between the longitudinal and lateral tire-friction forces and the slip ratios and slip angles may be modeled using Pacejka's magic formula, which exhibits the typical saturation behavior in the tire forces. Under combined slip conditions, the coupling between longitudinal and lateral tire forces can be modeled using a friction ellipse or using weighting functions.

Figure 6C:
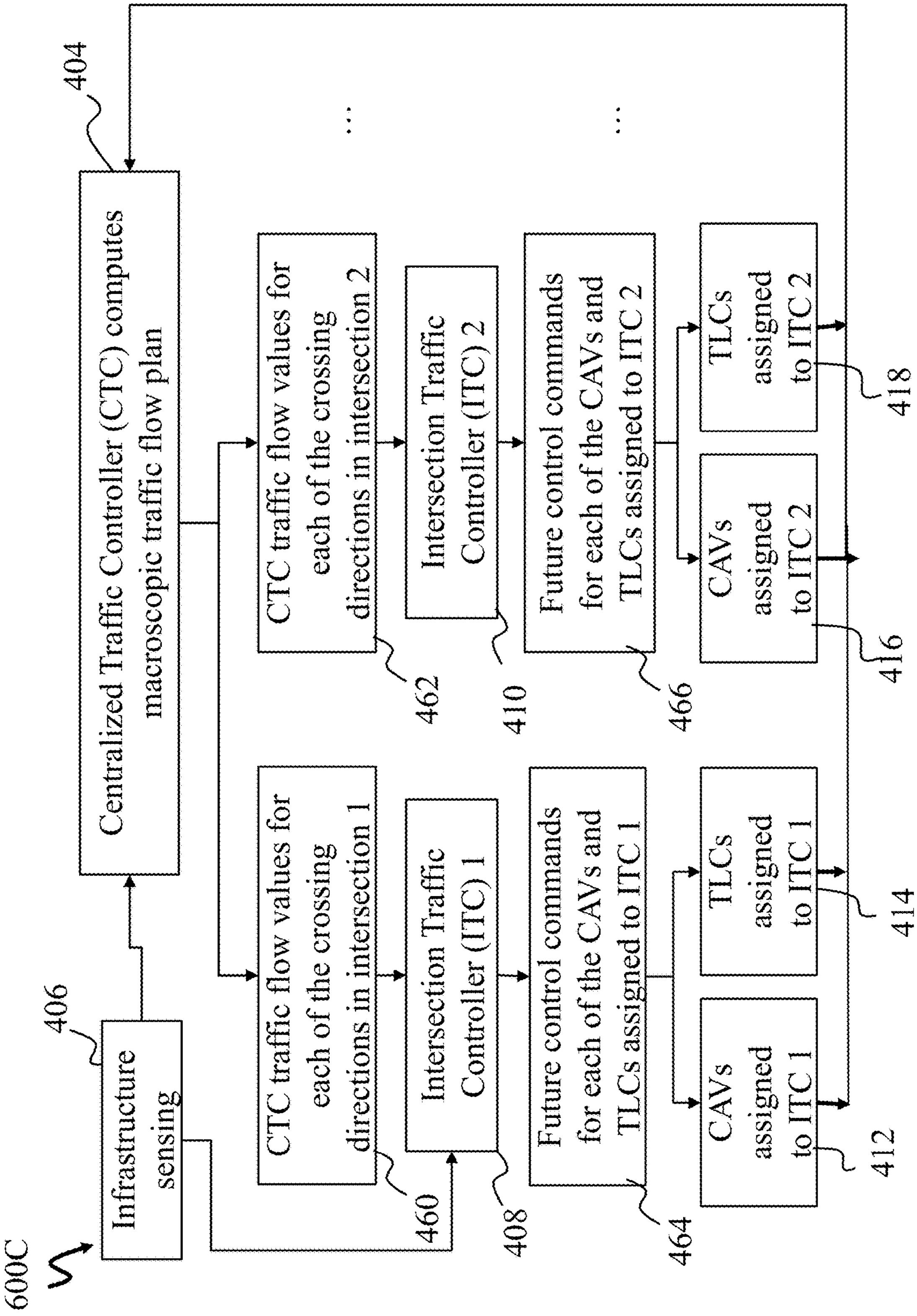
FIG. 6C shows a schematic diagram of a feedback loop for a hierarchical traffic control system in a transportation network, according to some embodiments of the present disclosure.

FIG. 6C shows a schematic diagram of a feedback loop for a hierarchical traffic control system in a transportation network, according to some embodiments of the present disclosure. FIG. 6C shows an example schematic diagram 600C of the feedback loop for the hierarchical traffic control system 600A that computes a sequence of future control commands for each of the CAVs and each of the TLCs in the transportation network, given real-time information from the infrastructure sensing module 406. The hierarchical traffic control system 600A includes the CTC 404 that computes a high-level macroscopic traffic flow plan. The hierarchical traffic control system 600A further includes the one or multiple ITCs 408, 410 that execute the high-level plan based on the microscopic traffic model by computing the control commands for CAVs such as the groups of CAVs 412, 416 and TLCs such as the groups of TLCs 414, 418 that are assigned to each of the ITCs 408, 410. For example, the group of CAVs 412 and the group of TLCs 414 are assigned to the ITC 408. The group of CAVs 416 and the group of TLCs 418 are assigned to the ITC 410.

For example, ITC 408 computes the future control commands 464 for the group of CAVs 412 and for the group of TLCs 414 that are assigned to the ITC 408, given real-time information from the infrastructure sensing 406 and given the CTC traffic flow values 460 for each of the crossing directions of one or multiple intersections that are assigned to the ITC 408 within the transportation network. Similarly, a different such as the ITC 410 computes the future control commands 466 for the group of CAVs 416 and the group of TLCs 418 that are assigned to the ITC 410, given real-time information from the infrastructure sensing 406 and given the CTC traffic flow values 462 for each of the crossing directions of one or multiple intersections that are assigned to the ITC 410 within the transportation network.

Figure 7:
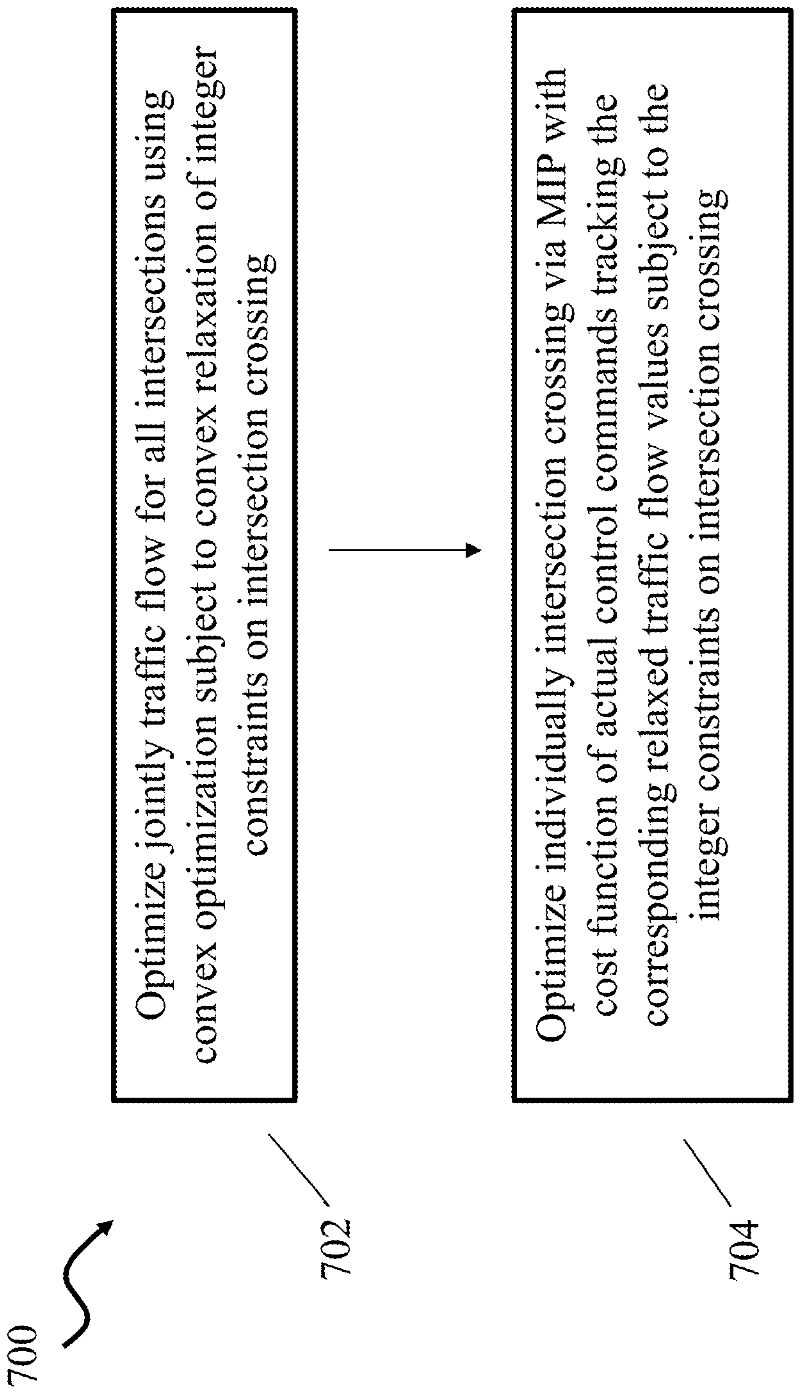
FIG. 7 is a diagram that illustrates exemplary operations for hierarchical optimization-based traffic control of controlled and non-controlled vehicles, in accordance with an embodiment of the disclosure.

FIG. 7 is a diagram that illustrates exemplary operations for hierarchical optimization-based traffic control of controlled and non-controlled vehicles, in accordance with an embodiment of the disclosure. FIG. 7 is explained in conjunction with elements from FIG. 5, 6A, 6B, and 6C. With reference to FIG. 7, there is shown a block diagram 700 that illustrates exemplary operations 702 and 704, as described herein.

The hierarchical traffic control system 600A divides the method of controlling the CAVs and the HDVs broadly in two steps 702 and 704. However, in certain embodiments, such discrete operations may be further divided into additional operations, combined into fewer operations, or eliminated, depending on the particular implementation without detracting from the essence of the disclosed embodiments.

At 702, the traffic flows are jointly optimized for all intersections using the convex optimization subject to the convex relaxation of the integer constraints on the multiple interconnected intersections. In an embodiment, the CTC 404 of the hierarchical traffic control system 600A computes the high-level traffic flow plan based on the macroscopic traffic flow model for the mixed traffic of the CAVs and the HDVs. In an embodiment, the optimization of the traffic flows includes optimization of traffic flow values, for example, the CTC traffic flow values 460 or 462 associated with ITCs 408 or 410 as illustrated in FIG. 6C. The convex optimization of the integer constraints is a problem where all of the constraints are convex functions, and the objective is a convex function if minimizing, or a concave function if maximizing. In general, relaxation denotes a technique of simply dropping certain constraints from the optimization problem. Specifically, convex relaxation means that upon relaxation the problem becomes convex. In an embodiment, the convex relaxation of the integer constraints that enforce multiple traffic rules includes the convex relaxation of the integer constraints for vehicles crossing each of the intersections and for the switching behavior of the traffic lights. The use of the macroscopic traffic flow model in combination with the convex relaxation of the integer constraints that enforce multiple traffic rules allows the efficient computation of a high-level traffic flow plan for the entire transportation network of the multiple interconnected intersections by the CTC 404. In an example, the convex relaxation of the traffic flow values 460 or 462 associated with ITCs 408 or 410 results in relaxed traffic flow values. Details of the relaxed approximations of the pure integer values due to the convex relaxation of the integer constraints that enforce the hybrid dynamical behavior of vehicles will be explained further, for example, with reference to FIG. 8C.

At 704, a cost function of the MIP problem in each of the ITCs is optimized with respect to the relaxed traffic flow values from the CTC 404 and subject to the integer constraints to produce values of the control commands changing the states of each of the CAVs associated with an intersection and values of the control commands changing the states of each of the traffic signs associated with the intersection.

Figure 8A:
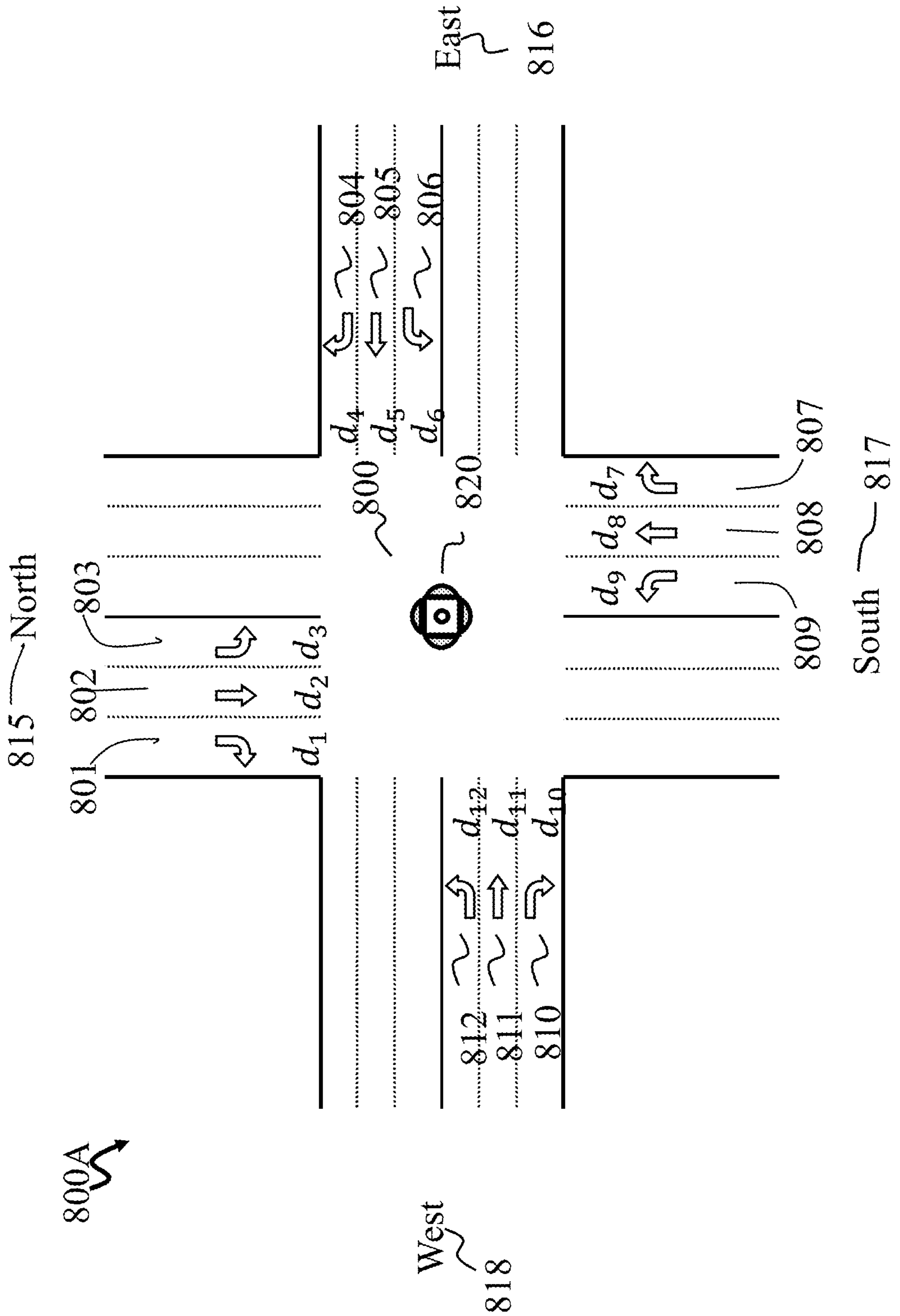
FIG. 8A shows an example scenario diagram of a four-way traffic intersection within a transportation network that is controlled by a hierarchical traffic control system, according to some embodiments of the present disclosure.

FIG. 8A shows an example scenario diagram of a four-way traffic intersection within a transportation network that is controlled by a hierarchical traffic control system, according to some embodiments of the present disclosure. FIG. 8A illustrates an example scenario diagram 800A of a traffic intersection 800 within a transportation network that is controlled by the hierarchical traffic control system 600A by computing a sequence of future control commands for each of the CAVs and for each of the TLCs such as the TLC 820 as illustrated in FIG. 8A. More specifically, FIG. 8A shows a 4-way traffic intersection where vehicles, including both CAVs and HDVs, may arrive either from North 815, East 816, South 817, or West 818 direction and each vehicle may travel through the traffic intersection 800 in one of multiple crossing directions. For example, arriving from one of the four entry directions, including North 815, East 816, South

817 and West 818, a vehicle may make a right turn, drive straight, or make a left turn and this results in twelve crossing directions for each traffic intersection.

A vehicle arriving from the North 815 may make a right turn resulting in crossing direction $d_1$ 801, the vehicle may drive straight resulting in crossing direction $d_2$ 802 or it can make a left turn resulting in crossing direction $d_3$ 803. A vehicle arriving from the East 816 may make a right turn resulting in crossing direction $d_4$ 804, the vehicle may drive straight resulting in crossing direction $d_5$ 805 or it can make a left turn resulting in crossing direction $d_6$ 806. A vehicle arriving from the South 817 may make a right turn resulting in crossing direction $d_7$ 807, the vehicle can drive straight resulting in crossing direction $d_8$ 808 or it can make a left turn resulting in crossing direction $d_9$ 809. A vehicle arriving from the West 818 can make a right turn resulting in crossing direction $d_{10}$ 810, the vehicle can drive straight resulting in crossing direction $d_{11}$ 811 or it can make a left turn resulting in crossing direction $d_1$a 812.

In some embodiments, the TLC 820 decides if and when to switch one or multiple traffic light signal values, for example, switching from green to red or from red to green in order to avoid collisions and to reduce traffic congestion and fuel consumption. Traffic participants are allowed to cross an intersection in a particular crossing direction if the traffic light signal is green for the crossing direction, but they need to stop and wait if the traffic light signal is red for the desired crossing direction. Some embodiments are based on the realization that multiple collision-free states exist for the traffic light signals of an intersection, i.e., the current state of the traffic light signals is equal to one of multiple collision-free states at each time step, in order to allow for the traffic light signals of an intersection to be either red or green for one or multiple crossing directions at each time step while avoiding collisions between vehicles arriving at the traffic intersection from different directions.

FIG. 8B illustrates an example of a mapping between multiple collision-free states of the traffic light signals and traffic light signal values for each of crossing directions of a traffic intersection within a transportation network that is controlled by a hierarchical traffic control system, according to some embodiments of the present disclosure. FIG. 8B illustrates an example of a mapping 830 between multiple collision-free states of the traffic light signals 821-829 and the traffic light signal values for each of the crossing directions 801-812 of the traffic intersection within the transportation network that is controlled by the hierarchical traffic control system 600A. For example, if the current state of the traffic light signals of an intersection is equal to a collision-free state 821, then the traffic light signal values are red for each of the crossing directions. In the collision-free state 821, no traffic participants are allowed to cross the intersection in any of the directions. If the current state of the traffic light signals of an intersection is equal to a collision-free state 822, then the traffic light signal values are green for crossing directions $d_4$ 804, $d_s$ 805, $d_{10}$ 810, and $d_{11}$ 811, and the traffic light signal values are red for all other crossing directions. In the collision-free state 822, traffic participants are allowed to cross the intersection only in the crossing directions $d_4$ 804, $d_s$ 805, $d_{10}$ 810, and $d_{11}$ 811. Similarly, traffic participants are allowed to cross the intersection only in the crossing directions $d_1$ 801, $d_2$ 802, $d_3$ 803, and $d_4$ 804 when the current state of the traffic light signals of an intersection is equal to a collision-free state 829.

Some embodiments of the disclosure are based on the realization that the traffic light state 822 is collision-free because no collisions can happen between vehicles traveling from East 816, via crossing directions $d_4$ 804 or $d_5$ 805, and vehicles traveling from West 818 via crossing directions $d_{10}$ 810 or $d_{11}$ 811. For example, a traffic light state 828 is collision-free because no collisions can happen between vehicles traveling from South 817, via crossing directions $d_7$ 807, $d_8$ 808 or $d_9$ 809, and vehicles traveling from West 818 via crossing direction $d_{10}$ 810. Similarly, a traffic light state 824 is collision-free because no collisions can happen between vehicles traveling from North 815, via crossing directions $d_1$ 801 or $d_2$ 802, and vehicles traveling from South 817 via crossing direction $d_7$ 807 or $d_8$ 808.

FIG. 8C illustrates an example of a traffic flow plan computed by a central traffic coordinator (CTC) using a table of traffic flow values for each of the crossing directions of a traffic intersection within a transportation network that is controlled by a hierarchical traffic control system, according to some embodiments of the present disclosure. FIG. 8C shows an example of a CTC traffic flow plan 800C that is computed by a CTC 404 in the hierarchical traffic control system 600A, and the CTC flow plan 800C is represented in FIG. 8C as a table 840 of traffic flow values for each of the crossing directions 801-812. In some embodiments, the CTC traffic flow plan 800C consists of traffic flow values at future time steps 841-844 that satisfy relaxed traffic flow constraints over a prediction horizon for each of the crossing directions 801-812 of one or multiple traffic intersections of the transportation network. Some embodiments of the disclosure are based on the realization that such relaxed traffic flow values 840 may be computed by the CTC 404 by solving the convex optimization problem subject to the macroscopic traffic flow model for the entire transportation network of multiple interconnected intersections and subject to a convex relaxation of mixed-integer constraints that enforce each of the multiple traffic rules over the prediction horizon of the CTC 404, for example, including a convex relaxation of mixed-integer constraints for vehicles crossing each of the intersections and for the switching behavior of the traffic lights or including a convex relaxation of mixed-integer constraints that enforce the discrete collision-free states for the traffic light signals of each traffic intersection as illustrated in FIG. 8B.

In some embodiments, the traffic flow values 840 are real-valued relaxed approximations of pure integer values. The pure integer values are relaxed based on a convex relaxation of the mixed-integer constraints that enforce the hybrid dynamical behavior of vehicles crossing one or multiple of the traffic intersections. For example, in FIG. 8C, the future CTC traffic flow values at a time step 841 are real-valued control values that represent 2.3 vehicles crossing a traffic intersection in crossing direction $d_1$ 801, 1.0 vehicles crossing in direction $d_2$ 802, and 0.7 vehicles crossing in direction $d_3$ 803. At a time step 842, the future CTC traffic flow values 840 represent 1.1 vehicles crossing a traffic intersection in crossing direction $d_1$ 801, 1.5 vehicles crossing in direction $d_2$ 802, and 1.4 vehicles crossing in direction $d_3$ 803. Similarly, at a time step 843, the future CTC traffic flow values 840 represent 0.3 vehicles crossing a traffic intersection in crossing direction $d_1$ 801, 1.2 vehicles crossing in direction $d_2$ 802, 0.8 vehicles crossing in direction $d_7$ 807, and 1.7 vehicles crossing in direction $d_8$ 808.

In some embodiments of the disclosure, the CTC traffic flow values 840 satisfy a macroscopic traffic flow model and they satisfy a convex relaxation of one or multiple mixed-integer constraints that enforce each of the multiple traffic rules for the entire transportation network of one or multiple interconnected traffic intersections. In some embodiments, the summation of CTC traffic flow values 840 is not allowed to exceed a maximum capacity limit at each time step and for each traffic intersection in the transportation network. Similarly, the CTC traffic flow values 840 are not allowed to exceed the number of vehicles arriving at the traffic intersection that are predicted to cross the traffic intersection in that particular crossing direction. For example, given the future CTC traffic flow values 840 in FIG. 8C, a total of 2.3+1.0+0.7=4 vehicles are crossing the traffic intersection at the time step 841, after arriving at the traffic intersection from the North 815 direction.

Figure 9:
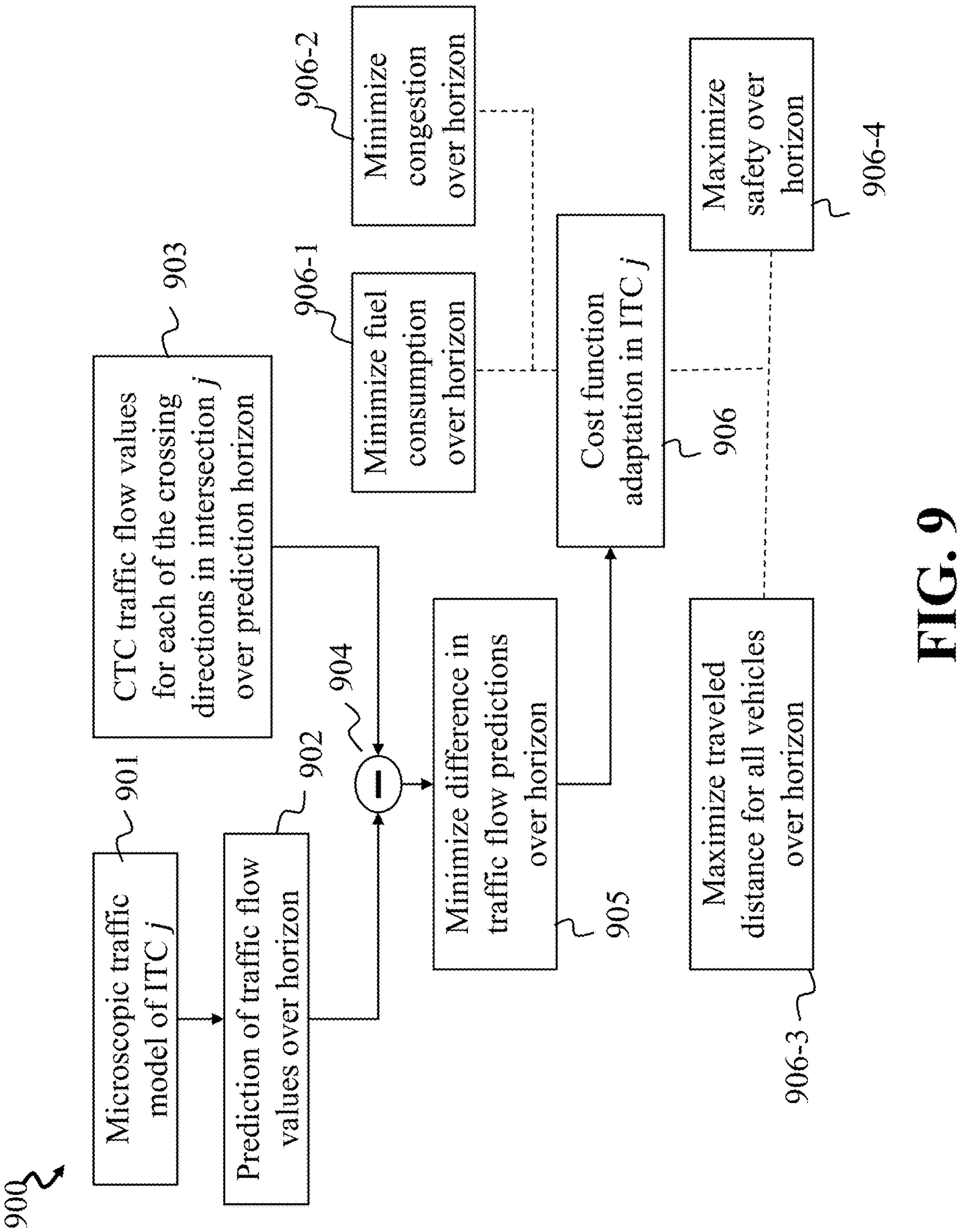
FIG. 9 shows an exemplary cost function adaptation method for a hierarchical traffic control system, according to some embodiments of the present disclosure.

FIG. 9 shows an exemplary cost function adaptation method for a hierarchical traffic control system, according to some embodiments of the present disclosure. The cost adaptation method 900 is based on traffic flow values that are computed by the CTC 404 to adapt a cost function that is minimized by the constrained optimization problem that is solved in the one or multiple ITCs such as the ITC 408, 410 of the hierarchical traffic control system 600A. The steps identified in FIG. 9, and the order thereof, are exemplary and may include various alternatives, equivalents, or derivations thereof including but not limited to the order of execution of the same. The steps of the method of FIG. 9, and its various alternatives, may be embodied in hardware or software including a computer-readable storage medium (e.g., optical disc, memory card, or hard drive) including instructions executable by a processor included in the hierarchical traffic control system 600A.

At 901, a microscopic traffic model of an ITC, such as the ITC 408 as illustrated in FIG. 6A, may be obtained from the database 108 or, in some embodiment, may be calculated. More specifically, the future CTC traffic flow values over a prediction time horizon for each of the crossing directions of a traffic intersection, in combination with the microscopic traffic model of the ITC 408, may be used in the hierarchical traffic control system 600A to adapt the cost function of the constrained optimization problem that is solved by the ITC 408.

At 902, the microscopic traffic model of the ITC 408 may be used to compute a prediction of future traffic flow values over a prediction time horizon.

At 903, future CTC traffic values may be calculated by the CTC 404 of the hierarchical traffic control system such as the hierarchical traffic control system 600A as illustrated in FIG. 6A.

At 904, a tracking error is calculated between the future traffic flow prediction values calculated at step 902 and the future CTC traffic flow values calculated at step 903. In an embodiment, the optimal traffic flow probability values of the CTC 404 are used in the ITC 408 to minimize the tracking error between the future traffic flow prediction values calculated at step 902 and the future CTC traffic flow values calculated at step 903 over a prediction time horizon of the ITCs for each crossing direction of the multiple intersections At 905, the tracking error calculated at step 904 is minimized over the prediction time horizon in the cost function of the ITC 408. Some embodiments of the disclosure are based on the realization that the minimization of the difference in traffic flow predictions may be computed using a least squares tracking error, between the predicted traffic flow values calculated at 902 and the reference CTC traffic flow values calculated at 903, in the cost function adaptation method 900 of the hierarchical traffic control system 600A. In some embodiments, the cost function of the constrained optimization problem that is solved in each of the ITCs 408, 410 includes one or multiple additional terms, for example, minimization of fuel consumption 906-1, minimization of traffic congestion 906-2, maximization of traveled distance for one or multiple vehicles 906-3, and maximization of safety for one or multiple vehicles 906-4 in a local neighborhood of the transportation network over the prediction time horizon.

At 906, adaptation of the cost function of the constrained optimization problem that is solved by the ITC 408 is performed. The cost function adaptation method 900 is based on a direct policy mapping from the CTC traffic flow values calculated at step 905 and from the real-time information of the infrastructure sensing 406 to one or multiple parameter values in the cost function of the ITC 408. In an example, the one or multiple parameter values may include one or multiple weight values that quantify the penalization of higher traffic flow values in one or multiple crossing directions for each of the traffic intersections of the transportation network. In some embodiments, the direct policy mapping can be implemented using a deep neural network architecture, for example, using reinforcement learning (RL) to directly maximize a reward function for reducing congestion, travel time, emissions and energy consumption in the transportation network. For example, in some embodiments of the disclosure, the CTC 404 is implemented by training an RL policy based on model-free or model-based RL techniques. In other embodiments, the policy mapping may be implemented using a deep neural network architecture, based on imitation learning that aims to approximate expert or heuristic solutions.

A deep neural network architecture may be based on one or multiple layers that include one or multiple feedforward neural networks, recurrent neural networks (RNNs), convolutional neural networks (CNNs), long short-term memory (LSTM) networks, or gated recurrent units (GRUs).

Figure 10A:
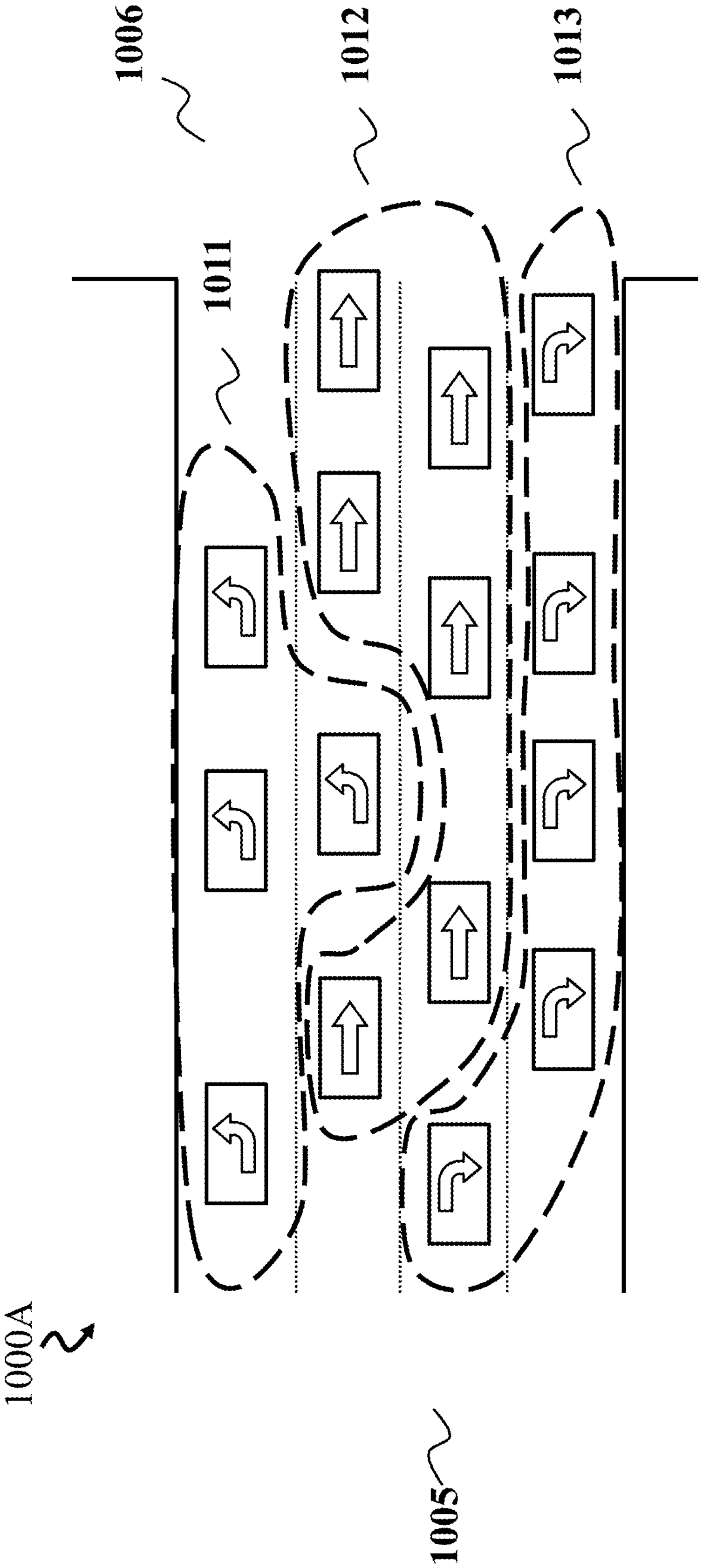
FIG. 10A illustrates an example of a multi-lane road segment in a transportation network, according to some embodiments of the present disclosure.

FIG. 10A illustrates an exemplary diagram 1000A of a multi-lane road segment in a transportation network, according to some embodiments of the present disclosure. FIG. 10A illustrates a multi-lane road segment 1005 in which four vehicles plan to make a left turn 1011 at the next intersection 1006. Similarly, FIG. 10A illustrates six vehicles in the road segment 1005 that plan to drive straight 1012 at the next traffic intersection 1006. Further, FIG. 10A illustrates five vehicles in the road segment 1005 that plan to make a right turn 1013 at the next traffic intersection 1006.

Figure 10B:
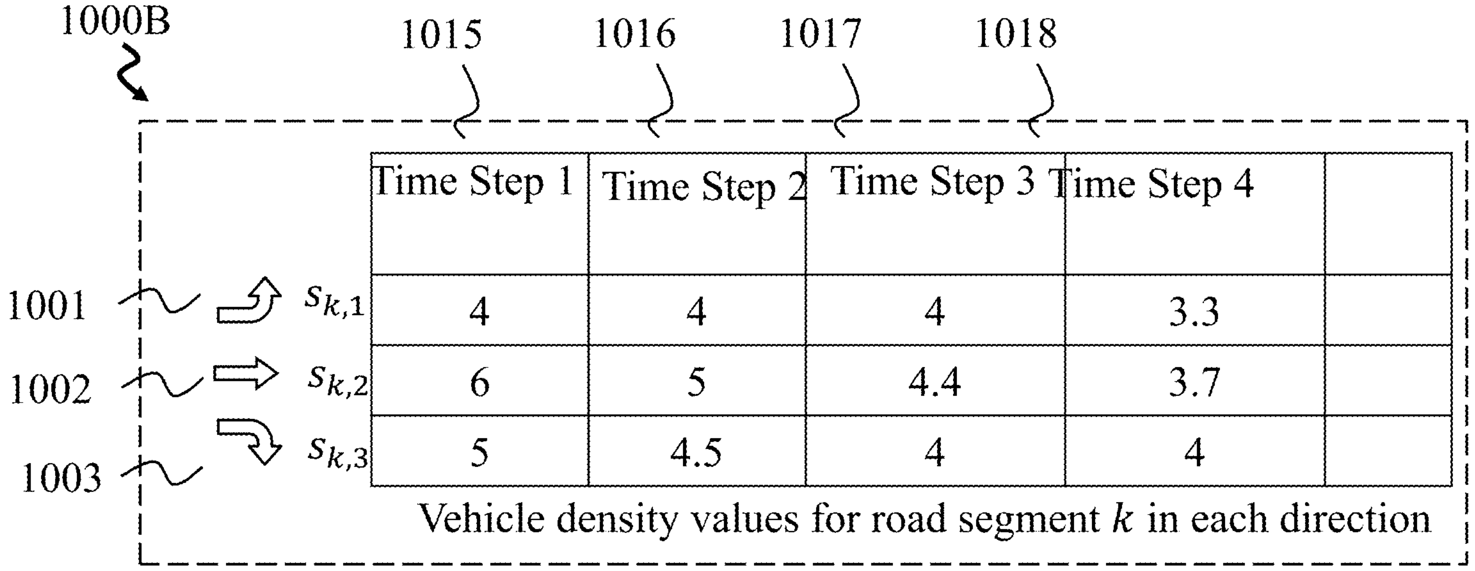
FIG. 10B illustrates an example of vehicle density values over a prediction time horizon for a multi-lane road segment in a transportation network, which is used in a macroscopic traffic flow model of the hierarchical traffic control system, according to some embodiments of the present disclosure.

FIG. 10B illustrates an example of vehicle density values over a prediction time horizon for a multi-lane road segment in a transportation network, which is used in a macroscopic traffic flow model of the hierarchical traffic control system, according to some embodiments of the present disclosure. FIG. 10B illustrates an example of vehicle density values 1000B over a prediction time horizon 1015-1018 for the multi-lane road segment 1005 in a transportation network and, in some embodiments, the vehicle density values 1000B can be used as part of a state information vector in the macroscopic traffic flow model that is used in the constrained optimization problem that is solved by the CTC 404 in the hierarchical traffic control system 600A to compute a high-level traffic flow plan. In an example, FIG. 10A illustrates four vehicles in the road segment 1005 that plan to make the left turn 1011 at the next traffic intersection 1006, resulting in a vehicle density value $s_{k,1}$ 1001 that is equal to 4 at the first time step 1015 and the dynamic behavior of the vehicle density value can be predicted for the subsequent time steps 1016-1018 based on the macroscopic traffic flow model for the transportation network. Similarly, FIG. 10A illustrates six vehicles in the road segment 1005 that plan to drive straight 1012 at the next traffic intersection 1006, resulting in a vehicle density value $s_{k,2}$ 1002 that is equal to 6 at the first time step 1015 and the dynamic behavior of the vehicle density value can be predicted for the subsequent time steps 1016-1018 based on the macroscopic traffic flow model for the transportation network. Further, FIG. 10A illustrates five vehicles in the road segment 1005 that plan to make a right turn 1013 at the next traffic intersection 1006, resulting in a vehicle density value $s_{k,3}$ 1003 that is equal to 5 at the first time step 1015 and the dynamic behavior of the vehicle density value can be predicted for the subsequent time steps 1016-1018 based on the macroscopic traffic flow model for the transportation network.

In some embodiments, the vehicle density values 1000B over the prediction time horizon 1015-1018 satisfy the macroscopic traffic flow model and they satisfy a convex relaxation of one or multiple mixed-integer constraints that enforce each of the multiple traffic rules for the entire transportation network of the one or multiple interconnected traffic intersections. For example, the flow of vehicles out of the road segment 1005 is enforced to be equal to the flow of vehicles into the traffic intersection 1006, and the flow of vehicles through the traffic intersection is upper bounded by a maximum capacity limit at each time step and for each traffic intersection in the transportation network.

Figure 10C:
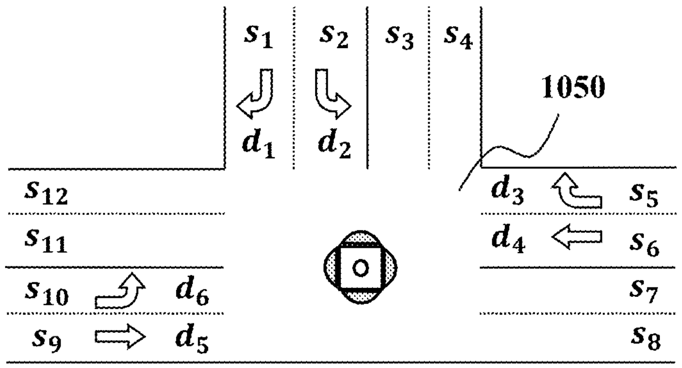
FIG. 10C illustrates an example of multiple crossing directions over a prediction time horizon for a 3-way traffic intersection in a transportation network, according to some embodiments of the present disclosure.

FIG. 10C illustrates an example, 1000C, of multiple crossing directions over a prediction time horizon for a 3-way traffic intersection in a transportation network, according to some embodiments of the present disclosure. Additionally, $s_1$, $s_2$, $s_3$, $s_4$, $s_5$, $s_6$, $s_7$, $s_8$, $s_9$, $s_{10}$, $s_{11}$, and $s_{12}$ are road segments as shown by FIG. 10C.

FIG. 10D illustrates an example, 1000D, of traffic flow values for multiple crossing directions over a prediction time horizon for a 3-way traffic intersection in a transportation network, which is used in a macroscopic traffic flow model of the hierarchical traffic control system, according to some embodiments of the present disclosure. Additionally, 1041, 1042, 1043, 1044, 1045, and 1046 represent traffic flow values, respectively.

Figure 10E:
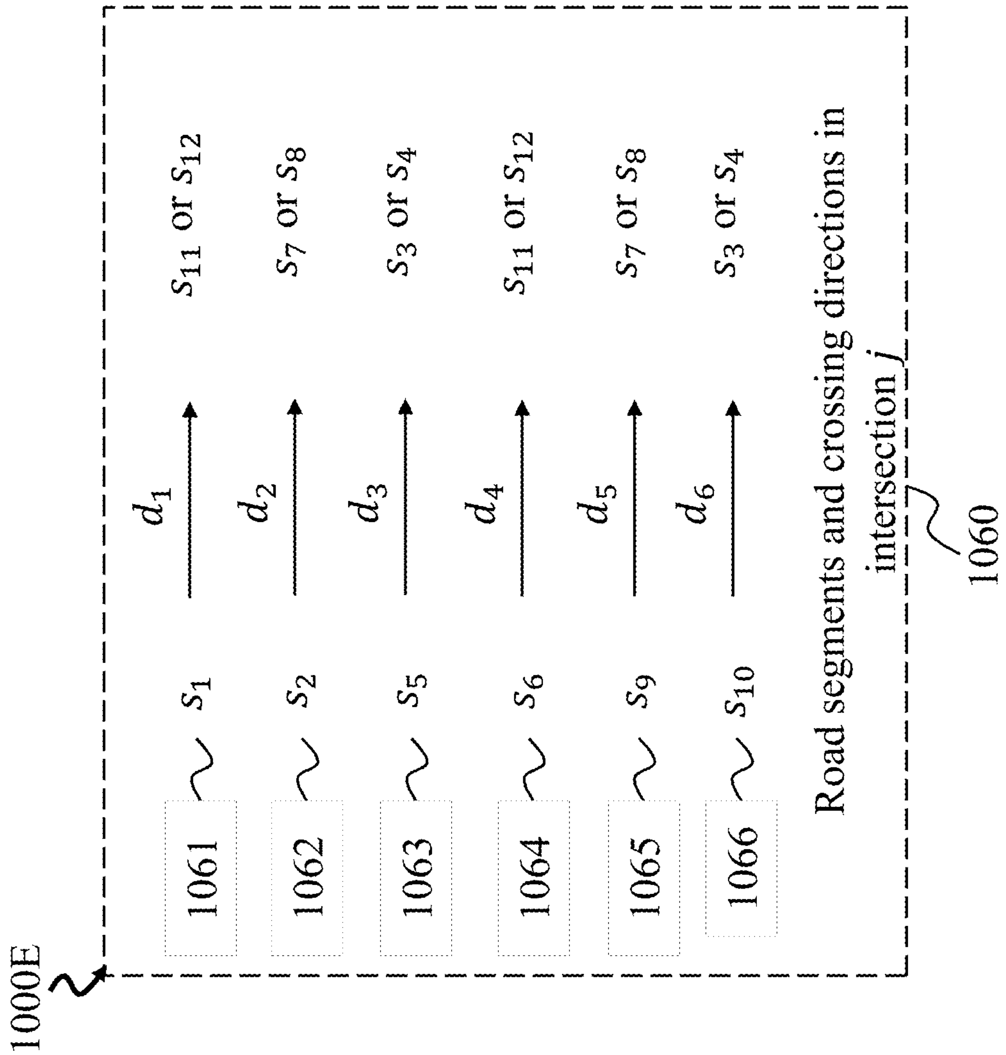
FIG. 10E illustrates an example of multiple crossing directions over a prediction time horizon for a 3-way traffic intersection in a transportation network, according to some embodiments of the present disclosure.

FIG. 10E illustrates an example, 1000E, of multiple crossing directions over a prediction time horizon for a 3-way traffic intersection in a transportation network, according to some embodiments of the present disclosure. Additionally, $s_1$, $s_2$, $s_3$, $s_4$, $s_5$, $s_6$, $s_7$, $s_8$, $s_9$, $s_{10}$, $s_{11}$, and $s_{12}$ are road segments, as also shown by FIG. 10C.

FIG. 10F illustrates an example, 1000F, of vehicle density values for multiple crossing directions over a prediction time horizon for a 3-way traffic intersection in a transportation network, which is used in a macroscopic traffic flow model of the hierarchical traffic control system, according to some embodiments of the present disclosure. Within FIG. 10F, 1021, 1022, 1023, 1024, 1025, 1026, 1027, 1028, 1029, 1030, 1031, and 1032 represent respective vehicle density values. FIG. 10F illustrates an example of vehicle density values 1020 over a prediction time horizon 1035-1038 and traffic flow values 1040 over a prediction time horizon 1055-1057 for a 3-way traffic intersection 1050 that connects multiple 2-lane road segments in a transportation network. In some embodiments, both the vehicle density values 1020 and the traffic flow values 1040 may be used as part of a state information vector in the macroscopic traffic flow model that is used in the constrained optimization problem that is solved by the CTC in the hierarchical traffic control system 600A to compute a high-level traffic flow plan. As illustrated in FIGS. 10C and 10E, a 3-way traffic intersection results in 6 crossing directions 1060, i.e., $d_1$ 1061, $d_2$ 1062, $d_3$ 1063, $d_4$ 1064, $d_5$ 1065, and $d_6$ 1066.

For example, the traffic flow value for crossing direction $d_1$ of 2.3 at the first time step 1055 represents the number of vehicles that is predicted to flow in direction $d_1$, i.e., from road segment $s_1$ to road segment $s_{11}$ or $s_{12}$. The dynamic behavior of the traffic flow value 1041, and the vehicle density values for $s_1$ 1021, $s_{11}$ 1031 and $s_{12}$ 1032, may be predicted for the subsequent time steps 1055-1057 and 1035-1038, respectively, based on the macroscopic traffic flow model for the transportation network. For example, the traffic flow value for crossing direction $d_1$ of 2.3 at the first time step 1055 is equal to the vehicle density value for $s_1$ of 8 at the first time step 1035 minus 5.7 at the second time step 1036. In addition, the flow of vehicles into road segments $s_{11}$ and $s_{12}$ from the first to the second time step, (5.15−4)+(3.15−2)=2.3 is equal to the traffic flow value for crossing direction $d_1$ of 2.3 plus the traffic flow value for crossing direction $d_4$ of 0 744 at the first time step 1055. A similar dynamic traffic behavior can be observed in FIG. 10C for the traffic flow values 1040, and the corresponding vehicle density values 1020, for each of the crossing directions in the traffic intersection 1050 and for each of the time steps in the prediction horizon of the CTC 404.

For example, the traffic flow value for crossing direction $d_2$ of 1.7 at the first time step 1055 represents the number of vehicles that is predicted to flow in direction $d_2$ 1062, i.e., from road segment $s_2$ to road segment $s_7$ or $s_8$. The dynamic behavior of the traffic flow value 1042, and the vehicle density values for $s_2$ 1022, $s_7$ 1027 and $s_8$ 1028, may be predicted for the subsequent time steps 1055-1057 and 1035-1038, respectively, based on the macroscopic traffic flow model for the transportation network. For example, the traffic flow value for crossing direction $d_2$ of 1.7 at the first time step 1055 is equal to the vehicle density value for $s_2$ of 4 at the first time step 1035 minus 2.3 at the second time step 1036. In addition, the flow of vehicles into road segments $s_7$ and $s_8$ from the first to the second time step, (2.85-2)+(3.85-3)=1.7 is equal to the traffic flow value for crossing direction $d_2$ of 1.7 plus the traffic flow value for crossing direction $d_5$ of 0 745 at the first time step 1055 in the prediction horizon of the CTC 404.

In some embodiments, the state information vector in the macroscopic traffic flow model includes both the vehicle density values 1020, the traffic flow values 1040 through one or multiple intersections, and the position of vehicles in each road segment of the transportation network. In some embodiments, each road segment is divided in one or multiple smaller sub-segments and current vehicle density values are estimated and future vehicle density values are predicted for each of the sub-segments in order to improve the accuracy of the macroscopic traffic flow model in the hierarchical traffic control system 600A. In some embodiments, vehicles are expected to travel from one sub-segment to the next sub-segment in one sampling time period and vehicles can only enter a traffic intersection from a road sub-segment that is sufficiently close to the traffic intersection in the transportation network. This results in a more accurate modeling of the travel time for each of the vehicles to drive from the beginning of a road segment to the end of the road segment, given a desired or estimated average speed for each of the vehicles.

In some embodiments, historical data is collected from the database 108 and used to estimate predict vehicle density values 1020 and traffic flow values 1040 to improve the performance of the hierarchical traffic control system 600A in the transportation network. For example, given a crossing direction $d_3$ 1063 from road segment $s_s$ to road segment $s_3$ or $s_4$, the percentage of vehicles in the traffic flow of crossing direction $d_3$ 1063 entering either road segment $s_3$ or $s_4$ can be predicted based on vehicle density values 1020 and traffic flow values 1040 in the same or a similar transportation network during a similar time period in the past. Similarly, the number of external vehicles entering the transportation network from each of the in-flow directions at each time step in the prediction horizon can be predicted based on historical data that is collected for the same or a similar transportation network during a similar time period in the past. For example, historical data may be used to predict typical traffic in-flow values or to predict the typical routing of vehicles entering a particular transportation network on a Monday morning at 8 am versus a Saturday afternoon at 2 pm, which can be used to improve predictions of a macroscopic traffic flow model in the hierarchical traffic control system 600A.

Figure 11A:
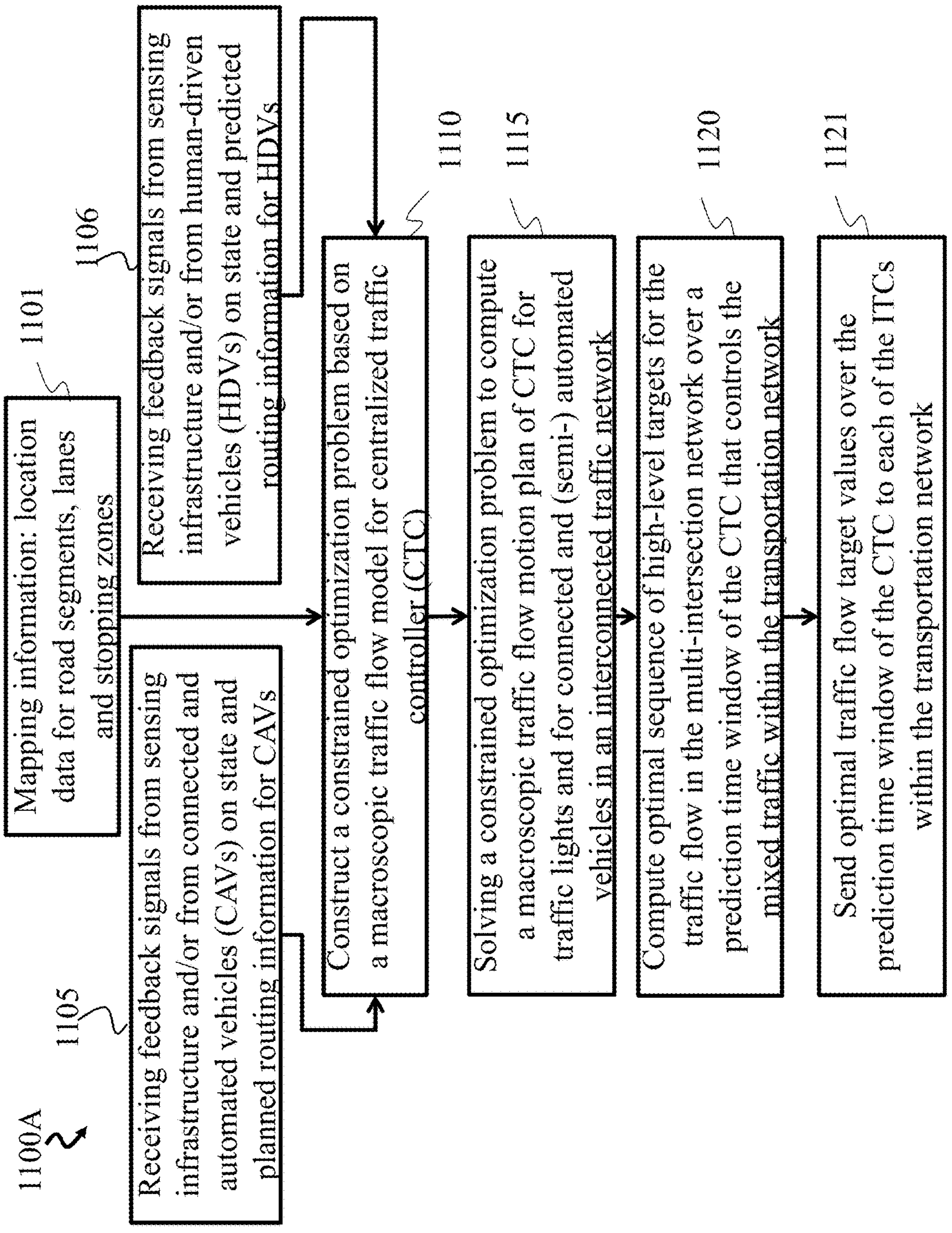
FIG. 11A shows a method for constructing and solving a constrained optimization problem to compute a macroscopic traffic flow motion plan for one or multiple traffic lights and connected and automated vehicles (CAVs) in a transportation network that includes multiple interconnected traffic intersections, according to some embodiments of the present disclosure.

FIG. 11A shows a method for constructing and solving a constrained optimization problem to compute a macroscopic traffic flow motion plan for one or multiple traffic lights, and connected and automated vehicles (CAVs) in a transportation network that includes multiple interconnected traffic intersections, according to some embodiments of the present disclosure. The steps identified in FIG. 11A, and the order thereof, are exemplary and may include various alternatives, equivalents, or derivations thereof including but not limited to the order of execution of the same. The steps of the method 1100A of FIG. 11A, and its various alternatives, may be embodied in hardware or software including a computer-readable storage medium (e.g., optical disc, memory card, or hard drive) including instructions executable by a processor included in the hierarchical traffic control system 600A. In another embodiment, the steps of the method 1100A of FIG. 11A, and its various alternatives, may be embodied in hardware or software including a computer-readable storage medium (e.g., optical disc, memory card, or hard drive) including instructions executable by a processor included in the CTC 404. FIG. 11A shows the method 1100A that involves a feedback loop for CTC 404.

At 1101, the CTC 404 receives mapping information, for example, location data (e.g., GPS data) for road segments, lanes, traffic intersections and stopping zones in the transportation network.

At 1105, the CTC 404 receives additional inputs, for example, feedback signals on state and planned routing information from the CAVs. In an example, the feedback signal also includes information from the infrastructure sensing module 406.

At 1106, the CTC 404 receives additional inputs, for example, feedback signals on state and predicted routing information from HDVs. In some embodiments, the feedback signals are obtained directly or indirectly from the sensing infrastructure module 406 (e.g., RSUs) or from connected vehicles, which can be either autonomous, semi-autonomous and/or human-driven vehicles. The feedback signals on state and planned routing information for CAVs may be referred to as type 1 feedback signals. The feedback signals on state and predicted routing information for HDVs may be referred to as type 2 feedback signals.

At 1110, the CTC 404 constructs a constrained optimization problem based on a macroscopic traffic flow model for the CTC 404.

At 1115, the CTC 404 solves the constrained optimization problem to compute a macroscopic traffic flow motion plan for the one or multiple traffic lights and connected and (semi-) automated vehicles in the transportation network that includes the multiple interconnected traffic intersections. In an embodiment, the CTC 404 solves the constrained optimization problem with a cost function that includes at least one of a maximization of a sum of traffic flow variables or a minimization of a sum of traffic congestion variables in the transportation network.

At 1120, the CTC 404 computes an optimal sequence of high-level control target values for the traffic flow over a prediction time window of the CTC 404 in the transportation network, based on the solution to the constrained optimization problem. The CTC 404 controls the mixed traffic within the transportation network.

At 1121, the CTC 404 sends the computed optimal sequence of high-level control target values for the traffic flow to each of the one or multiple ITCs 821 in the hierarchical traffic control system 600A that controls mixed traffic in the transportation network.

Figure 11B:
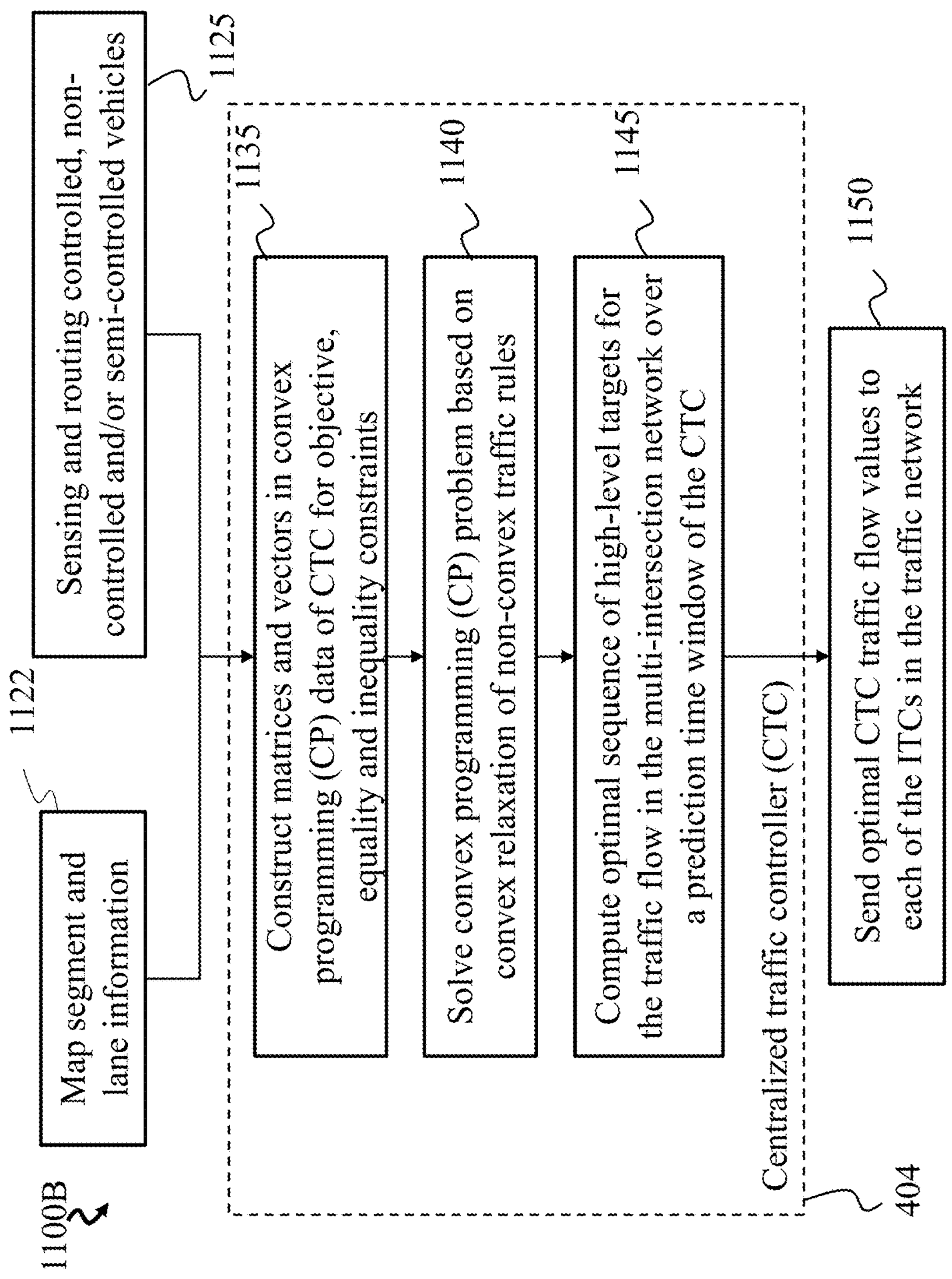
FIG. 11B shows a method for constructing and solving a constrained convex programming (CP) problem to compute an optimal sequence of high-level target values for traffic flow in a transportation network of multiple interconnected traffic intersections, according to some embodiments of the present disclosure.

FIG. 11B shows a method for constructing and solving a constrained convex programming (CP) problem to compute an optimal sequence of high-level target values for traffic flow in a transportation network of multiple interconnected traffic intersections, according to some embodiments of the present disclosure. The steps identified in FIG. 111B, and the order thereof, are exemplary and may include various alternatives, equivalents, or derivations thereof including but not limited to the order of execution of the same. The steps of the method 1100B of FIG. 11B, and its various alternatives, may be embodied in hardware or software including a computer-readable storage medium (e.g., optical disc, memory card, or hard drive) including instructions executable by a processor included in the hierarchical traffic control system 600A. In another embodiment, the steps of the method 1100B of FIG. 11B, and its various alternatives, may be embodied in hardware or software including a computer-readable storage medium (e.g., optical disc, memory card, or hard drive) including instructions executable by a processor included in the CTC 404. FIG. 11B shows the method 1100B that involves a feedback loop for CTC 404.

At 1122, the CTC 404 receives map segment and lane information for the multiple interconnected traffic intersections in the transportation network.

At 1125, the CTC 404 receives feedback signals related to sensing and routing from controlled, non-controlled and/or semi-controlled vehicles.

At 1135, the CTC 404 constructs matrices and vectors in CP data of the CTC 404 for objective, equality, and inequality constraints. In an embodiment, the matrices and vectors are constructed using the received feedback signals related to the sensing and routing, and the map segment and lane information.

At 1140, the CTC 404 solves a CP problem based on a convex relaxation of non-convex traffic rules. In some embodiments, the CP includes the convex relaxation of one or multiple mixed-integer equality and/or mixed-integer inequality constraints that enforce each of the multiple traffic rules for the entire transportation network of one or multiple interconnected traffic intersections. In some embodiments, the CP problem includes a convex optimization problem in the CTC 404. The convex optimization problem may be a convex linear programming (LP) problem, including a linear objective, and one or multiple linear equality and/or inequality constraints. In some embodiments, the convex optimization problem in the CTC 404 is a convex quadratic programming (QP) problem, including a linear-quadratic objective, and one or multiple linear equality and/or inequality constraints. In some embodiments, the convex optimization problem in the CTC 404 is a convex quadratically constrained quadratic programming (QCQP) problem, including a linear-quadratic objective, one or multiple linear equality and/or inequality constraints, and one or multiple quadratic inequality constraints. In some embodiments, the convex optimization problem in the CTC 404 is a convex conic programming problem, including a linear objective, one or multiple linear equality and/or inequality constraints, and one or multiple convex cone inequality constraints. Some embodiments of the disclosure are based on the realization that numerical optimization algorithms exist for the computationally efficient solution of the convex optimization problem in the CTC 404. Examples of the optimization algorithms to efficiently solve the CP at step 1140 include active-set methods, interior point methods, projected gradient methods, operator splitting methods, or the alternating direction method of multipliers (ADMM).

At 1145, the CTC 404 computes an optimal sequence of high-level target values for the traffic flow in the multi-intersection transportation network over a prediction time window.

At 1150, the CTC 404 sends the computed optimal sequence of high-level target values for the traffic flow to each of the ITCs in the hierarchical traffic control system 600A of the transportation network.

Figure 11C:
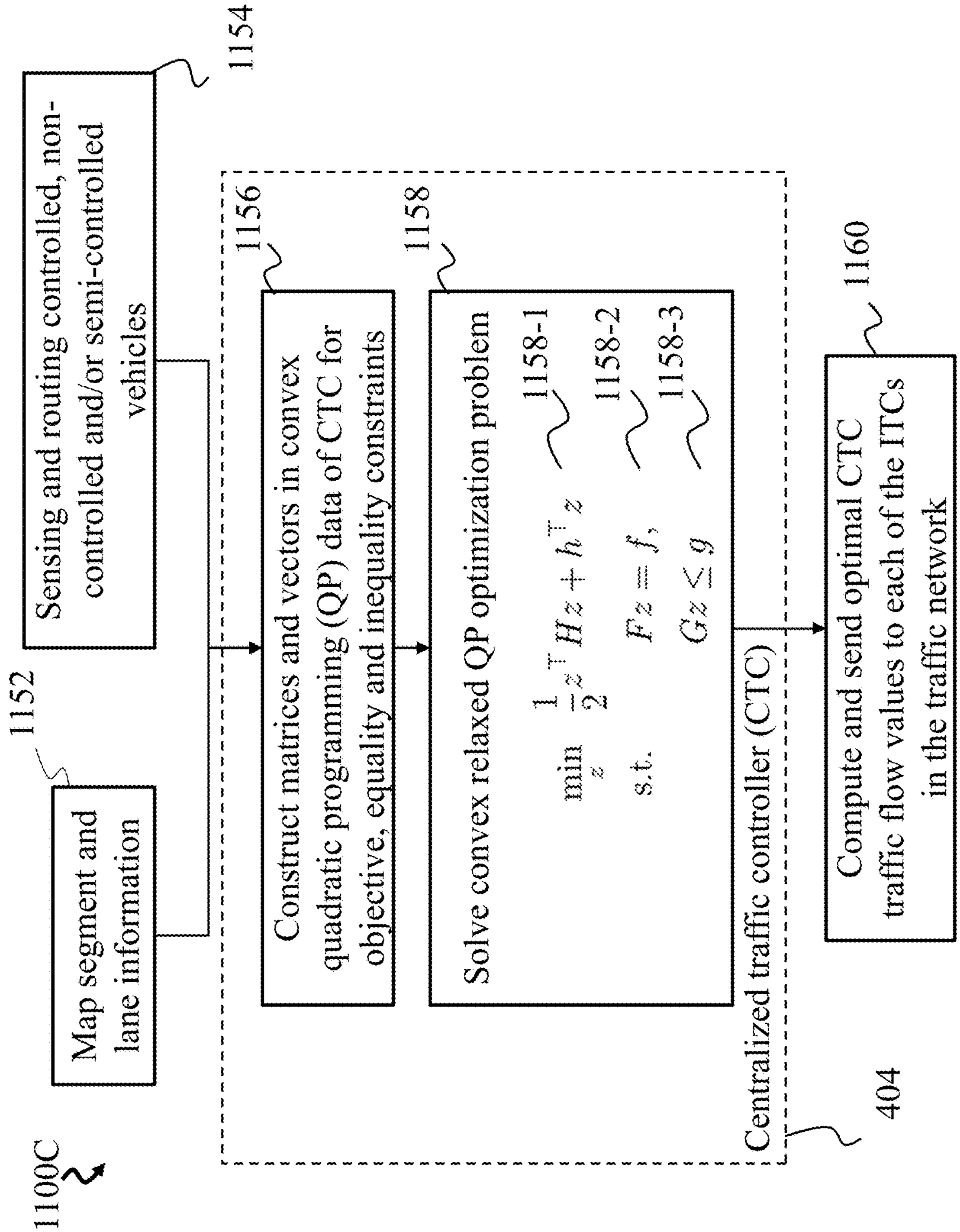
FIG. 11C shows a method for constructing and solving a constrained convex programming (CP) problem to compute an optimal sequence of high-level target values for traffic flow in a transportation network of multiple interconnected traffic intersections, according to some embodiments of the present disclosure.

FIG. 11C shows a method for constructing and solving a constrained convex programming (CP) problem to compute an optimal sequence of high-level target values for traffic flow in a transportation network of multiple interconnected traffic intersections, according to some embodiments of the present disclosure. The steps identified in FIG. 11C, and the order thereof, are exemplary and may include various alternatives, equivalents, or derivations thereof including but not limited to the order of execution of the same. The steps of the method 1100C of FIG. 11C, and its various alternatives, may be embodied in hardware or software including a computer-readable storage medium (e.g., optical disc, memory card, or hard drive) including instructions executable by a processor included in the hierarchical traffic control system 600A. In another embodiment, the steps of the method 1100C of FIG. 11C, and its various alternatives, may be embodied in hardware or software including a computer-readable storage medium (e.g., optical disc, memory card, or hard drive) including instructions executable by a processor included in the CTC 404. FIG. 11C shows the method 1100C that involves a feedback loop for CTC 404.

At 1152, the CTC 404 receives map segment and lane information for the multiple interconnected traffic intersections in the transportation network.

At 1154, the CTC 404 receives feedback signals related to sensing and routing from controlled, non-controlled and/or semi-controlled vehicles.

At 1156, the CTC 404 constructs matrices and vectors in convex QP data of the CTC 404 for objective, equality, and inequality constraints. In an embodiment, the matrices and vectors are constructed using the received feedback signals related to the sensing and routing, and the map segment and lane information.

At 1158, the CTC 404 solves the convex QP based on a convex relaxation of non-convex traffic rules. According to some embodiments, the convex QP includes a linear-quadratic objective function 1158-1, one or multiple linear equality constraints 1158-2, and one or multiple linear inequality constraints 1158-3.

At 1160, the CTC 404 computes and sends optimal traffic flow values to each of the ITCs in the hierarchical traffic control system 600A of the transportation network.

In some embodiments, the construction of the CP in the CTC 404 includes a macro-level traffic network structure using multiple network parameters, for example, including road segment length, number of lanes, road segment connections and traffic intersection connectivity. For each road segment r, the macro-level traffic network structure defines possible future traffic flow maneuvers w ∈{straight, left, right}, i.e., a vehicle can drive straight, turn left or turn right in road segment r when arriving at a traffic intersection. In some embodiments of the disclosure, the CTC 404 computes vehicle density probability values $P_T^W$ for each road segment-maneuver pair (r, w), e.g., using historical data that is collected for the same or a similar transportation network during a similar time period in the past. Computing probability values $P_T^W$ for each road segment-maneuver pair (r, w) using historical data involves collecting the usage of each road and maneuver over a large enough time window in order to make accurate predictions for a future time period.

In some embodiments, a sampling time period for a receding horizon implementation of the CTC 404 is equal to or longer than a sampling time period for a receding horizon implementation for each of the ITCs 408, 410 in the hierarchical traffic control system 600A. In some embodiments, a length of the prediction time window of the CTC 404 is equal to or longer than a length of the prediction time window for each of the ITCs 408, 410 in the hierarchical traffic control system 600A.

In some embodiments of the disclosure, the macroscopic traffic flow model in the CTC 404 may be described as a directed graph, where each node corresponds to a road segment and each edge corresponds to a connection between road segments, i.e., a direction to cross through a traffic intersection in the transportation network that is controlled by the hierarchical traffic control system.

In some embodiments, the CP of the CTC 404 may include one or multiple of the following optimization variables:

(a) $z_{r,w}(t)$ E R: vehicle density variables, i.e., number of vehicles (real-valued traffic density) for each road segment-maneuver (r, w) pair and a traffic flow maneuver at each time step t E [0, N] in a prediction time window of the CTC 404, (b) $f_{r,w}^{in}(t)$ E R: number of vehicles entering (real-valued in-flow) for each road segment-maneuver (r, w) pair at each time step t ∈[0, N−1] in a prediction time window of the CTC 404, (c) $f_{r,w}^{out}(t)$ E R: number of vehicles exiting (real-valued out-flow) for each road segment-maneuver (r, w) pair at each time step t ∈[0, N−1] in a prediction time window of the CTC 404, (d) $e_{r,s}(t)$ E R: number of vehicles transitioning (along edge in directed graph) from each road segment r to each connected road segment s in the transportation network at each time step t ∈[0, N−1] in a prediction time window of the CTC 404.

Some embodiments are based on the realization that the CP of the CTC 404 is an optimal control block-sparsity structured convex optimization problem that includes state variables $z_{r,w}(t)$, for each road segment-maneuver (r, w) pair at each time step t ∈[0, N] in a prediction time window, and control variables $f_{r,w}^{in}(t)$, $f_{r,w}^{out}(t)$, for each road segment-maneuver (r, w) pair at each time step t ∈[0, N−1] in a prediction time window, and control variables $e_{r,s}(t)$ for each pair of connected road segments r and s and for each time step t E [0, N−1] in a prediction time window of the CTC 404.

In some embodiments, vehicle positions and velocities at the current time step are used to compute initial state values of the macroscopic traffic flow model in the CTC 404 of the hierarchical traffic control system 600A. For example, vehicle positions may be used to compute a vehicle density value $z_{r,w}$, i.e., a number of vehicles in each road segment-maneuver pair (r, w). In some embodiments, each road segment r is divided in one or multiple smaller sub-segments $r_1, r_2, \ldots r_n$, and current vehicle density values are estimated and future vehicle density values are predicted for each of the sub-segments $z_{r_1,w}$, $z_{r_2,w}$ in order to improve the accuracy of the macroscopic traffic flow model in the CTC 404 of the hierarchical traffic control system 600A.

In some embodiments, a set of discrete-time differential equations is used to define a dynamical system that describes the macroscopic traffic flow model in the CTC 404, for example, $$z_{r,w}(t+1) = z_{r,w}(t) + f^{in}_{r,w}(t) - f^{out}_{r,w}(t),\ \forall\, t \in [0,\ N-1],\ \forall\, r,\ w, \tag{3}$$

given the initial state values $z_{r,w}(0)=z_{r,w}$, which are obtained from feedback signals on sensing and routing controlled, non-controlled and/or semi-controlled vehicles 1154, and given the in-flow and out-flow variables $f_{r,w}^{in}(t)$, $f_{r,w}^{out}(t)$, for each road segment-maneuver (r, w) pair at each time step $t \in [0, N-1]$ in a prediction time window of the CTC 404.

In some embodiments, the inequality constraints 1158-3 of the convex optimization problem in the CTC 404 includes one or multiple inequality constraints on the maximum flow along an edge in the directed graph that represents the transportation network of the interconnected intersections, for example, including the inequality constraints $$e_{r,s}(t) \le A(r,\ s) f^{max}, \tag{4}$$

where $f^{max}$ is the maximum flow limit and A represents an adjacency matrix for the directed graph, i.e., A(r, s)=1 if road segments r and s are connected, otherwise A (r, s)=0 if road segments r and s are not connected.

In some embodiments of the disclosure, a flow buffer can be used to store (approximately) a time step at which each subset of vehicles entered each road segment-maneuver pair (r, w) in order to make a prediction of the time step at which each subset of vehicles exit the road segment and crosses the next traffic intersection in the transportation network. For example, if it takes approximately 3 sampling time periods for one or multiple vehicles to cross road segment r, then the CP of the CTC 404 may include one or multiple inequality constraints to ensure that vehicles can only exit road segment r at least 3 sampling time periods after they entered the road segment.

In some embodiments of the disclosure, flow output for each road segment at each time step is upper bounded by the number of vehicles in the road segment at that time step, and this for each possible maneuver w E {straight, left, right}, minus the number of vehicles that entered the road segment within a particular time window, according to the macroscopic traffic flow model in the CTC 404 of the hierarchical traffic control system 600A. The latter ensures time delay constraints for each road segment corresponding to an expected duration for each vehicle to travel through the road segment, given the physical length of the road segment, given the expected congestion of the road segment and the expected velocity for the vehicles in the road segment. For example, in some embodiments of the disclosure, the inequality constraints 1158-3 of the convex optimization problem in the CTC 404 includes one or multiple time delay constraints as $$f^{out}_{r,w}(t) \le z_{r,w}(t) - \sum_{i=1}^{\tau(r)} f^{in}_{r,w}(t-i) \tag{5}$$

where $\tau(r)$ denotes an expected time delay value for vehicles traveling through road segment r and the in-flow values $f_{r,w}^{in}(t)$ are given for $-\tau(r) \le t \le -1$, i.e., the in-flow value $f_{r,w}(t)$ defines the number of vehicles entering road segment r at time step t with a (estimated or predicted) plan to perform maneuver w.

In some embodiments of the disclosure, the inequality constraints 1158-3 of the convex optimization problem in the CTC 404 includes one or multiple traffic intersection capacity limit constraints, for example, $$\sum_{(r,s)\in\varepsilon(j)} e_{r,s}(t) \le z_j^{max}, \tag{6}$$

where $\varepsilon(j)$ denotes one or multiple edges in a directed graph that correspond to one or multiple crossing directions of a traffic intersection $j \in J$ in the transportation network, and $z_j^{max}$ denotes a maximum number of vehicles that is able to cross through the traffic intersection at a time step $t \in [0, N]$ in a prediction time window of the CTC 404.

In some embodiments, the equality constraints 1158-2 of the convex optimization problem in the CTC 404 includes one or multiple equality constraints as $$f^{out}_{r,w}(t) = e_{r,s}(t), \tag{7}$$

which define the values of edge variables based on the out-flow variables, and where a transition from road segment r to road segment s corresponds to a road segment-maneuver pair (r, w). Some embodiments of the disclosure are based on the realization that the latter equality constraints can be used to numerically eliminate the edge variables from the convex optimization problem, resulting in a reduced CP of smaller dimensions that is computationally cheaper to solve at each time step of the CTC 404 in the hierarchical traffic control system 600A.

In some embodiments, the equality constraints 1158-2 of the convex optimization problem in the CTC 404 includes one or multiple equality constraints as $$f^{in}_{r,w}(t) = P_r^w\left(f_r^{ext}(t) + \sum_s e_{s,r}(t)\right) \tag{8}$$

which define the values of in-flow variables based on the incoming edge variables, where $f_r^{ext}(t)$ denotes the predicted external in-flow values, and the $P_r^W$ values denote the estimated probability for vehicles in road segment r to perform a possible maneuver $w \in$ {straight, left, right}.

In some embodiments of the disclosure, the optimal solution of the convex optimization problem includes optimal traffic flow probability values $P_j^{d,*}$ for each pair of traffic intersection $j \in J$ and a corresponding crossing direction $d \in D_j$ in the transportation network. The optimal traffic flow probability values $P_j^{d,*}$ for each intersection-direction pair are sent to each of the ITCs in the transportation network, and each ITC aims to minimize a least squares tracking error between the predicted traffic flow values 902 and the reference CTC traffic flow values 903 in a cost function adaptation method 900 of the hierarchical traffic control system 600A, according to some embodiments.

In some embodiments, at each sampling time period of the hierarchical traffic control system 600A, the CTC 404 computes an optimal solution to a convex LP or a convex QP that reads as $$\min_{Z,E,F} \sum_{t=0}^{N} w_1 c(t) - \sum_{t=0}^{N-1} \sum_{r\in S} \sum_{w\in W} w_2 f_{r,w}^{out}(t) \tag{9}$$

s.t. Macro-level traffic model: Eq. (3),
Edge inequality constraints: Eq. (4),
Out-flow bounds and delay constraints: Eq. (5),
Traffic intersection capacity limits: Eq. (6),
Out-flow and edge equality constraints: Eq. (7),
In-flow and edge equality constraints: Eq. (8).

based on a maximization of the traffic flow and/or a minimization of the congestion in the transportation network, given weight values $w_1 \le 0$, $w_2 \le 0$, and where the congestion variables c(t) are defined by one or multiple additional inequality constraints, for example, $$c(t) \ge \frac{\sum_{w\in W} z_{r,w}(t)}{dist(r)}, \forall r \in S, \tag{10}$$

where dist(r) is the physical distance of road segment r E 5 in the transportation network that is controlled by the hierarchical traffic control system 600A.

Figure 12A:
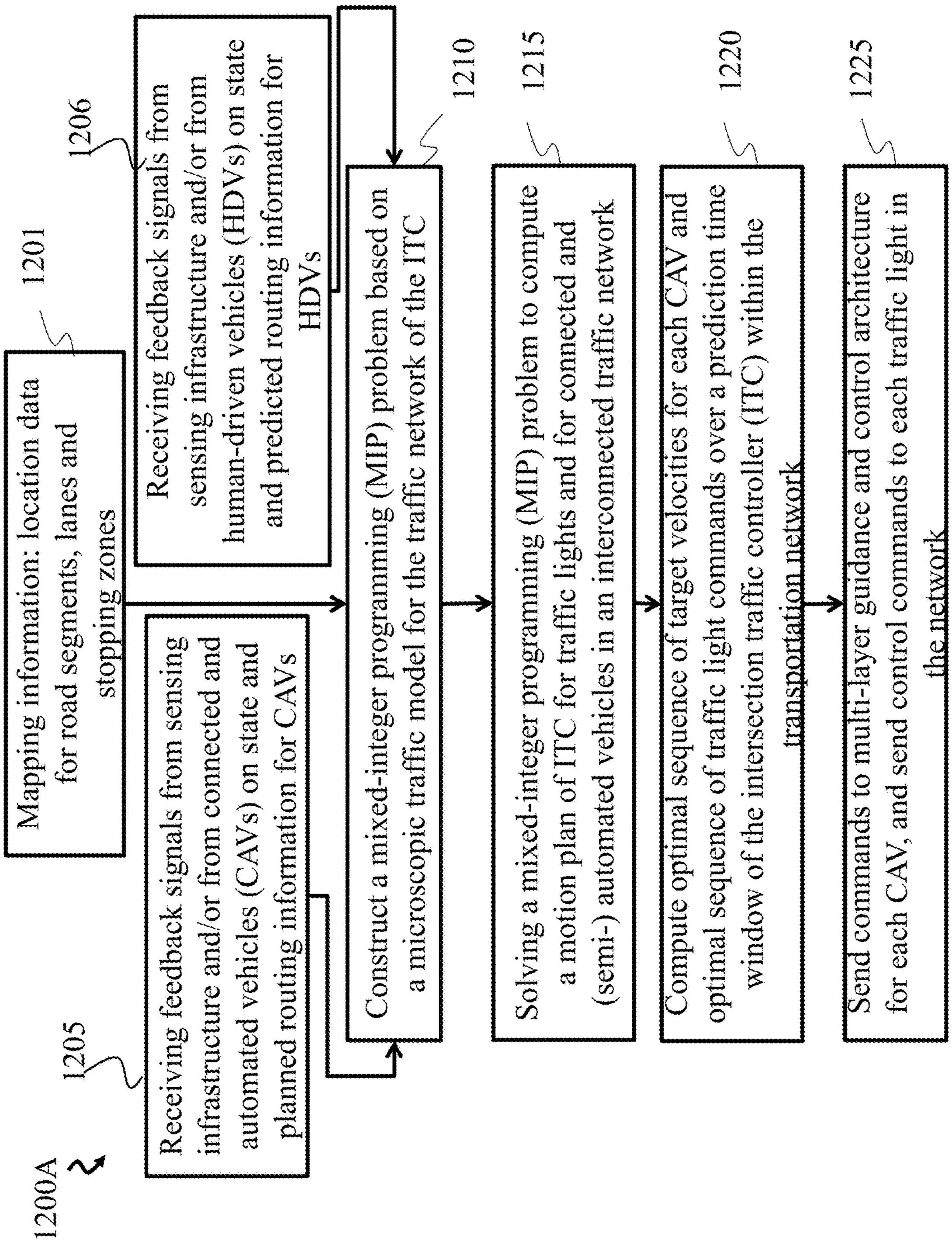
FIG. 12A shows a method for constructing and solving a constrained optimization problem to compute a microscopic traffic flow motion plan for one or multiple traffic lights, and connected and automated vehicles (CAVs) in a local area around one or multiple interconnected traffic intersections within a transportation network, according to some embodiments of the present disclosure.

FIG. 12A shows a method for constructing and solving a constrained optimization problem to compute a microscopic traffic flow motion plan for one or multiple traffic lights and connected and automated vehicles (CAVs) in a local area around one or multiple interconnected traffic intersections within a transportation network, according to some embodiments of the present disclosure. The steps identified in FIG. 12A, and the order thereof, are exemplary and may include various alternatives, equivalents, or derivations thereof including but not limited to the order of execution of the same. The steps of the method 1200A of FIG. 12A, and its various alternatives, may be embodied in hardware or software including a computer-readable storage medium (e.g., optical disc, memory card, or hard drive) including instructions executable by a processor included in the hierarchical traffic control system 600A. In another embodiment, the steps of the method 1200A of FIG. 12A, and its various alternatives, may be embodied in hardware or software including a computer-readable storage medium (e.g., optical disc, memory card, or hard drive) including instructions executable by a processor included in the ITCs such as the ITCs 408, 410 illustrated in FIG. 6A. FIG. 12A shows the method 1200A that involves a feedback loop for the ITCs.

At 1201, the ITC 408 or 410 receives mapping information, for example, location data (e.g., GPS data) for road segments, lanes, traffic intersections and stopping zones in the transportation network.

At 1205, the ITC 408 or 410 receives additional inputs, for example, feedback signals on state and planned routing information from the CAVs. In an example, the feedback signal also includes information from the infrastructure sensing module 406.

At 1206, the ITC 408 or 410 receives additional inputs, for example, feedback signals on state and predicted routing information from HDVs. In some embodiments, the feedback signals are obtained directly or indirectly from the sensing infrastructure module 406 (e.g., RSUs) or from connected vehicles, which can be either autonomous, semi-autonomous and/or human-driven vehicles. The feedback signals on state and planned routing information for CAVs may be referred to as type 1 feedback signals. The feedback signals on state and predicted routing information for HDVs may be referred to as type 2 feedback signals.

At 1210, the ITC 408 or 410 constructs a constrained optimization problem based on a microscopic traffic model for the transportation network of the ITC. In some embodiments, the constrained optimization problem is a mixed-integer programming (MIP) problem constructed based on the microscopic traffic model.

At 1215, the ITC 408 or 410 solves the MIP problem to compute a microscopic traffic flow motion plan of the ITC 408 or 410 for traffic lights and for one or multiple traffic lights and/or for connected and (semi-) automated vehicles in the transportation network. The ITC 408 or 410 computes a solution to the MIP at each sampling time step.

At 1220, the ITC 408 or 410 computes an optimal sequence of target control commands for each CAV in a local area around one or multiple traffic intersections within the transportation network and an optimal sequence of traffic light commands over a prediction time window of the ITC 408 or 410.

At 1225, the ITC 408 or 410 sends commands to a multi-layer guidance and control architecture for each CAV and the ITC sends control commands to each traffic light in a local area around one or multiple traffic intersections within the transportation network that is controlled by the hierarchical traffic control system 600A.

Some embodiments are based on the realization that the hierarchical traffic control system 600A can be implemented by solving the constrained optimization problem 1210 to compute the motion plan for each of the CAVs and to compute optimal control commands for each of the TLCs, given the input information from V2X communication. In some embodiments, the constrained optimization problem may be the MIP problem, for example, a mixed-integer linear programming (MILP) or mixed-integer quadratic programming (MIQP) problem. In some embodiments, one or multiple MIP problems at each sampling instant of the hierarchical traffic control system 600A may be solved by a global optimization algorithm, for example, including branch-and-bound, branch-and-cut and branch-and-price methods. In other embodiments of the disclosure, heuristic techniques can be used to compute a feasible but suboptimal solution to the one or multiple MIP problems, for example, including rounding schemes, a feasibility pumping method, approximate optimization algorithms, or (deep) machine learning, e.g., using supervised learning.

Figure 12B:
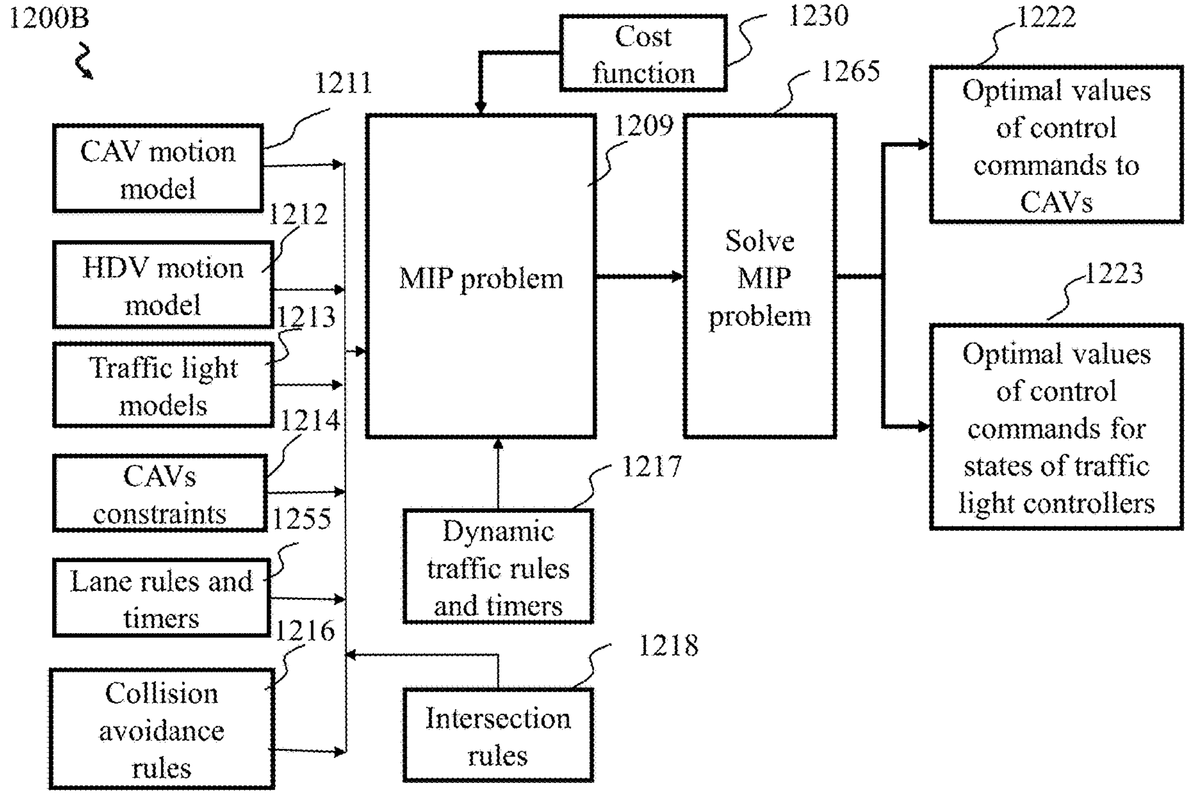
FIG. 12B shows a schematic diagram of a formulation of an MIP problem based on a microscopic traffic model for mixed traffic in a local area that is controlled by an ITC around one or multiple traffic intersections within the transportation network, according to some embodiments of the present disclosure.

FIG. 12B shows a schematic diagram of a formulation of an MIP problem based on a microscopic traffic model for mixed traffic in a local area that is controlled by an ITC around one or multiple traffic intersections within the transportation network, according to some embodiments of the present disclosure. FIG. 12B shows a schematic diagram 1200B of a formulation of an MIP problem 1209 based on a microscopic traffic model for mixed traffic in the local area that is controlled by an ITC around one or multiple traffic intersections within the transportation network. In some embodiments, the MIP problem 1209 is formulated based on multiple constraints that include, for example, a motion model for one or multiple CAVs 1211, a motion model for one or multiple HDVs 1212, a model for one or multiple TLCs 1213, one or multiple physical and/or safety constraints for CAVs 1214, traffic rules in multi-lane road segments and timing constraints 1255, collision avoidance constraints 1216, dynamic traffic rules and timing constraints 1217, and traffic rules for crossing one or multiple traffic intersections 1218. The MIP problem 1209 is formulated based on a cost function 1230 that is minimized, or a reward function that is maximized, e.g., for reducing congestion, travel time, emissions and energy consumption in the local area that is controlled by the ITC around one or multiple traffic intersections within the transportation network. An optimal solution to the MIP problem 1265 defines optimal values of control commands 1222 that are sent to the one or multiple CAVs and optimal values of control commands 1223 for states that are sent to the one or multiple TLCs.

In some embodiments, a long-term future route plan is used for each of the CAVs in the local area that is controlled by the ITC around the one or multiple traffic intersections within the transportation network. Some embodiments are based on the realization that, depending on the infrastructure system, obtaining a precise future prediction 1212 for the route of each HDV may prove challenging. Because of this, in some embodiments, the hierarchical traffic control system 600A is implemented in a receding horizon fashion based on the most recent information from the sensing infrastructure (e.g., RSUs) and from connected vehicles. Some embodiments are based on the realization that an approximate short-term future route prediction 1212 for HDVs is sufficient and can typically be obtained relatively easily, e.g., from the current position of each HDV until the next traffic intersection, a current lane of each HDV, and a detection of turn signals of the one or multiple HDVs. Some embodiments of the disclosure are based on the realization that discrepancies in the predictions can be adjusted by the intrinsic feedback mechanism of the receding horizon strategy. For example, an update period of 1 second allows for real-time computation of the hierarchical traffic control system 600A, while providing sufficiently fast updates to the multi-layer guidance and control architecture for each CAV and providing sufficiently fast updates 1223 to each of the TLCs, to account for erroneous prediction of HDV behaviors.

Figure 12C:
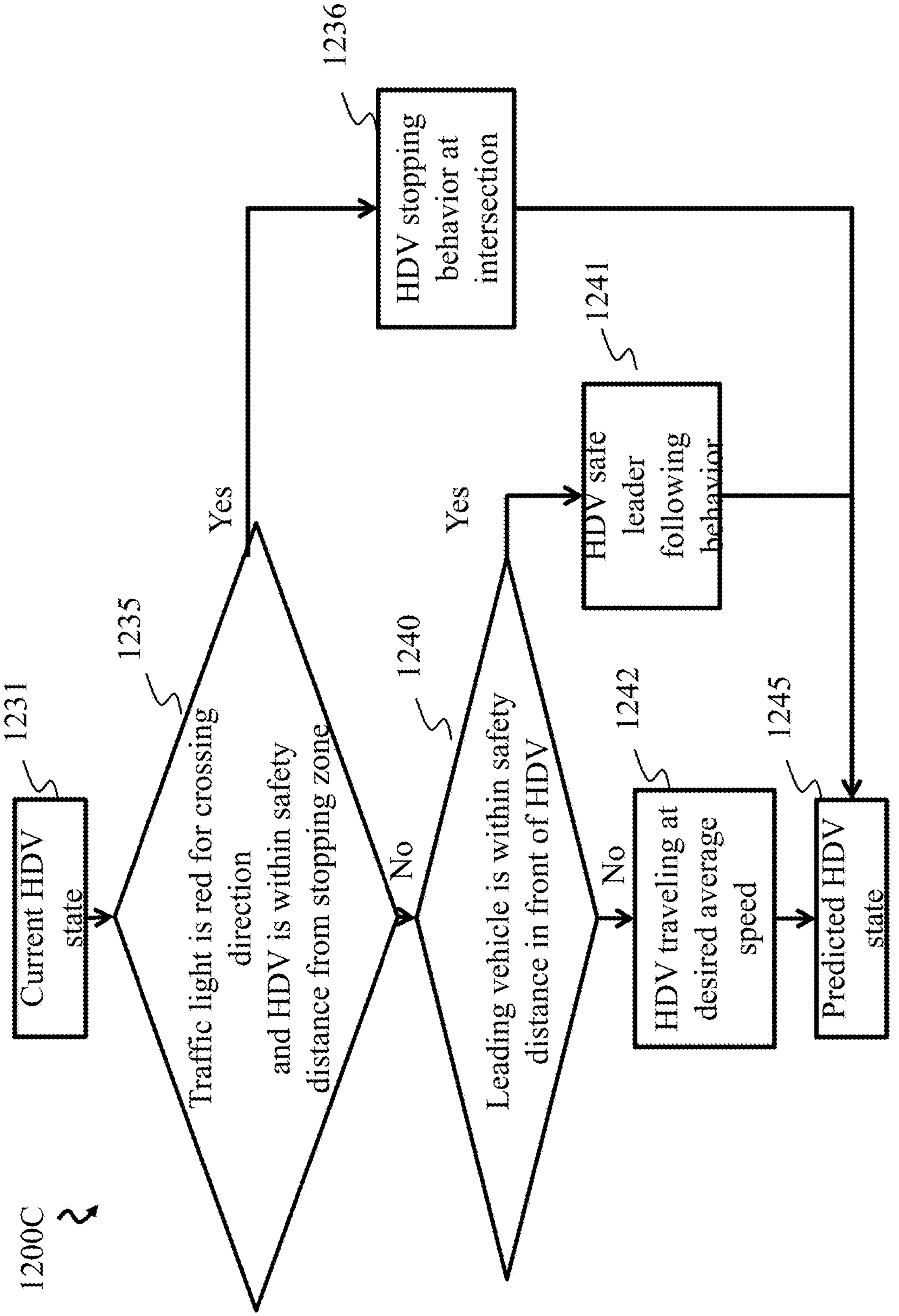
FIG. 12C shows a flow diagram of a switch function in a predictive motion model for one or multiple HDVs that is used in a microscopic model for mixed traffic in a local area that is controlled by an ITC around one or multiple traffic intersections within the transportation network that is controlled by a hierarchical traffic control system, according to some embodiments of the present disclosure.

FIG. 12C shows a flow diagram of a switch function in a predictive motion model for one or multiple HDVs that is used in a microscopic model for mixed traffic in a local area that is controlled by an ITC around one or multiple traffic intersections within the transportation network that is controlled by a hierarchical traffic control system, according to some embodiments of the present disclosure. FIG. 12C shows a flow diagram 1200C of the switch function used in the microscopic traffic model for mixed traffic in the local area controlled by the ITC around one or multiple traffic intersections within the transportation network that is controlled by a hierarchical traffic control system. The switch function for each of the one or multiple HDVs includes one or multiple motion models for one or multiple switching conditions. In an example, the one or multiple motion models includes a first motion model for a stopping maneuver in a stopping zone at each of the multiple intersections of roads in the transportation network if a corresponding traffic sign is red for a crossing direction and the HDV is within a first safety distance from the stopping zone, a second motion model for a safe leading vehicle following behavior if a leading vehicle is within a second safety distance in front of the HDV and the leading vehicle is in the same lane of the same road segment as the HDV, and/or a third motion model for traveling at a desired average speed if there is no leading vehicle within the second safety distance in front of the HDV and the leading vehicle is not in the same lane as the HDV, or the HDV is not within the first safety distance from the stopping zone and the corresponding traffic sign is not red.

In some embodiments, the future driving behavior of an HDV is modeled using a switched dynamical system that is able to predict reactions of the HDV to an estimated or predicted driving behavior of one or multiple CAVs or HDVs in a local neighborhood around the HDV, and to predict reactions of the HDV to traffic rules or traffic lights in the transportation network. In particular, the HDV predictive motion model predicts a new state for the HDV, given the current state of the HDV using real-time information from the infrastructure sensing module 406.

The steps identified in FIG. 12C, and the order thereof, are exemplary and may include various alternatives, equivalents, or derivations thereof including but not limited to the order of execution of the same. The steps of the method 1200C of FIG. 12C, and its various alternatives, may be embodied in hardware or software including a computer-readable storage medium (e.g., optical disc, memory card, or hard drive) including instructions executable by a processor included in the hierarchical traffic control system 600A. Ultimately, the steps of method 1200C of FIG. 12C result in a predicted HDV state 1245.

At 1231, a current state of an HDV is received and fed to the HDV predictive motion model.

At 1235, the HDV predictive motion model determines if a traffic light is red for a crossing direction and the HDV is within a safety distance from a stopping zone. In some embodiments, a value of the safety distance may be predetermined based on experimental observations or may be set by a local authority.

At 1236, the HDV predictive motion model predicts that the HDV performs a stopping maneuver in the stopping zone at a traffic intersection if the traffic light is red for the crossing direction and the HDV is within the safety distance from the stopping zone.

At 1240, the HDV predictive motion model determines whether a vehicle leading the HDV is within safety distance in front of the HDV when either of the condition mentioned at step 1235 is not satisfied, i.e, either the traffic light is not red for the crossing direction or the HDV is not within the safety distance from the stopping zone.

At 1241, the HDV predictive motion model predicts that the HDV performs a safe leader following behavior if the HDV is not within the safety distance from the stopping zone and/or the traffic light is not red, but if a leading vehicle is within a safety distance in front of the HDV and it is in the same lane as the HDV.

At 1242, the HDV predictive motion model predicts that the HDV continues traveling at a desired average speed if there is no leading vehicle within the safety distance in front of the HDV and/or the leading vehicle is not in the same lane as the HDV.

Figure 12D:
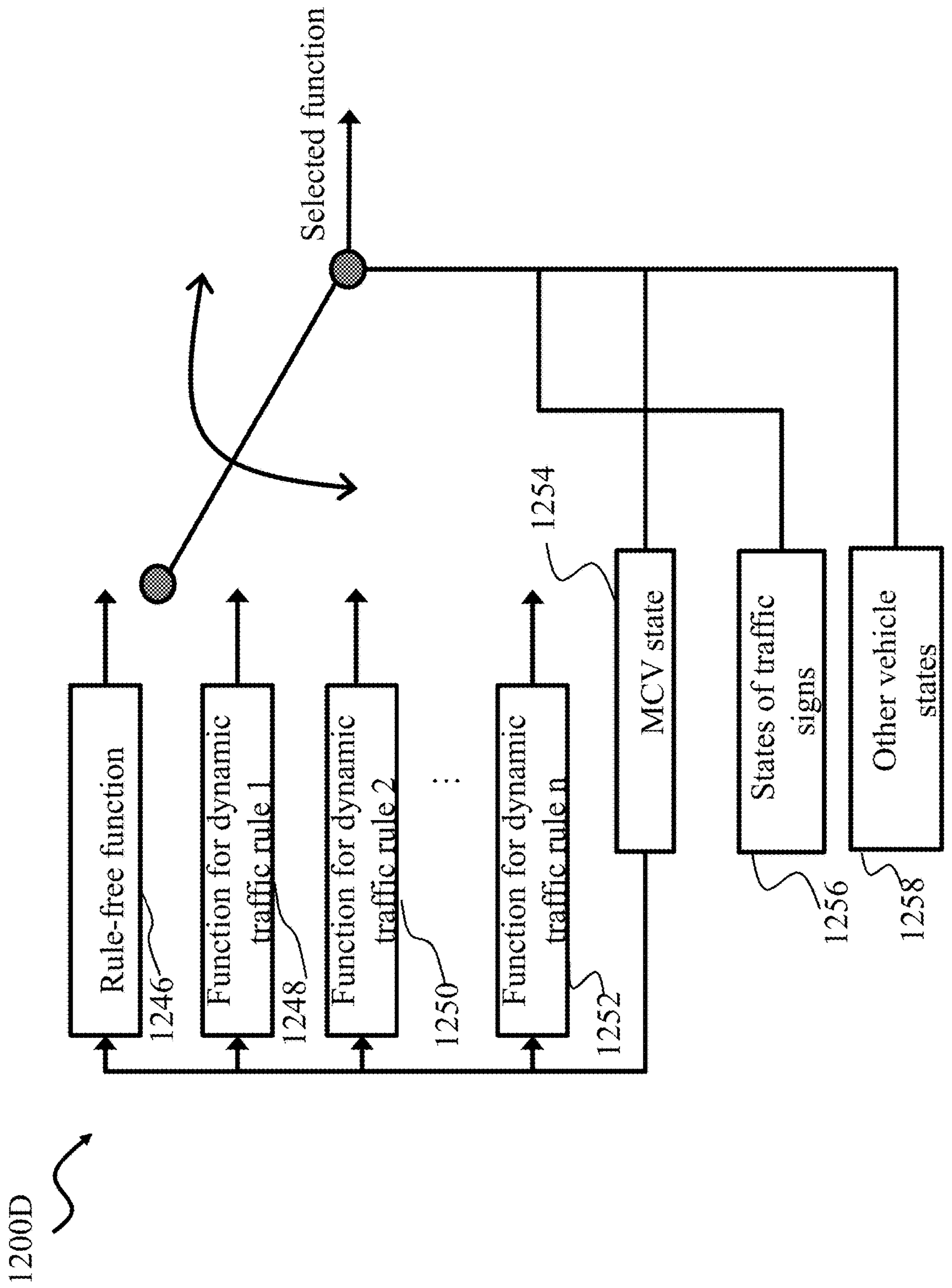
FIG. 12D shows a schematic for a motion model of an HDV, according to some embodiment of the present disclosure.

FIG. 12D shows a schematic for a motion model of an HDV, according to some embodiment of the present disclosure. FIG. 12D shows a schematic for the motion model 1200D of the HDV. Different functions for different dynamic traffic rules are formulated. For example, a function 1248 for dynamic traffic rule1, a function 1250 for dynamic traffic rule2, a function 1252 for dynamic traffic rule n, are formulated. Each of the functions 1248-1252 represents a motion model for the corresponding dynamic traffic rule. In other words, each function describes behavior of the HDV in response to the corresponding dynamic traffic rule. The motion models represented by the functions 1248-1252 are referred to as rule-restricted motion models. In addition, a rule-free function 1246 representing a rule-free motion model is formulated. The rule-free motion model is unaffected by the dynamic traffic rules.

Selection of a function to be active for the HDV depends on states 1256 of the traffic signs, a state 1254 of the HDV, and other vehicles' states 1258. The state 1254 of the HDV includes at least one of a position, a velocity, an acceleration, and a lane of the HDV. Hence, while the functions 1246-1252 themselves may not be dependent on the states 1256 of the traffic signs, however, the selection of the function to be active at a particular control step depends on the states 1256 of the traffic signs. Collectively, the functions 1246-1252 are referred to herein as a switch (discontinuous) function that selects a function representing the motion model for the HDV, based one or a combination of the states 1256 of the traffic signs, the state 1258 of the HDV, and the other vehicles' states 1258. The functions 1246-1252 individually describe dynamic traffic rules that the HDVs should follow.

According to an embodiment, the selected function can be used as the motion model of the HDV for the joint optimization of a CAV and the HDV. In particular, the traffic control system solves a MIP optimizing a cost function for values of the control commands changing states of each of the CAVs and values of the control commands changing states of each of the traffic signs. The cost function is optimized subject to the motion model of each of the CAVs and the motion model of each of the HDVs.

According to an embodiment, the motion model of the CAV may represented as a dynamical system $$x_i(t+1) = f(x_i(t),\ u_i(t)) \quad (11)$$

$$p_i(t) = h_p(x_i(t),\ u_i(t))$$

$$\lambda_i(t+1) = h_\lambda(x_i(t),\ u_i(t))$$

where t is an index of a time instant in a discrete-time sequence of sampling instants, equispaced with sampling period $T_s$, $x_i$ is CAV state vector, u, is a control vector (also referred to as control command)determined by the traffic control system, f is a state update function, which is normally a continuous function determining an evolution of system state $x_i$ over time, $h_p$ and $h_E$ are output functions that provide a current position of the CAV along its route (route-relative position) and a current lane of the CAV.

The CAV is also subject to constraints which represents limitations on the velocity, acceleration, and possibly control commands, $$x_i \in \mathcal{X}_i,\ u_i \in \mathcal{U}_i \quad (12)$$

where $X_i$, $U_i$ are admissible state and input regions, respectively.

In some embodiments, constraints that model the general traffic rules are formulated. For example, an exemplary model is described for the traffic lights. Other traffic rules can be modelled similarly with modifications due according to their functions. A traffic light in conflict zone $j \in J^x$ where $J^x$ is a set of all conflict zones, is represented by a number of variables $\psi_j^d$ with logic values where true (or 1) indicates passing the conflict zone j in direction d is allowed, while false (or 0) indicates that passing the conflict zone j in direction d is not allowed where $d \in D(j)$indexes directions D(j) in the conflict zone j. Thus, the fact that only one direction is allowed to cross the intersection at the same time is represented by a logic constraint $$\underline{\vee}_{d \in \mathcal{D}(j)} \psi_j^d,\ \forall\ j \in \mathcal{J}^x_{\underline{\vee}_{d \in D(j)} \psi_j^d, \forall j \in \mathcal{J}^x} \quad (13)$$

where $\underline{\vee}$ is an exclusive or (xor) operator, and hence 1 and only 1 direction is allowed to pass through the intersection at any time. In certain embodiments of the constraint (13) is modified to allow group of directions to cross the intersection at the same time as long as that does not cause the vehicles to possibly collide, i.e., directions in the intersection do not cross.

Further, in an embodiment, the optimization of the cost function is subject to timing constraints. The timing constraints include at least one of a timer enabling or disabling a change of the traffic signs and a timer enabling or disabling a change of CAV driving lane. For example, timers $T_{\psi_j^d}$ associated with the traffic lights are used to restrict the generate control commands for the traffic lights such that a minimum and maximum time for changing lights in the traffic light is satisfied, $$\mathcal{T}_{\psi_j^d}(t) \le \mathcal{T}_{\psi_j^d}^{min} \Rightarrow \psi_j^d(t+1) = \psi_j^d(t) \quad (14)$$

$$\mathcal{T}_{\psi_j^d}(t) \le \mathcal{T}_{\psi_j^d}^{max} \Rightarrow \psi_j^d(t+1) \ne \psi_j^d(t)$$

The traffic control system may update a timer T, monitoring a change of variable V by evaluating $$\mathcal{T}_v(t+1) = \begin{cases} \mathcal{T}_v(t) + T_s & \text{if } v(t+1) = v(t) \\ 0 & \text{if } v(t+1) \ne v(t) \end{cases} \text{ and} \quad (15)$$

$$\mathcal{H}(v(t+1), v(t), \mathcal{T}_v(t)) \le 0,$$

models the constraints on when value of V can change, based on timer value $T_V$.

The traffic control system ensures that the CAVs are assigned to available lanes by computing control commands that satisfy constraint $$p_i \in \mathcal{Z}_j^d(i) \Longrightarrow \lambda_i \in S_\lambda^d(j), \quad (16)$$

where $Z_j^d(i)Z_j^d(i)$ is a set of positions of the i-th vehicle (CAV or HDV) along its route for which it is in j-th zone, either conflict or conflict-free, in d-th direction, and $s_\lambda^d(j)$ is a set of lanes available in the j-th zone in the d-th direction. Additionally, constraints on minimum time between two lane changes may be imposed using a time for lane change of i-th CAV, $$\mathcal{T}_{\lambda_i}(t) \le \mathcal{T}_{\lambda_i}^{min} \Rightarrow \lambda_i(t+1) = \lambda_i(t) \quad (17)$$

where $T_{\lambda_i}$ is a timer on lane change of i-th CAV that the traffic control system defines similarly to (15). The traffic control system controls operation of vehicles (both CAVs and HDVs) in the intersection by generating control commands that satisfy constraints $$p_i \in \mathcal{Z}_j^d(i) \Longrightarrow p_{\bar{l}} \notin \mathcal{Z}_j^{\bar{d}}(\bar{l}), \forall\, i \neq, d \neq \bar{d} \tag{18}$$

$$-\psi_j^d \Longrightarrow p_i \notin \mathcal{Z}_j^d(i),$$

which ensure that if i-th vehicle is in the intersection in the d-th direction, then a different vehicle cannot be in the same intersection with a different direction, and that if the traffic light does not allow a direction to pass, no vehicle is in the intersection going through that direction. The traffic control system may also group directions into compatible directions that are allowed to pass through the intersection at the same time, as long as they do not cause collisions.

When value of $\psi_j^d$ can be changed by control commands for jointly controlling the CAVs and HDVs, the intersection rule (18) is a dynamic traffic rule in the sense that since for fixed vehicle positions, the satisfaction or violation of the traffic rule will not always be the same, since it depends on anz actual value of $\psi_j^d$, decided by the traffic control system.

Additionally, the traffic control system generates control commands for the CAVs, which avoid rear end collisions, by imposing the constraints $$p_i(t) \in \mathcal{Z}_j^d(i),\ p_i(t) \in \mathcal{Z}_t^d(\bar{l}), \tag{19}$$

$$z_j^i(p_i(t)) \leq z_j^{\bar{l}}\big(p_{\bar{l}}(t)\big) \Longrightarrow z_j^i(p_i(t+1)) \leq z_j^{\bar{l}}\big(p_{\bar{l}}(t+1)\big) \vee \lambda_i(t+1) \neq \lambda_{\bar{l}}(t+1)$$

which ensure that if i-th vehicle is behind another vehicle in the same j-th zone going in the same d-th direction at a certain time instant t, then it will be behind the same vehicle at the next time instant t+1, or they will be in a different lane, where function $z_j^i(p_i)$provides a position of i-th vehicle in the j-th zone in global coordinates for route-relative vehicle position $p_i$.

The collision avoidance rule (19) on the position of the vehicle, is independent from other variables controlled from the traffic control system, other than the position of the vehicles themselves, and hence it is not a dynamic traffic rule, since for fixed vehicle positions, the satisfaction of violation of the traffic rule will always be the same.

In an embodiment, the motion model for the HDV may be described as a switched dynamical system of form $$x_i(t+1) = \begin{cases} g_\xi(x_i(t)) & \text{if } \mathcal{G}_\xi(X(t), \psi(t)) \leq 0 \\ g_0(x_i(t)) & \text{otherwise} \end{cases} \tag{20}$$

$$p_i(t) = h_p(x_i(t))$$

$$p_i(t) = h_\lambda(x_i(t)),$$

X={$x_i$}i ∈I is a set of all vehicle states, ψ={$\psi_j^d$}j ∈J, d ∈D(j) is a set of all controlled direction traffic lights, g0 is a function describing the rule-free motion model, and gξ, ξ∈□ are functions representing the motion models in presence of the traffic rules. The traffic rule activates the motion model gg, E, when the function gξ, ξ∈□ is non-positive and $$\mathcal{G}_{\xi_1}(X(t), \psi(t)),\ \leq 0 \Longrightarrow \mathcal{G}_{\xi_2}(X(t), \psi(t)) > 0,\ \forall\, \xi_2 \in \Xi,\ \xi_2 \neq \xi_1 \tag{21}$$

i.e., non-positivity of the functions $g_\xi$, ξ∈□ is mutually exclusive.

As a specific example of (20) in the case when stopping at red traffic light is considered, the motion model for the HDV may be given as $$p_i(t+1) = \begin{cases} p_i(t) & \text{if } \begin{cases} \exists\, d \epsilon \mathcal{D}(j),\ p_i \notin \mathcal{Z}_j^d(i) \\ p_i + \overline{\Delta} \in \mathcal{Z}_t^d(i),\ \sqrt{\psi_j^d} \end{cases} \\ p_i(t) + v_i T_s & \text{otherwise} \end{cases} \tag{22}$$

where in case a position of the i-th HDV is not yet in the d-th direction of the j-th conflict zone but it is not more than Δ away from it, and the traffic light does not enable crossing in the d-th direction of the j-th conflict zone, the i-th HDV stops, otherwise, it proceeds with its current speed. In case of the motion model (20) there is only one traffic rule and hence two models: one for when the HDV is affected by such traffic rule, which occurs near the intersection, when the light is red, and another one is the rule-free model that is used otherwise.

Further, to jointly control the CAVs and the HDVs, the traffic control system determines the values of the control commands changing the states of each of the CAVs and the values of the control commands changing the states of each of the traffic signs according to a cost function, to be minimized, which represents the individual objectives and the common objective that the CAVs and HDVs must achieve. In an embodiment, the cost function be formulated as $$J(P_N, \Lambda_N, U_N, \psi_N) = F(P(N \mid t), \Lambda(N \mid t), \psi(N \mid t)) + \sum_{k=0}^{N-1} L(P(k \mid t), \Lambda(k \mid t), U(k \mid t)\psi(k \mid t)) \tag{23}$$

where $P_N$=(P(0|t) . . . P(N|t)) is a sequence of predicted positions at time t over the future horizon of N steps of all the vehicles, e.g., the vehicles 126-146, $\Lambda_N$=(Λ((0|t) . . . Λ((N|t)) is a sequence of predicted lane occupation at time t over future horizon of N steps by all the vehicles, $U_N$=(U (0|t) . . . U((N|t)) is a sequence of predicted control commands at time t over the future horizon of N steps for all the CAVs and $\psi_N$=(ψ(0|t) . . . ψ((N|t)) are the control commands for the traffic signs, F is a terminal cost, L is a stage cost, and notation a(k|t) describes value of a predicted k steps ahead of time t.

The stage and terminal costs may be composed of multiple terms. For instance, a term $$\sum\nolimits_{i \in I} w_i^p \left(1 - \frac{p_i(k \mid t)}{p_i^{end}}\right)^l \tag{24a}$$

sums a normalized distance of the vehicles 126-146 to an end of their travel $p_i^{end}$, where l=1,2 determines whether that distance is square or not, and $w_i^p>0$ are weights encoding priorities of the vehicles 126-146 and a priority of this term with respect to other terms. (24*a*) enables controlling of the vehicles 126-146 such that they reach their destination at the earliest, and as such enables optimizing the individual time of completion of the objective of each specific individual vehicle.

Further, a term $$w^m\left(\max_{i\in I}\left(1-\frac{p_i(k\mid t)}{p_i^{end}}\right)\right)^l \tag{24b}$$

gives the maximum normalized distance among all the vehicles 126-146 from their destination and $w^m>0$ is a weight encoding the priority of this term with respect to other terms. (24*b*) enables controlling of the vehicles 126-146 such that the last vehicle to reach its destination, reaches its destination as soon as possible, and as such enables optimizing the time of completion of the common objective for the specific group of individual vehicles considered in the optimization.

In some implementations, in both (24*a*) and (24*b*) the normalization may be removed.

Further, in some embodiments, when the CAV control signal u is a commanded velocity tracked by a CAV on-board velocity controller, a term $$\sum_{i\in I} w_i^u(|u_i(k\mid t)-v_{ref}|)^l \tag{24c}$$

sums differences between the commanded velocities and a desired velocity vref in an area, where $w_i^u>0$ are weights encoding the priorities of the vehicles 126-146 and a priority of this term with respect to other terms. (24*c*) is indicative of a difference between a commanded/current velocity and the desired velocity of each of the CAVs and the HDVs. (24*c*) enables controlling of the vehicles 126-146 such the vehicles 126-146 maintain a velocity close to the target velocity, and hence at avoiding slowdowns/speed-ups from such target velocity, with an effect to reducing accelerations/decelerations and idling, with consequences of reducing fuel consumption and emissions.

Further, a term $$\sum_{i\in I} w_i^\lambda(|\lambda_i(k\mid t)-\lambda_{ref}|)^l \tag{24d}$$

where $w_i^\lambda>0$ are weights encoding the priorities of vehicles 126-146 and a priority of this term with respect to other terms. (24*d*) is indicative of a difference between a current lane and a desired lane of each of the CAVs and the HDVs. (24*d*) enables controlling of the vehicles 126-146 such that the vehicles 126-146 keep a lane as close as possible to the desired lane, e.g., the rightmost one. Furthermore, a term $$w^\psi\left(\left|\sum_{j,d}\psi_j^d(k\mid t)-\varsigma_{ref}\right|\right)^l \tag{24e}$$

where $W^{\Psi}>0w^{\Psi}>0$ is a weight encoding a priority of this term with respect to other terms. (24*e*) indicates a difference between a combination, specifically the sum, of the current state of all traffic signs and a desired value for such combination. (24*e*) enables controlling of the traffic signs such that their operation is as close as possible to a desired target, for instance a desired total number of green traffic lights.

Additionally, a term $$w^{\Delta\psi}\sum_{j,d}(|\psi_j^d(k\mid t)-\psi_j^d(k-1\mid t)|)^l \tag{24f}$$

where $w^{\Delta\Psi}>0$ is a weight encoding a priority of this term with respect to other terms, penalizes a change of the traffic light status, e.g., from red to green and vice versa, and (24*f*) avoids excessively frequent changes to the traffic signs, which aims at ensuring traffic lights do not cycle too quickly as this can create undesired effects on HDV traffic such as excessive stop and go, which increases pollution due to idling engines.

Similarly to (24*f*), a term $$\sum_{i\in I} w_i^{\Delta\lambda}(|\lambda_i(k\mid t)-\lambda_i(k-1\mid t)|)^l \tag{24g}$$

where $w_i^{\Delta\lambda}$ are $w_i^{\Delta\lambda}\geq 0$ are weights encoding a priority of this term with respect to other terms, penalizes a change of lanes of each vehicle, and (24*f*) prevents CAVs to change the lane, e.g., from left lane to right lane, which in turn avoids creating undesired effects on the HDV traffic, like excessive speed variations due to vehicles changing lanes in front. In some embodiments, reference values $v_{ref}$, $\lambda_{ref}$, $c_{ref}$, vary depending on the zone, direction, vehicle, and time instant.

Figure 12E:
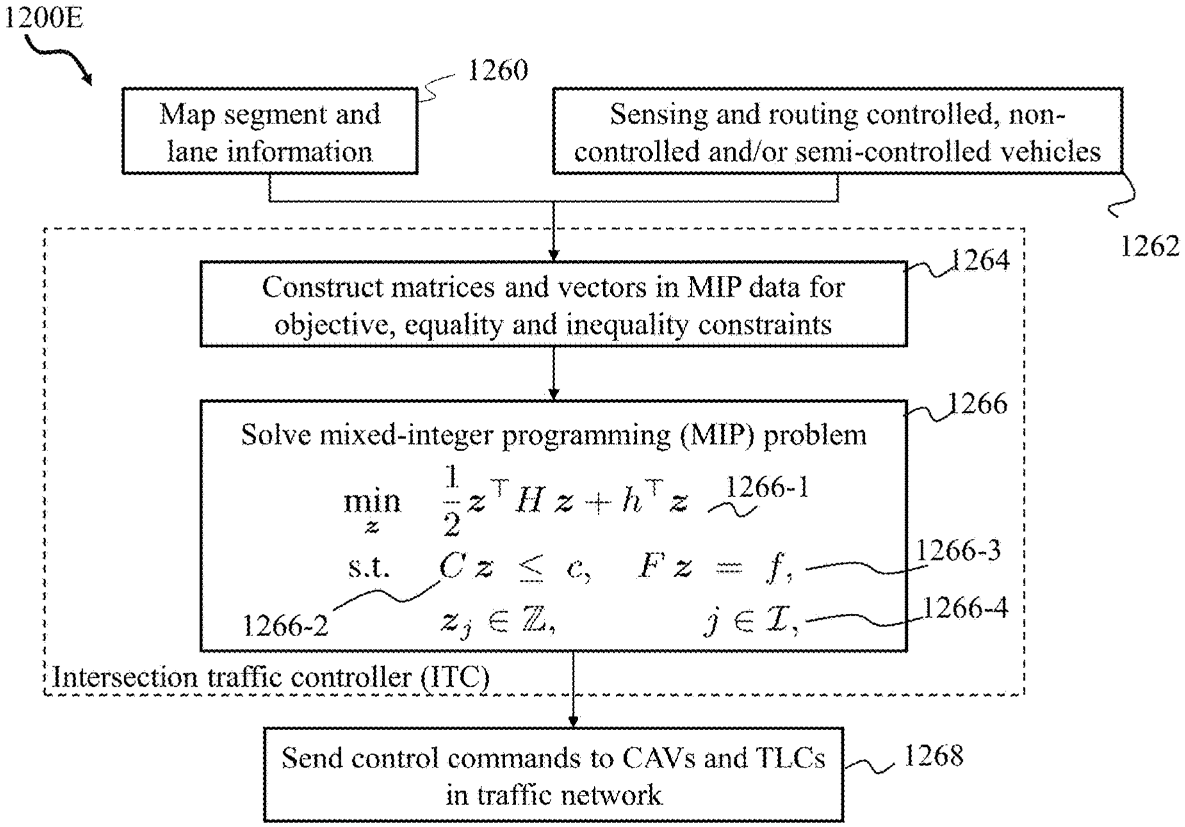
FIG. 12E shows a method for constructing and solving an MIP problem based on mixed-integer equality and inequality constraints for predictive motion models of one or multiple CAVs, HDVs, TLCs, and non-convex traffic rules in the transportation network that is controlled by the hierarchical traffic control system, according to some embodiments of the present disclosure.

FIG. 12E shows a method for constructing and solving an MIP problem based on mixed-integer equality and inequality constraints for predictive motion models of one or multiple CAVs, HDVs, TLCs, and non-convex traffic rules in the transportation network that is controlled by the hierarchical traffic control system, according to some embodiments of the present disclosure. The steps identified in FIG. 12E, and the order thereof, are exemplary and may include various alternatives, equivalents, or derivations thereof including but not limited to the order of execution of the same. The steps of the method 1200E of FIG. 12E, and its various alternatives, may be embodied in hardware or software including a computer-readable storage medium (e.g., optical disc, memory card, or hard drive) including instructions executable by a processor included in the hierarchical traffic control system 600A. In another embodiment, the steps of the method 1200E of FIG. 12E, and its various alternatives, may be embodied in hardware or software including a computer-readable storage medium (e.g., optical disc, memory card, or hard drive) including instructions executable by a processor included in the ITC 408 or 410. FIG. 12E shows the method 1200E that involves a feedback loop for ITC 408 or 410.

At 1260, the ITC 408 or 410 receives map segment and lane information for the multiple interconnected traffic intersections in the transportation network.

At 1262, the ITC 408 or 410 receives feedback signals related to sensing and routing from controlled, non-controlled and/or semi-controlled vehicles.

At 1264, the ITC 408 or 410 constructs matrices and vectors in MIP data of the ITC for objective, equality and inequality constraints.

At 1266, the ITC 408 or 410 solves the MIP problem based on mixed-integer equality and inequality constraints for predictive motion models of one or multiple CAVs, HDVs and TLCs in the transportation network and mixed-integer equality and inequality constraints for non-convex traffic rules.

At 1268, the ITC 408 or 410 computes and sends the optimal control commands to one or multiple CAVs and TLCs in the transportation network that is controlled by the hierarchical traffic control system 600A.

According to some embodiments of the disclosure, the MIP problem includes a linear-quadratic objective function 1266-1, one or multiple linear inequality constraints 1266-2, one or multiple linear equality constraints 1266-3, and one or multiple integer feasibility constraints 1266-4. Some embodiments are based on the realization that the MIP problem is a mixed-integer convex programming (MICP) problem, i.e., the MIP problem becomes a convex programming (CP) problem for fixed values of the integer optimization variables, and the MICP may be solved computationally efficiently, e.g., using a branch-and-bound optimization method.

In some embodiments of the disclosure, the MIP problem may be a mixed-integer linear programming (MILP) or mixed-integer quadratic programming (MIQP) problem. For example, the MIP that is illustrated in FIG. 12E is an MIQP that consists of a linear-quadratic objective function 1266-1, defined by a positive semi-definite Hessian matrix $H \geq 0$ and a gradient vector h. The MIP can additionally include one or multiple linear inequality constraints 1266-2, defined by the constraint matrix C and constraint vector c, and one or multiple linear equality constraints 1266-3, defined by the constraint matrix F and constraint vector f. Finally, the MIQP 1266 for the hierarchical traffic control system 600A may include one or multiple integrality constraints 1266-4, which restrict one or multiple optimization variables $z_j$ to lie in the set of integer values, i.e., $z_1 \in \mathbb{Z}$. In some embodiments of the disclosure, the objective function 1266-1 is a linear function, i.e., H=0, such that the resulting MIP 1266 is an MILP optimization problem.

In some embodiments of the disclosure, the microscopic traffic model in one ITC 408 or 410 of the hierarchical traffic control system 600A defines the dynamics of one or multiple CAVs and HDVs as the evolution of a positional state p along the direction of motion in the transportation network and according to a target velocity v, for example, the MIP equality constraints 1266-3 may include one or multiple linear equality constraints as follows $$p(t+1) = p(t) + \frac{v(t)+v(t+1)}{2}\Delta t, \tag{25}$$

where $\Delta t$ is the discretization time of the vehicle dynamics. In some embodiments of the disclosure, to ensure realistic target velocities, the velocity assigned by the ITC 408 or 410 to one or multiple CAVs needs to be within a speed limit, $v(t) \leq V$, and it needs to satisfy the maximum acceleration $a_{max}$ and the maximum deceleration $a_{min}$ limit of each vehicle, for example, the MIP inequality constraints 1266-2 may include one or multiple linear inequality constraints $$v(t) - a_{min}\Delta t \leq v(t+1) \leq v(t) + a_{max}\Delta t \tag{26}$$

In some embodiments of the disclosure, the MIP 1266 defines one or multiple binary optimization variables to represent a prediction model for lateral dynamics of CAVs and/or HDVs, for example, using binary variables $\sigma_i^h=1$ if vehicle $i \in V$ is in lane $h \in Z_1^{m_l}$, where $h \in \{1, \ldots, m_l\} = Z_1^{m_l}$ and $m_l$ is the maximum number of lanes on a road segment in the transportation network that is controlled by the hierarchical traffic control system. These binary variables are used by an ITC 408 or 410 to model lane changes, to ensure vehicles enter one or multiple traffic intersections in the correct lane and to impose collision avoidance constraints in multi-lane traffic scenarios. At every time step in a prediction time window of an ITC, each vehicle is always in exactly one of the traffic lanes, i.e., $E_h \sigma_i^h = 1$.

In some embodiments of the disclosure, a prediction motion model for lateral dynamics of CAVs and/or HDVs is defined using discrete switching between lanes in a road segment of the transportation network that is controlled by a hierarchical traffic control system. For example, some embodiments of the disclosure introduce two binary optimization variables $l_{i,u}^c(t)$, $l_{i,d}^c(t) \in \{0,1\}$ in the MIP problem 1266 of an ITC to represent a lane change up and down respectively as follows $$\begin{aligned} &\sigma_i^h(t) \wedge l_{i,u}^c(t) \Rightarrow \sigma_i^{h+1}(t+1) \\ &\sigma_i^h(t) \wedge l_{i,d}^c(t) \Rightarrow \sigma_i^{h-1}(t+1) \end{aligned} \tag{27}$$

The latter implications can be enforced, for example, by adding the following mixed-integer inequality constraints for each vehicle $i \in V$ and for each time step $t \in Z_0^{N-1}$ to the MIP inequality constraints 1266-2

$$\begin{aligned} &1 - \left(1 - \sigma_i^h(t)\right) - \left(1 - l_{i,u}^c(t)\right) \leq \sigma_i^{h+1}(t+1) \leq 1, \\ &1 - \left(1 - \sigma_i^h(t)\right) - \left(1 - l_{i,d}^c(t)\right) \leq \sigma_i^{h-1}(t+1) \leq 1. \end{aligned} \tag{28}$$

Similarly, in some embodiments of the disclosure, one or multiple mixed-integer inequality constraints for each vehicle $i \in V$ and for each time step $t \in Z_0^{N-1}$ are added to the MIP inequality constraints 1266-2 to impose the following implication that each vehicle remains in the same lane of a road segment at two subsequent time steps if no lane change maneuver is performed, i.e., $$\sigma_i^h(t) \wedge \neg\, l_{i,u}^c(t) \wedge \neg\, l_{i,d}^c(t) \Rightarrow \sigma_i^h(t+1) \tag{29}$$

In addition, in some embodiments of the disclosure, the following MIP inequality constraints 1266-2 prevent lane changes both up and down at the same time step, they prevent a lane change down from the lowest lane, and they prevent a lane change up from the highest lane in a road segment of the transportation network, i.e., $$l^{c}_{i,u}(t)+l^{c}_{i,d}(t)\le 1,\qquad (30)$$
$$l^{c}_{i,d}(t)+\sigma_i^{1}(t)\le 1,$$
$$l^{c}_{i,u}(t)+\sigma_i^{m_1}(t)\le 1.$$

In some embodiments of the disclosure, the MIP 1266 of each ITC includes one or multiple obstacle avoidance constraints for each pair of vehicles that are sufficiently close to each other within the transportation network and whose trajectories may lead to potential collisions. For example, in some embodiments of the disclosure, vehicles within one road segment or vehicles in adjoining road segments of the transportation network are paired up to impose one or multiple collision avoidance constraints in the MIP problem 1266. For such vehicle pairs, we enforce that the lead vehicle should remain ahead of the following vehicle, while both vehicles are in the same lane, for example, using following implications $$\{p_{i_1}(t)\le p_{i_2}(t)\}\wedge\{\sigma^h_{i_1}(t+1)=\sigma^h_{i_2}(t+1)\}\Rightarrow p_{i_1}(t+1)\le p_{i_2}(t+1),\qquad (31)$$
$$\{p_{i_1}(t+1)\le p_{i_2}(t+1)\}\wedge\{\sigma^h_{i_1}(t+1)=\sigma^h_{i_2}(t+1)\}\Rightarrow p_{i_1}(t)\le p_{i_2}(t)$$

for each lane $h \in Z_1^{m_l}$, for each pair of vehicles $i_1 \in V$, $i_2 \in V$, and for each time step t E Z in a prediction time window of an ITC. Some embodiments of the disclosure are based on the realization that the latter implications can be enforced by adding one or multiple auxiliary variables and one or multiple mixed-integer inequality constraints to the MIP inequality constraints 1266-2.

In some embodiments of the disclosure, the MIP problem 1266 of each ITC includes one or multiple obstacle avoidance constraints by adding the following mixed-integer inequality constraints to the MIP inequality constraints 1266-2

$$p_{i1}(t)+R_{i1,i2}\ge\qquad (32)$$
$$p_{i2}(t)-MY^{c}_{i1,i2}(t)-M\big(1-Y^{l}_{i1,i2}(t)\big)+L_{i1}+D^{s}+k^{v}v_{i2}(t)-s^{c}_{i2},$$
$$p_{i1}(t+1)+R_{i1,i2}\ge$$
$$p_{i2}(t+1)-MY^{c}_{i1,i2}(t)-M\big(1-Y^{l}_{i1,i2}(t)\big)+L_{i1}+D^{s}+k^{v}v_{i2}(t)-s^{c}_{i2},$$
$$p_{i1}(t)+R_{i1,i2}\le$$
$$p_{i2}(t)+M\big(1-Y^{c}_{iI,i2}(t)\big)+M\big(1-Y^{l}_{i1,i2}(t)\big)-L_{i2}-D^{s}-k^{v}v_{i1}(t)+s^{c}_{i1},$$
$$p_{i1}(t+1)+R_{i1,i2}\le$$
$$p_{i2}(t+1)+M\big(1-Y^{c}_{i1,i2}(t)\big)+M\big(1-Y^{l}_{i1,i2}(t)\big)-L_{i2}-D^{s}-k^{v}v_{i1}(t)+s^{c}_{i1},$$
$$Y^{l}_{i1\,i2}(t)\ge\sigma^{h}_{i1}(t+1)+\sigma^{h}_{i2}(t+1)-1,$$

where $L_i$ defines the physical length of each vehicle $i \in V$ and the latter set of obstacle avoidance constraints use a time-varying value for the safety distance, which is defined as a base value $D^S$ plus a velocity-dependent component with coefficient $k^V$, and $R_{i_1,i_2}$ denotes an initial relative distance between a pair of vehicles $i_1 \in V$, $i_2 \in V$, and $s_i^c \geq 0$ represents a continuous slack variable that is added to the optimization variables of the MIP problem 1266 to ensure feasibility of the constrained optimization problem for each ITC in the presence of model mismatch and disturbances. In some embodiments of the disclosure, additional binary optimization variables are added to the MIP problem 1266 for each ITC to define the obstacle avoidance constraints, for example, including the binary variable $y_{i_1,i_2}{}^l \in \{0,1\}$ is 1 if the vehicles $i_1 \in V$ and $i_2 \in V$ are in the same lane at each time step $t \in Z_0^{N-1}$, and the binary variable $y_{i_1,i_2}{}^c \in \{0, 1\}$ defines the order between vehicles $i_1 \in V$ and $i_2 \in V$ to enforce collision avoidance at each time step $t \in Z_0^{N-1}$.

In some embodiments of the disclosure, the MIP inequality constraints 1266-2 include one or multiple linear inequality constraints to enforce the relationship between traffic light states and individual traffic light signal values, for example, $$\Psi^{d}_{j}(t)\ge F_{sd}\Phi^{s}_{j}(t),\qquad (33)$$
$$\Psi^{d}_{j}(t)\le 1-(1-F_{sd})\Phi^{s}_{j}(t),$$

where the matrix $F_{sd} \in \{0,1\}$ defines a mapping between multiple collision-free traffic light states and individual traffic light signal values for all states $s \in S$ and all directions $d \in D$ in each traffic intersection $j \in J$, for example, see the mapping 830 in FIG. 8B. In addition, the MIP equality constraints 1266-3 include a linear equality constraint that ensures that the traffic lights are exactly in one state $\Sigma_{s\in S}\Phi_j{}^S=1$ for each traffic intersection $j \in J$ at each time step $t \in Z_0^N$ in a prediction time window of an ITC in the hierarchical traffic control system.

In some embodiments of the disclosure, additional binary variables $\delta_{i,j}{}^d(t) \in \{0,1\}$ are added to the optimization variables of the MIP problem 1266 to represent the presence of a vehicle $i \in V$ inside of a traffic intersection $j \in J$ at a time step $t \in Z_0^N$. As part of the predicted or planned routing inputs to each ITC in the hierarchical traffic control system, according to some embodiments of the disclosure, fixed binary values $a_{i,j}{}^d \in \{0,1\}$ are given to indicate whether a vehicle $i \in V$ intends to cross a traffic intersection $j \in J$ in a particular crossing direction $d \in D$. For each vehicle $i \in V$, each ITC knows the position in relative coordinates at which the vehicle enters $P_{i,j}{}^{in}$ and exits $P_{i,j}{}^{out}$ each of the traffic intersections. Therefore, in some embodiments of the disclosure, the MIP 1266 includes the following bi-conditional constraints to define the binary variables $\delta_{i,j}{}^d(t) \in \{0,1\}$, i.e., $$p_i(t)\in\left[P^{in}_{i,j},P^{out}_{i,j}\right]\Leftrightarrow\sum\nolimits_{d}a^{d}_{ij}\delta^{d}_{ij}(t)=1\qquad (34)$$

The latter bi-conditional constraints can be implemented, for example, using a big-M formulation in multiple mixed-integer inequality constraints 1266-2 as $$p_i(t)\le P^{in}_{i,j}+s^{\delta}_i(t)+M\delta^{l}_{ij}(t),\qquad (35)$$
$$p_i(t)\ge P^{out}_{i,j}-s^{\delta}_i(t)-M\delta^{u}_{ij}(t),$$
$$\delta^{l}_{ij}(t)+\delta^{u}_{ij}(t)\le 1+\sum_{d}a^{d}_{ij}\delta^{d}_{ij}(t),$$
$$p_i(t)+M\delta^{d}_{ij}(t)\le P^{out}_{i,j}-s^{\delta}_i(t)+M,$$
$$p_i(t)-M\delta^{d}_{ij}(t)\ge P^{in}_{i,j}+s^{\delta}_i(t)-M,$$

where M>0 is a large constant value, $\delta_{i,j}^{l}(t)$, $\delta_{i,j}^{u}(t) \in \{0,1\}$ are auxiliary binary variables that are added to the optimization variables of the MIP 1266, and $s_i^{\delta}(t) \geq 0$ denotes a continuous slack variable that is added to the optimization variables of the MIP problem 1266 for each vehicle $i \in V$ and each time step $t \in Z_0^N$ to ensure feasibility of the MIP problem 1266 in the presence of model mismatch and disturbances.

In some embodiments of the disclosure, we can impose an upper bound on the maximum number of vehicles that can be inside each traffic intersection of the transportation network at each time step $t \in Z$ in the prediction time window of the ITC, for example, using a mixed-integer inequality constraint 1266-2 as $$\sum_i \delta_{ij}^{d}(t) \leq C_j^d \Psi_j^d(t),\ \forall\ j,\ d, \tag{36}$$

where $C_j^d$ defines a maximum traffic intersection capacity limit (upper bound based on physical intersection dimensions) for a specific direction $d \in D$ and $\psi_j^d(t)$ defines the traffic light signal value for that crossing direction, i.e., $\psi_j^d=0$ (red) or $\psi_j^d=1$ (green). The latter mixed-integer inequality constraint 962 additionally ensures that vehicles can only enter the intersection if the corresponding traffic light signal value is green, i.e., if $\psi_j^d=1$.

In some embodiments of the disclosure, a safe reference velocity $v_i^s(t)$ is computed for each HDV $i \in V^h$, which is used to predict HDV motion trajectories depending on a mode in the switched dynamical prediction model for the HDV. Therefore, in some embodiments of the disclosure, additional binary variables $b_i^f(t)$, $b_i^x(t) \in \{0,1\}$ are added to the optimization variables of the MIP 1266 to model switching between different modes in the switched dynamical prediction model for HDVs, i.e., indicating whether an HDV $i \in V^h$ is in the lead vehicle following mode or stopping for red traffic light mode. For example, for each HDV $i \in V^h$, we introduce the index $i_l \in V$ to denote its leading vehicle, if a vehicle exists ahead of the HDV $i \in V^h$ within a predetermined safety distance, and the leading vehicle could be either a CAV or an HDV in the transportation network. In some embodiments of the disclosure, a safe following distance is defined as a base value $D^f$ plus a velocity-dependent component with coefficient $k^f$. In some embodiments of the disclosure, the MIP problem 1266 includes the following bi-conditional constraints to define the binary variables $b_i^f(t) \in \{0,1\}$, i.e., $$p_{i1}(t) + R_{i1,i} - p_i(t) - L_{i1} \leq D^f + k^f v_i(t) \Leftrightarrow b_i^f(t) = 1, \tag{37}$$

where $R_{i_l,i}$ denotes an initial relative distance between HDV $i \in V^h$ and its leading vehicle $i_l \in V$, and where $L_{i_l}$ denotes the physical length of the leading vehicle. The latter bi-conditional constraints can be implemented, for example, using a big-M formulation in multiple mixed-integer inequality constraints 1266-2 as $$\begin{aligned} &p_{i1}(t) + R_{i1,i} - p_i(t) - L_{i1} \geq D^f + k^f v_i(t) - M b_i^f(t), \\ &p_{i1}(t) + R_{i1,i} - p_i(t) - L_{i1} \leq D^f + k^f v_i(t) + M\left(1 - b_i^f(t)\right), \end{aligned} \tag{38}$$

In some embodiments of the disclosure, the binary indicator variables $b_i^x(t) \in \{0,1\}$ are defined for an HDV stopping at a red traffic light, using a state of the associated traffic light signal and a set membership of the HDV in the braking region prior to the traffic intersection in the transportation network. Therefore, some embodiments of the disclosure include two additional binary variables $b_i^l(t) \in \{0,1\}$ and by(t) $\in \{0,1\}$ such that the HDV $i \in V^h$ is inside of the braking region when both these binary variables are equal to 1 for the next traffic intersection in the transportation network along the predicted route of the HDV. For each HDV $i \in V^h$, we denote an initial distance to the next traffic intersection as $P_i^{tl}$, and a safe stopping distance is defined using a base value DI plus a velocity-dependent component with coefficient kl. In some embodiments of the disclosure, the MIP 1266 includes the following implication constraints to define the binary variables $b_i^l(t)$, by (t), $b_i^x(t) \in \{0,1\}$, i.e., $$\begin{aligned} &P_i^{tl} - p_i(t) \leq D^l + k^l v_i(t) \Rightarrow b_i^l(t) = 1, \\ &p_i(t) \leq P_i^{tl} \Rightarrow b_i^u(t) = 1, \\ &b_i^l(t) = 1 \wedge b_i^u(t) = 1 \wedge \Psi_j^d(t) = 0 \Leftrightarrow b_i^x(t) = 1, \end{aligned} \tag{39}$$

where $j \in J$ denotes the next traffic intersection such that the HDV stops if and only if the HDV is inside the braking region and the traffic light is red for the corresponding crossing direction of the HDV $i \in V^h$. The latter implication constraints can be implemented, for example, using a big-M formulation in multiple mixed-integer inequality constraints 1266-2 as $$\begin{aligned} &P_i^{tl} - p_i \geq D^l + k^l v_i - M b_i^l, \\ &p_i + M b_i^u \geq P_i^{tl} \\ &b_i^l + b_i^u \leq 1 + b_i^x + \Psi_j^d,\ \Psi_j^d \leq (1 - b_i^x), \\ &-M(1 - b_i^x) \leq P_i^{tl} - p_i \leq D^l + k^l v_i + M(1 - b_i^x), \end{aligned} \tag{40}$$

where we omit the time index t for a compact notation.

In some embodiments of the disclosure, the safe reference velocity $v_i^s(t)$ for HDV $i \in V^h$ is defined based on the indicator variables $b_i^f(t)$, $b_i^x(t) \in \{0,1\}$, using the following implication constraints in the MIP 1266, i.e., $$\begin{aligned} &b_i^x(t) = 1 \Rightarrow v_i^s(t) = 0, \\ &b_i^x(t) = 0 \wedge b_i^f(t) = 1 \Rightarrow v_i^s(t) = v_{i_1}(t), \\ &b_i^x(t) = 0 \wedge b_i^f(t) = 0 \Rightarrow v_i^s(t) = \overline{v} \end{aligned} \tag{41}$$

where $v_{i_l}(t)$ denotes the estimated and/or predicted velocity for the leading vehicle $i_l \in V$ for HDV $i \in V^h$, and the value v denotes a desired target speed for the HDV. The latter implication constraints can be implemented, for example, using a big-M formulation in multiple mixed-integer inequality constraints 1266-2 as $$\begin{aligned} &v_i^s \leq M(1 - b_i^x), \\ &-M\left(1 - b_i^f\right),\ -M b_i^x \leq v_i^s - v_{i_1} \leq M\left(1 - b_i^f\right) + M b_i^x, \\ &-M b_i^f - M b_i^x + \overline{v} \leq v_i^s \leq \overline{v} \end{aligned} \tag{42}$$

where we omit the time index t for a compact notation.

Some embodiments of the disclosure include two additional binary variables $b_i^{max}(t)$, $b_i^{min}(t) \in \{0,1\}$ in order to impose maximum acceleration and maximum deceleration constraints for the HDV $i \in V^h$, i.e., the HDV velocity prediction model can be implemented using following implication constraints in the MIP problem 1266

$$v_i^s(t+1) - v_i(t) \geq a_{max}\Delta t \Leftrightarrow b_i^{max}(t) = 1, \tag{43}$$

$$v_i^s(t+1) - v_i(t) \leq -a_{min}\Delta t \Leftrightarrow b_i^{min}(t) = 1,$$

$$b_i^{max}(t) = 1 \Rightarrow v_i(t+1) = v_i(t) + a_{max}\Delta t,$$

$$b_i^{min}(t) = 1 \Rightarrow v_i(t+1) = v_i(t) - a_{min}\Delta t,$$

$$b_i^{max}(t) = 0 \wedge b_i^{min}(t) = 0 \Rightarrow v_i(t+1) = v_i^s(t+1)$$

Some embodiments of the disclosure include additional binary variables $l_{j,s}^{tl}(t) \in \{0,1\}$ in the optimization variables of the MIP 1266 for each collision-free traffic light state $s \in S$ of each traffic intersection $j \in J$, for example, $l_{j,s}^{tl}(t)=1$ if and only if the traffic light state changes, and this can be implemented using multiple mixed-integer inequality constraints 1266-2 as $$\Phi_j^s(t+1) - \Phi_j^s(t) \leq l_{jS}^{tl}(t) \leq \Phi_j^s(t+1) + \Phi_r^s(t) \tag{44}$$

$$\Phi_j^s(t) - \Phi_j^s(t+1) \leq l_{j,s}^{tl}(t) \leq 2 - \Phi_j^s(t+1) - \Phi_j^s(t)$$

In addition, in some embodiments of the disclosure, an additional binary variable $l_j^{tl}(t) \in \{0,1\}$ is added to the optimization variables of the MIP problem 1266 to denote if the overall state of the traffic intersection j E U has changed at each time step $t \in Z_0^N$, for example, this can be implemented using multiple mixed-integer inequality constraints 1266-2 as $$\sum\nolimits_{s\in S} l_{j,s}^{tl}(t) - 1 \leq \hat{l}_j^{tl}(t) \leq \sum\nolimits_{s\in S} l_{j,s}^{tl}(t) \tag{45}$$

In some embodiments of the disclosure, using the binary variable $l_j^{tl}(t) \in \{0,1\}$, an additional timer state variable $t_j^{tl}(t)$ can be defined in the optimization variables of the MIP problem 1266 using update and/or reset constraints that can be implemented using multiple mixed-integer inequality constraints 1266-2 as $$-\left(1 - \hat{l}_j^{tl}(t)\right)M \leq t_j^{tl}(t+1) \leq \left(1 - \hat{l}_j^{tl}(t)\right)M, \tag{46}$$

$$t_j^{tl}(t) + \Delta t + \hat{l}_j^{tl}(t)M \leq t_j^{tl}(t+1) \leq t_j^{tl}(t) + \Delta t + \hat{l}_j^{tl}(t)M$$

In some embodiments of the disclosure, the constraints of the MIP problem 1266 include one or multiple traffic light timing constraints to impose a minimum time between two consecutive traffic light change commands as well as an upper bound for the timer state variable as follows $$T_{min} - M\left(1 - \hat{l}_j^{tl}(t)\right) \leq t_j^{tl}(t) \leq t_{max} \tag{47}$$

In some embodiments of the disclosure, the objective function 1266-1 of the MIP problem 1266 is defined as a maximization of the following reward function $$J = \sum\nolimits_{t=1}^{N} \sum\nolimits_{i\in V} \left(w_1 p_i(t) - w_2\left|\sigma_i(t) - \sigma_i^{ref}\right| - w_3 l_{i,u}^c(t) - w_3 l_{i,d}^c(t) - w_4 s_i^\delta(t) - w_5 s_i^c(t)\right), \tag{48}$$

with user-defined weight values $w_i \geq 0$ for i=1, . . . ,5. According to some embodiments of the disclosure, the first term in the latter reward function aims to maximize the traveled distance $p_i(t)$ for all vehicles $i \in V$ in the transportation network that is controlled by the hierarchical traffic control system. The second term aims to penalize vehicles for not being in their preferred lane by minimizing $|\sigma_i(t) - \sigma_i^{ref}(t)|$, in which the absolute value can be implemented by defining auxiliary optimization variables in the MIP formulation 1266. The third and fourth terms aim to penalize unnecessary lane changes by minimizing the sum of the binary variables $l_{i,u}^c(t)$, $l_{i,d}^c(t)$ over the prediction time window of an ITC 408 or 410. Finally, the fifth and sixth terms aim to penalize a similar sum of continuous slack variables $s_i^\delta(t)$, $s_i^c(t) \geq 0$ that ensure feasibility of the MIP 1266 in the presence of model mismatch and disturbances. In some embodiments of the disclosure, large penalty weight values $w_4$, $w_5 >> 0$ are used to ensure that a solution with zero slack variables, i.e., with $s_i^\delta(t)=0$ and $s_i^c(t)=0$ is computed, whenever feasible.

Some embodiments of the disclosure are based on the realization that the prediction time window for the CTC 404 may be longer than the prediction time window for each of the ITCs 408 or 410 in the hierarchical traffic control system 600A that controls the mixed traffic in a transportation network of multiple interconnected traffic intersections, due to the use of the macroscopic traffic flow model and the use of convex relaxations of the non-convex traffic rules in the CTC 404 that results in a convex optimization problem 1158 that is computationally much easier to solve compared to the MIP formulation 1266 that is solved in each ITC 408 or 410.

In some embodiments, the mixed-integer optimization (minimization) problem 1266 can be solved using a branch-and-bound (B&B) optimization method that searches for a global optimal solution within a search space to produce an optimal control signal, where the B&B optimization iteratively partitions the search space into a nested tree of regions to find a solution with a globally optimal (minimal) objective value. The B&B method iteratively solves convex relaxations to compute lower bounds for the objective value within a region from the nested tree of regions. One or multiple regions can be pruned when the corresponding lower bounds are greater than the currently known upper bound to the globally optimal objective value. The upper bound to the globally optimal objective value can be updated when an integer feasible solution is found with an objective value that is smaller than the currently known upper bound to the globally optimal objective value.

Some embodiments of the disclosure are based on the realization that redundant optimization variables may be removed automatically by a pre-solve routine in the numerical optimization algorithm that is used to solve the MIP problem 1266 in the hierarchical traffic control system 600A. In some embodiments, one or multiple redundant optimization variables may be fixed explicitly to a particular value by adjusting the corresponding simple bounds for each redundant optimization variable in the MIP problem 1266.

Some embodiments of the disclosure are based on the realization that, after fixing one or multiple binary optimization variables, one or multiple of the corresponding inequality constraints may become redundant and they may be removed by setting the corresponding lower bound values to $-\infty$ and/or by setting the corresponding upper bound values to $\infty$.

Figure 13:
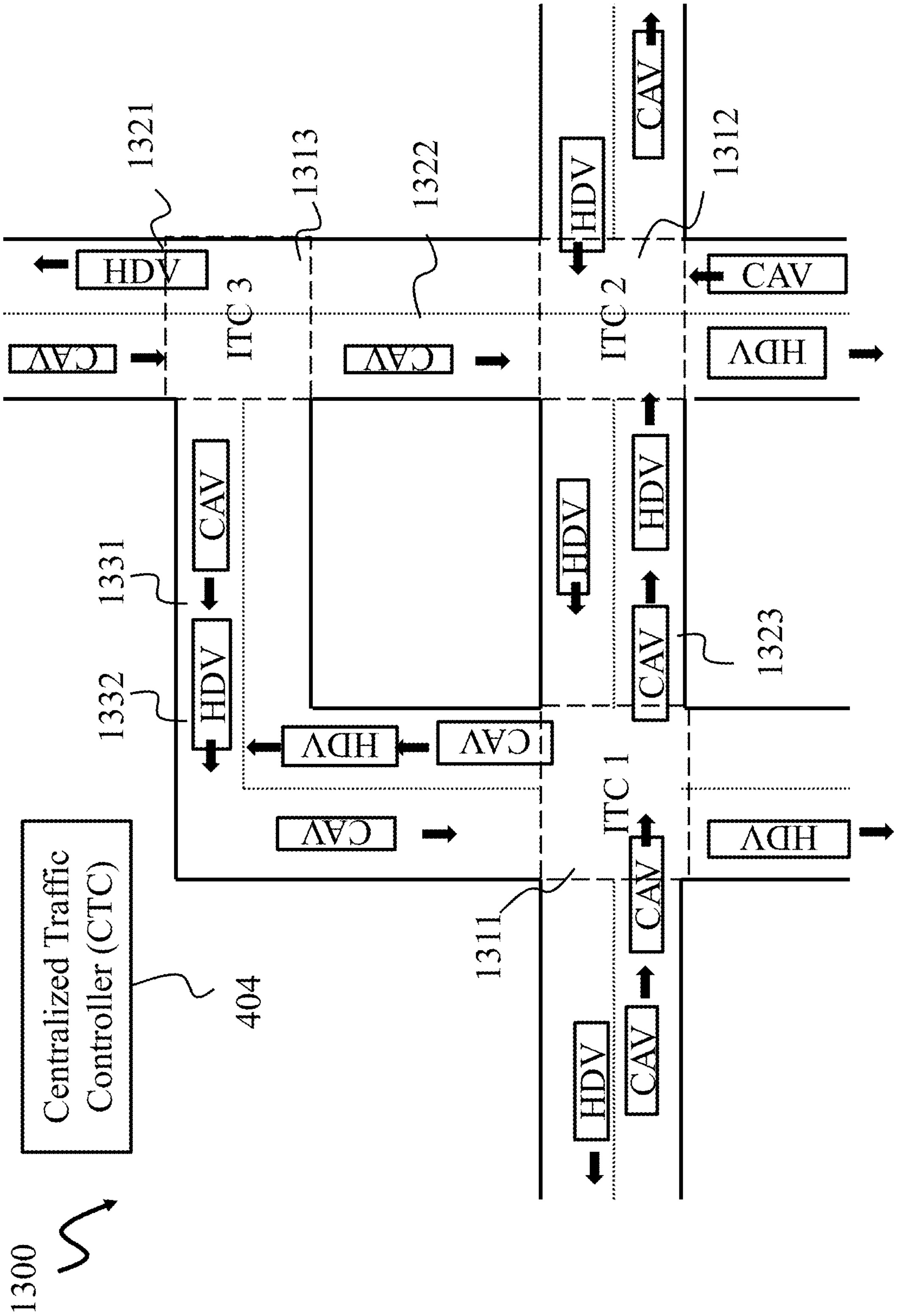
FIG. 13 shows an example of a traffic scenario in a transportation network of multiple interconnected traffic intersections including mixed traffic of CAVs and HDVs that are controlled by one CTC in combination with multiple ITCs in a hierarchical traffic control system, according to some embodiments of the present disclosure.

FIG. 13 shows an example of a traffic scenario in a transportation network of multiple interconnected traffic intersections including mixed traffic of CAVs and HDVs that are controlled by one CTC in combination with multiple ITCs in a hierarchical traffic control system, according to some embodiments of the present disclosure. FIG. 10A shows an exemplary traffic scenario 1300 in the transportation network of the multiple interconnected traffic intersections including the mixed traffic that are controlled by one CTC 404 in combination with multiple ITCs 1311-1313 in a hierarchical traffic control system 600A, and each ITC is assigned the task of controlling mixed traffic through one traffic intersection in the transportation network. In some embodiments, one or multiple rules are used for assignment of CAVs and/or HDVs to each of the ITCs 1011-1013 in the hierarchical traffic control system 600A in order to reduce the computational cost for the solution of the constrained optimization problems, while maintaining a good control performance and ensuring safety for all vehicles at all times in the transportation network.

Some embodiments of the disclosure are based on the realization that a switched dynamical prediction model may be used in each ITC for both HDVs and for CAVs that are controlled by a different ITC in the hierarchical traffic control system. For example, each CAV could be assigned to one ITC "for control", and the same CAV could be assigned to one or multiple other ITCs "for prediction" in order to increase control performance and safety for all vehicles, especially when vehicles transition from one ITC to the next ITC in the transportation network.

In some embodiments, each of the vehicles $i \in V$ is assigned to one or multiple subsets of vehicles, i.e., $V_j$ for each traffic intersection that is controlled by an ITC $j \in J$ in the transportation network. For example, this assignment can be computed based on the following set of rules (a) Each HDV is assigned to their next traffic intersection's ITC for prediction, if it is within a predetermined distance. For example, an HDV 1321 can be assigned to an ITC 1313 to be included for prediction in the microscopic traffic model that is used to compute optimal control commands for one or multiple CAVs and TLCs in the transportation network.

(b) Each CAV is assigned to their next traffic intersection's ITC for control, if it is within a predetermined distance. For example, a CAV 1322 can be assigned to an ITC 1312 to be included for control in the microscopic traffic model, and the CAV 1322 is one of the CAVs for which the ITC 1312 computes optimal control commands in the transportation network.

(c) Each CAV is assigned to their previous traffic intersection's ITC for prediction, i.e., it will be treated as an HDV in the MIP formulation 1266 of that ITC, if it is within a predetermined distance. For example, a CAV 1323 can be assigned to an ITC 1311 to be included for prediction in the microscopic traffic model that is used to compute optimal control commands for one or multiple CAVs and TLCs in the transportation network.

In some embodiments of the disclosure, a CAV 1331 and/or an HDV 1332 that is currently not within a predetermined distance from any of the traffic intersections in the transportation network is currently not assigned to any of the ITCs in the hierarchical traffic control system, and it is therefore not included in the MIP formulation 1266 of any of the ITCs. However, the CAV 1331 and/or HDV 1332 can be assigned to an ITC at a future time step, when it is within a predetermined distance from any of the traffic intersections in the transportation network.

Some embodiments are based on the realization that the latter set of rules for assignment of vehicles to ITCs can ensure that the velocity commands and lane change commands for each CAV are computed by at most one ITC in the hierarchical traffic control system. And if a CAV is not assigned to any ITC, given the predetermined threshold distance, then control is returned to the on-board control architecture of the CAV, according to some embodiments of the disclosure. In some embodiments of the disclosure, considering the region immediately after a traffic intersection, both HDVs and CAVs are treated equally in the MIP formulation 1266 of an ITC and their behavior is predicted to prevent possible collisions with any vehicles further upstream. In some embodiments of the disclosure, each ITC provides control commands to CAVs only prior to the traffic intersection and while the vehicle is physically within the traffic intersection. Control is handed back to the vehicle or it is handed to the ITC corresponding to the next traffic intersection after the CAVs exit the intersection.

Figure 14A:
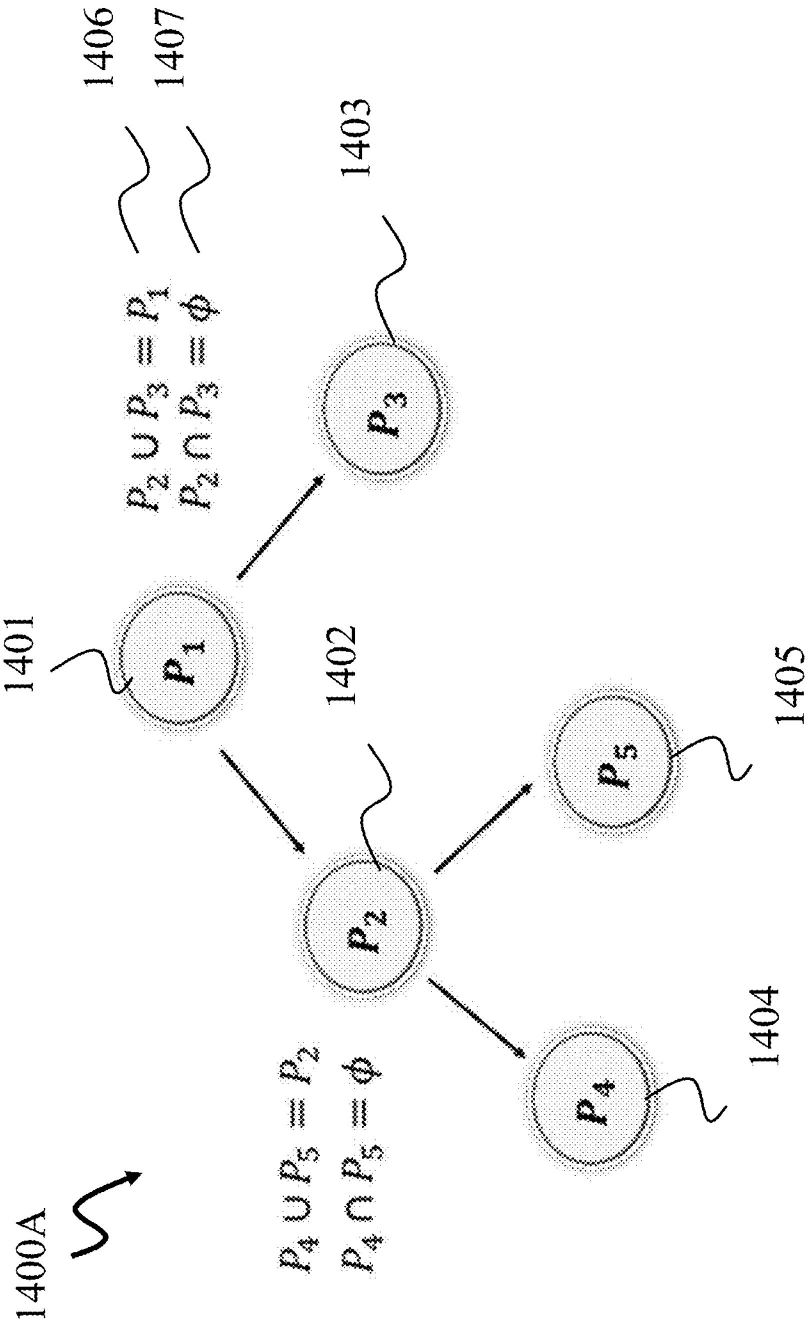
FIG. 14A illustrates a schematic of an example of an integer optimization variable search tree that represents a nested tree of search regions for the integer-feasible optimal solution for hierarchical traffic control, according to some embodiments of the present disclosure.

FIG. 14A illustrates a schematic of an example of an integer optimization variable search tree that represents a nested tree of search regions for the integer-feasible optimal solution for hierarchical traffic control, according to some embodiments of the present disclosure. FIG. 14A illustrates a schematic of an example of a binary decision variable search tree 1400A that represents a nested tree of search regions for the integer-feasible solution of the MIP problem 1266 in the hierarchical traffic control system 600A. FIG. 14A shows a schematic representation of a branch-and-bound method, which can be used to implement the hierarchical traffic control system in some embodiments, by showing the binary search tree 1400A at a particular iteration of the mixed-integer optimization algorithm. The main idea of a branch-and-bound (B&B) method is to sequentially create partitions of the original MIP problem 1266 and then attempt to solve those partitions, where each partition corresponds to a particular region of the discrete optimization variable search space. In some embodiments of the disclosure, a branch-and-bound method selects a partition or node and selects a discrete optimization variable to branch this partition into smaller partitions or search regions, resulting in a nested tree of partitions or search regions.

For example, the partition $P_1$ 1401 represents a discrete search region that can be split or branched into two smaller partitions or regions $P_2$ 1402 and $P_3$ 1403, i.e., a first and a second region that are nested in a common region. The first and the second region are disjoint, i.e., the intersection of these regions is empty $P_2$ n $P_3=\phi$ 1407, but they form the original partition or region $P_1$ together, i.e., the union $P_2$ U $P_3=P_1$ 1406 holds after branching. The branch-and-bound method then solves an integer-relaxed optimization problem for both the first and the second partition or region of the search space, resulting in two solutions (local optimal solutions) that can be compared against each other as well as against the currently known upper bound value to the optimal objective value. The first and/or the second partition or region can be pruned if their performance metric is less optimal than the currently known upper bound to the optimal objective value of the MIP problem. The upper bound value can be updated if the first region, the second region or both regions result in a discrete feasible solution to the MIP problem. The branch-and-bound method then continues by selecting a remaining region in the current nested tree of regions for further partitioning.

While solving each partition may still be challenging, it is fairly efficient to obtain local lower bounds on the optimal objective value, by solving local relaxations of the mixed-integer program (MIP) or by using duality. If the MIP solver happens to obtain an integer-feasible solution while solving a local relaxation, the MIP solver can then use it to obtain a global upper bound for the mixed-integer solution of the original MIP problem in the hierarchical traffic control system. This may help to avoid solving or branching certain partitions that were already created, i.e., these partitions or nodes can be pruned. This general algorithmic idea of partitioning can be represented as the binary search tree 1400A, including the root node, e.g., $P_1$ 1401 at the top of the tree, and the leaf nodes, e.g., $P_4$ 1404 and $P_5$ 1405 at the bottom of the tree. In addition, the nodes $P_2$ 1402 and $P_3$ 1403 are typically referred to as the direct children of node $P_1$ 1401, while node $P_1$ 1401 is referred to as the parent of nodes $P_2$ 1402 and $P_3$ 1403. Similarly, nodes $P_4$ 1404 and $P_s$ 1405 are children of their parent node $P_2$ 1402. In some embodiments of the disclosure, the MILP problem can be a mixed-integer linear programming (MILP) or mixed-integer quadratic programming (MIQP) problem.

Figure 14B:
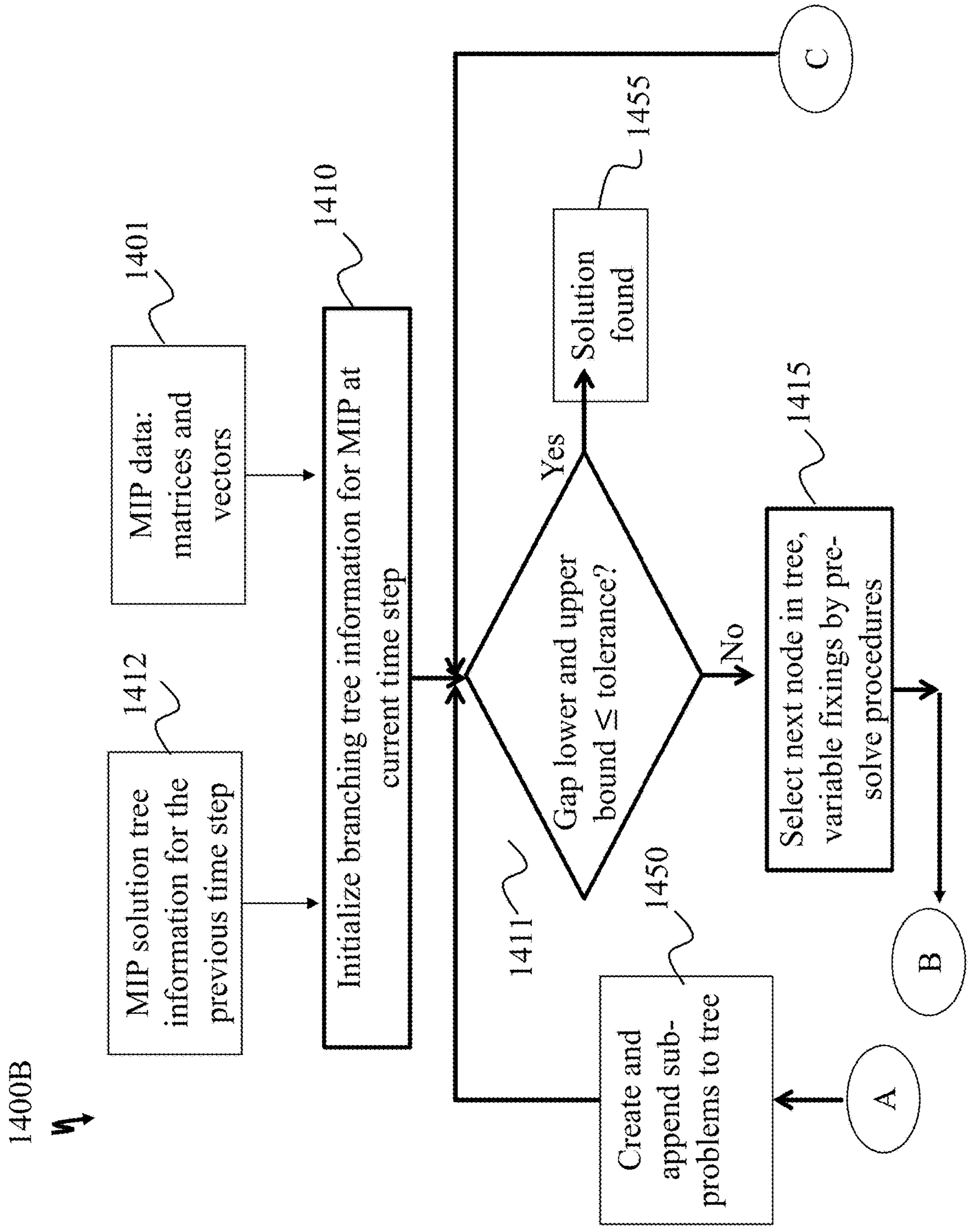
FIG. 14B illustrates a block diagram of a branch-and-bound mixed-integer optimization algorithm to search for the integer-feasible optimal decision making solution, based on a nested tree of search regions and corresponding lower/upper bound values, according to some embodiments of the present disclosure.
Figure 14C:
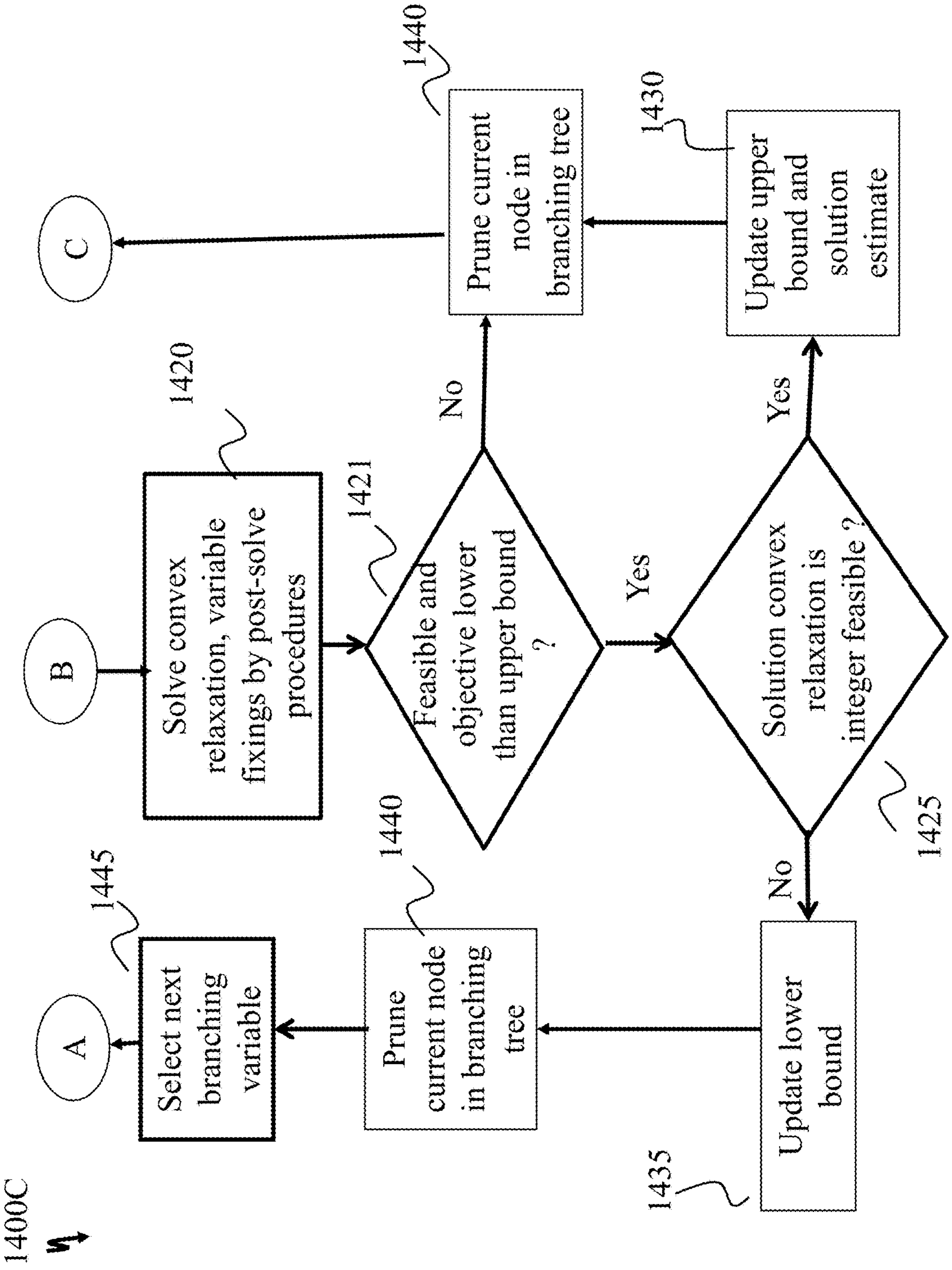
FIG. 14C illustrates a block diagram of a branch-and-bound mixed-integer optimization algorithm to search for the integer-feasible optimal decision making solution, based on a nested tree of search regions and corresponding lower/upper bound values, according to some embodiments of the present disclosure.

FIGS. 14B and 14C collectively illustrates a block diagram, 1400B and 1400C (respectively), of a branch-and-bound mixed-integer optimization algorithm to search for the integer-feasible optimal solution based on a nested tree of search regions and corresponding lower/upper bound values, according to some embodiments. The block diagram of a branch-and-bound mixed-integer optimization algorithm illustrated in FIGS. 14B and 14C may be used to implement the hierarchical traffic control system in some embodiments. The branch-and-bound method initializes the branching search tree information for the mixed-integer program (MIP) at the current time step 1410 of the hierarchical traffic control system, based on the MIP data 1401 that consists of matrices and vectors. The initialization can additionally use the branching search tree information and MIP solution information from the previous time step 1412 in order to generate a warm started initialization for the current time step 1410. The main goal of the optimization algorithm is to construct lower and upper bounds on the objective value of the mixed-integer solution. At step 1411, if the gap between the lower and upper bound value is smaller than a particular tolerance value, then the mixed-integer optimal solution 1455 is found.

As long as the gap between the lower and upper bound value is larger than a particular tolerance value at step 1411, and a maximum execution time is not yet reached by the optimization algorithm, then the branch-and-bound method continues to search iteratively for the mixed-integer optimal solution 1455. Each iteration of the branch-and-bound method starts by selecting the next node in the tree, corresponding to the next region or partition of the integer variable search space, with possible variable fixings based on pre-solve branching techniques 1415. After the node selection, the corresponding integer-relaxed problem is solved, with possible variable fixings based on post-solve branching techniques 1420.

If the integer-relaxed problem has a feasible solution, then the resulting relaxed solution provides a lower bound on the objective value for that particular region or partition of the integer variable search space. At step 1421, if the objective is determined to be larger than the currently known upper bound for the objective value of the optimal mixed-integer solution, then the selected node is pruned or removed from the branching tree 1440. However, at step 1421, if the objective is determined to be lower than the currently known upper bound, and the relaxed solution is integer feasible 1425, then the currently known upper bound and corresponding mixed-integer solution estimate is updated at step 1430.

If the integer-relaxed problem has a feasible solution and the objective is lower than the currently known upper bound 1421, but the relaxed solution is not yet integer feasible, then the global lower bound for the objective can be updated 1435 to be the minimum of the objective values for the remaining leaf nodes in the branching tree and the selected node is pruned from the tree 1440. In addition, starting from the current node, a discrete variable with a fractional value is selected for branching according to a particular branching strategy 1445, in order to create and append the resulting subproblems, corresponding to regions or partitions of the discrete search space, as children of that node in the branching tree 1450.

An important step in the branch-and-bound method is how to create the partitions, i.e., which node to select 1415 and which discrete variable to select for branching 1445. Some embodiments are based on branching one of the binary optimization variables with fractional values in the integer-relaxed solution. For example, if a particular binary optimization variable $d \in \{0,1\}$ has a fractional value as part of the integer-relaxed optimal solution, then some embodiments create two partitions of the mixed-integer program by adding, respectively, the equality constraint $d=0$ to one subproblem and the equality constraint $d=1$ to the other subproblem. Some embodiments are based on a reliability branching strategy for variable selection 1445, which aims to predict the future branching behavior based on information from previous branching decisions.

Some embodiments are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments are based on a branch-and-bound method that uses a best-first strategy that selects the node with the currently lowest local lower bound. Some embodiments employ a combination of the depth-first and best-first node selection approach, in which the depth-first node selection strategy is used until an integer-feasible solution is found, followed by using the best-first node selection strategy in the subsequent iterations of the branch-and-bound based optimization algorithm. The latter implementation is motivated by aiming to find an integer-feasible solution early at the start of the branch-and-bound procedure (depth-first) to allow for early pruning, followed by a more greedy search for better feasible solutions (best-first).

The branch-and-bound method continues iterating until either one or multiple of the following conditions have been satisfied:

The maximum execution time for the processor is reached.

All the nodes in the branching search tree have been pruned, such that no new node can be selected for solving convex relaxations or branching.

The optimality gap between the global lower and upper bound value for the objective of the mixed-integer solution is smaller than the tolerance.

Some embodiments are based on the realization that the optimization problems for the CTC controller and/or for the ITC controllers can be solved exactly or inexactly. Exact solutions are feasible and locally or globally optimal, while inexact solutions can be approximately feasible and/or suboptimal. Examples of exact optimization algorithms are interior point methods, active-set methods, gradient methods, operator splitting methods, sequential quadratic programming, sequential convex programming, branch-and-bound, branch-and-cut and branch-and-price methods. Examples of inexact optimization algorithms are heuristic rules, early termination of exact optimization algorithms, rounding methods, machine learning-based approximations of optimal solutions, approximate dynamic programming, etc.

In some embodiments, the CTC and/or the ITC control policies can be approximated by a deep neural network architecture, for example, using reinforcement learning to directly maximize a reward function for reducing congestion, travel time, emissions and energy consumption in the transportation network. In other embodiments, the CTC and/or the ITC control policies can be implemented using a deep neural network architecture, based on imitation learning that aims to approximate expert solutions of the corresponding optimization problems using exact optimization algorithms.

Figure 15:
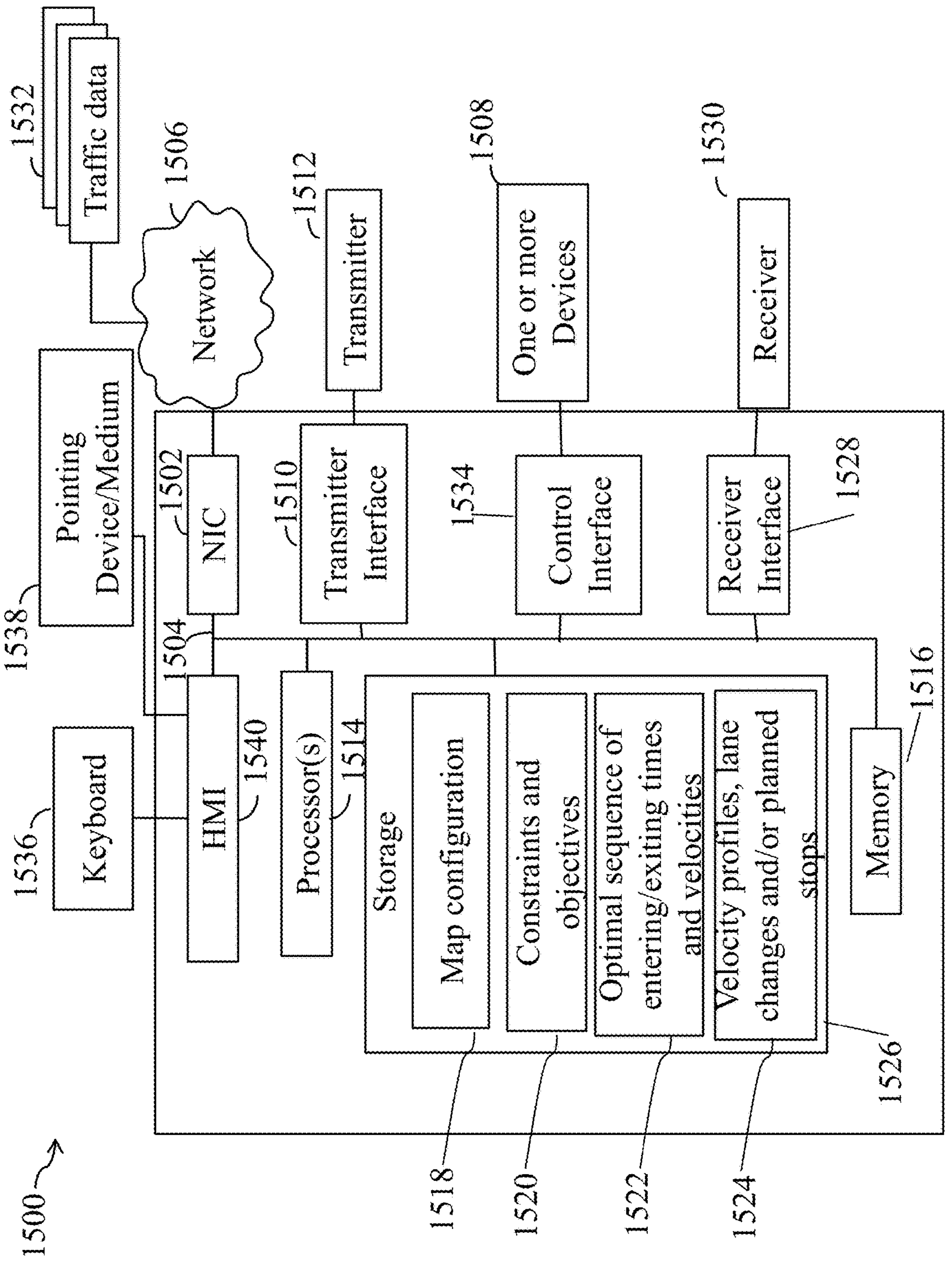
FIG. 15 shows a block diagram of a hierarchical traffic control system for computing a motion plan for one or multiple controlled vehicles in a transportation network of one or multiple interconnected conflict zones, according to some embodiments of the present disclosure.

FIG. 15 shows a block diagram of a hierarchical traffic control system 1500 for computing a motion plan for one or multiple controlled vehicles and one or multiple traffic light controllers in a transportation network of one or multiple interconnected traffic intersections, according to some embodiments of the present disclosure. The hierarchical traffic control system 1500 is executed either in the cloud or in one or multiple mobile edge computers (MECs). The system may additionally require one or multiple edge devices (e.g., RSUs for infrastructure-based sensing) comprised of a set of sensors or be operatively connected to the set of sensors to collect traffic information near one or multiple interconnected conflict zones in the transportation network. In some embodiments of the disclosure, the hierarchical traffic control system is designed to transmit an optimal sequence of entering and exiting times and average velocities 1522 and/or a velocity profile, one or multiple lane change commands and a sequence of planned stops 1524 to each of the connected and automated vehicles (CAVs) along its future planned route in the transportation network.

The hierarchical traffic control system 1500 comprises a number of interfaces connecting the decision making system 1500 with other systems and devices. For example, the decision making system 1500 comprises a network interface controller (NIC) 1502 that is adapted to connect the decision making system 1500 through a bus 1504 to a network 1506 connecting the decision making system 1500 with one or more devices 1508. Examples of such devices include, but are not limited to, vehicles, traffic lights, traffic sensors, road-side units (RSUs), mobile edge computers (MECs), and passengers' mobile devices. Further, the decision making system 1500 includes a transmitter interface 1510, using a transmitter 1512 and/or one or multiple of the devices 1508, configured to transmit an optimal sequence of entering and exiting times and average velocities 1522 and/or a velocity profile, one or multiple lane change commands and a sequence of planned stops 1524, determined by one or multiple processors 1514, to each of the connected and automated vehicles (CAVs) along its future planned route in the transportation network. In each of the CAVs, the commands received from the hierarchical traffic control system can be used by a multi-layer guidance and control architecture to control the motion of the vehicle in order to improve overall safety, time and energy efficiency of the traffic flow in the transportation network.

In some embodiments of the disclosure, the decision making system 1500 includes a transmitter interface 1510, using a transmitter 1512 and/or one or multiple of the devices 1508, which is additionally configured to transmit an optimal sequence of traffic light change commands, determined by one or multiple processors 1514, to each of the traffic light controllers (TLCs) over a prediction time window in the transportation network of interconnected traffic intersections.

Through the network 1506, the hierarchical traffic control system 1500 receives real-time traffic data 1532 using a receiver interface 1528 connected to a receiver 1530. The decision making system 1500 can receive traffic information for one or multiple of the interconnected conflict zones and road segments in the transportation network. The traffic data 1532 can include information of vehicle states (e.g., acceleration, location, heading, velocity) and of planned and/or predicted future routes (e.g., sequence of future road segments, track lanes, desired destinations, waiting times) for each of the vehicles in the transportation network. Additionally, or alternatively, the decision making system 1500 can include a control interface 1534 configured to transmit commands to the one or multiple devices 1508 to change their respective state, such as acceleration, velocity, and the like. The control interface 1534 may use the transmitter 1512 to transmit the commands and/or any other communication means.

In some embodiments of the disclosure, a human machine interface (HMI) 1540 connects the decision making system 1500 to a keyboard 1536 and pointing device 1538, wherein the pointing device 1538 can include a mouse, trackball, touchpad, joy stick, pointing stick, stylus, or touchscreen, among others. The decision making system 1500 can also be linked through the bus 1504 to a display interface adapted to connect the decision making system 1500 to a display device, such as a computer monitor, camera, television, projector, or mobile device, among others. The decision making system 1500 can also be connected to an application interface adapted to connect the decision making system 1500 to one or more equipment for performing various power distribution tasks.

The decision making system 1500 can include one or multiple processors 1514 configured to execute stored instructions, as well as a memory (at least one memory) 1516 that stores instructions that are executable by the processor (at least one processor) 1514. The processor(s) 1514 can be a single core processor, a multi-core processor, a computing cluster, a network of multiple connected processors, or any number of other configurations. The memory 1516 can include random access memory (RAM), read only memory (ROM), flash memory, or any other suitable memory systems. The processor(s) 1514 can be connected through the bus 1504 to one or more input and output devices. These instructions implement a method for hierarchical traffic control, using one centralized traffic controller (CTC) and one or multiple intersection traffic controllers (ITCs), to control mixed traffic of CAVs and HDVs in a transportation network of multiple interconnected traffic intersections. In some embodiments of the disclosure, the decision making system 1500 includes a map configuration 1518, which can be found in storage 1526. For example, the map configuration 1518 can include location data (e.g., GPS data) for conflict-free road segments, traffic intersections, stopping zones, conflict zones and lanes within each of the road segments of the transportation network.

The decision making system 1500 includes constraints and objectives 1520 of one or multiple MIP problems 1266 and constraints and objectives 1520 of the convex optimization problem 1158 that are solved at each time step of the hierarchical traffic control system. For example, the constraints and objectives 1520 can be configured to enforce physical limitations, vehicle speed limits and/or safety constraints, and to minimize a weighted combination of travel times, waiting times and/or energy consumption for each of the vehicles in the transportation network.

Figure 16A:
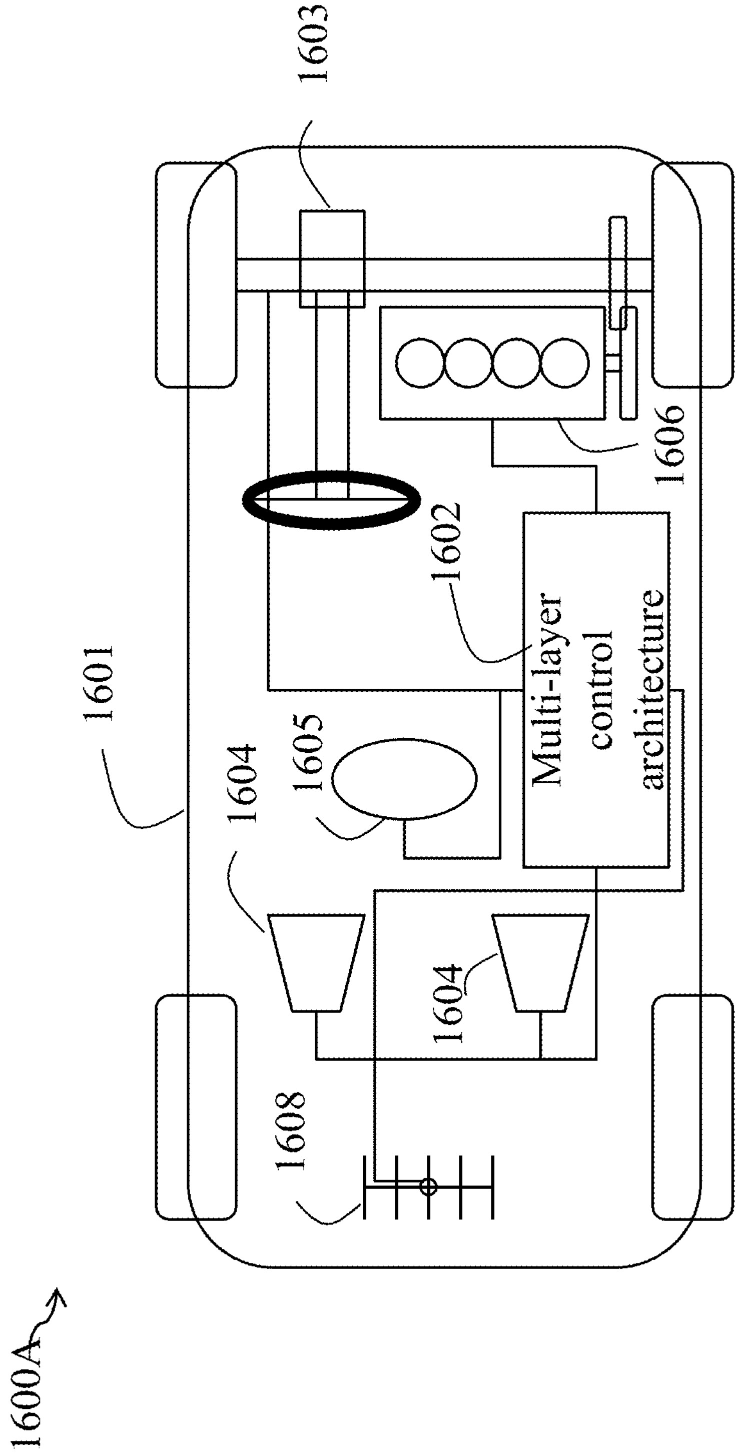
FIG. 16A illustrates a schematic of a vehicle including a multi-layer guidance and control architecture, according to some embodiments of the present disclosure.

FIG. 16A illustrates a schematic, 1600A, of a vehicle 1601 including a multi-layer guidance and control architecture 1602 that controls the motion of the vehicle based on a future route plan and a corresponding motion plan that can be computed by a hierarchical traffic control system for the transportation network, according to some embodiments of the disclosure. As used herein, the vehicle 1601 can be any type of wheeled vehicle, such as a passenger car, truck, shuttle, bus, or rover. Also, the vehicle 1601 can be an autonomous or semi-autonomous vehicle. For example, some embodiments control the motion of the vehicle 1601, based on a motion plan that can be computed by a hierarchical traffic control system. Examples of the motion include lateral motion of the vehicle controlled by a steering system 1603 of the vehicle 1601. In some embodiments of the disclosure, the steering system 1603 is controlled by the multi-layer guidance and control architecture 1602. Additionally or alternatively, the steering system 1603 can be controlled by a (human) driver of the vehicle 1601.

The vehicle can also include an engine 1606, which can be controlled directly by the multi-layer guidance and control architecture 1602 or by other components of the vehicle 1601. The vehicle can also include one or more on-board sensors 1604 to sense the surrounding environment. Examples of the sensors 1604 include distance range finders, radars, lidars, and cameras. The vehicle 1601 can also include one or more on-board sensors 1605 to sense its current motion quantities and internal status. Examples of the sensors 1605 include global positioning system (GPS), accelerometers, inertial measurement units, gyroscopes, shaft rotational sensors, torque sensors, deflection sensors, pressure sensors, and flow sensors. The on-board sensors provide information to the multi-layer guidance and control architecture 1602. The vehicle can be equipped with a transceiver 1608 enabling communication capabilities for the multi-layer guidance and control architecture 1602 through wired or wireless communication channels, e.g., for the vehicle 1601 to communicate with the hierarchical traffic control system, according to some embodiments of the disclosure.

Figure 16B:
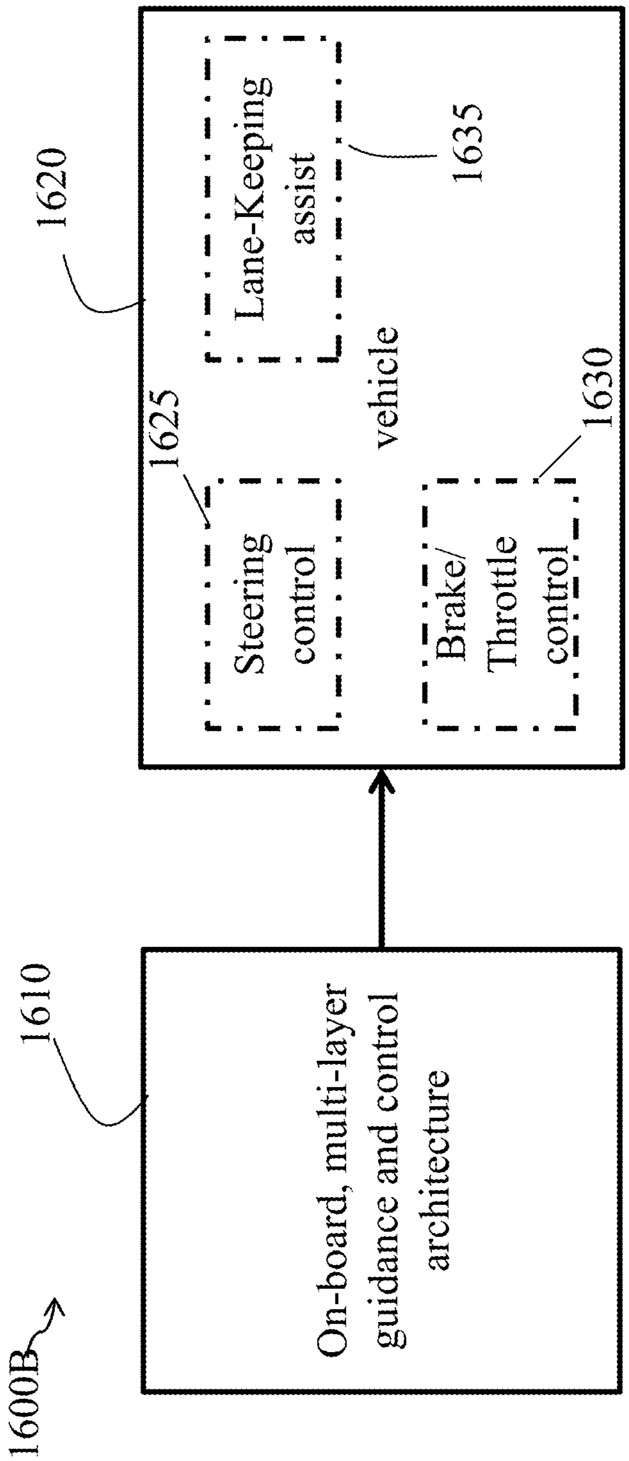
FIG. 16B illustrates a schematic of interaction between the multi-layer guidance and control architecture and other controllers of the vehicle, according to some embodiments of the present disclosure.

FIG. 16B illustrates a schematic, 1600B, of interaction between the multi-layer guidance and control architecture 1610 (i.e., layers of algorithms and technologies for decision making, motion planning, vehicle control and/or estimation) and other controllers 1620 of the vehicle 1601, according to some embodiments of the present disclosure. For example, in some embodiments, the controllers 1620 of the vehicle 1601 are steering 1625 and brake/throttle controllers 1630 that control rotation and acceleration of the vehicle 1601, respectively. In such a case, the multi-layer guidance and control architecture 1610 outputs control inputs to the controllers 1625 and 1630 to control the state of the vehicle 1601. The controllers 1620 can also include high-level controllers, e.g., a lane-keeping assist controller 1635, that further process the control inputs of the multi-layer guidance and control architecture 1602. In both cases, the controllers 1620 use the outputs of the multi-layer guidance and control architecture 1610 to control at least one actuator of the vehicle 1601, such as the steering wheel and/or the brakes of the vehicle 1601, in order to control the motion of the vehicle 1601. In some embodiments of the disclosure, the vehicle 1601 is one of multiple CAVs in a transportation network, and the multi-layer guidance and control architecture 1610 determines an input to the vehicle 1601 based on a motion plan that is computed by a hierarchical traffic control system, where the input to the vehicle 1601 can include one or a combination of an acceleration of the vehicle 1601, an engine torque of the vehicle 1601, brake torques, and a steering angle.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A traffic control system for jointly controlling one or multiple connected and automated vehicles (CAVs) and one or multiple human-driven vehicles (HDVs) moving across multiple intersections of roads subject to integer constraints for crossing each of the multiple intersections, comprising: at least one processor; and a memory having instructions stored thereon that, when executed by the at least one processor, cause the traffic control system to:

collect digital representation of states of each of the CAVs, each of the HDVs, and each of traffic signs regulating traffic on the roads;

solve an optimization problem jointly optimizing traffic flows based on a macroscopic traffic flow model in a centralized traffic controller (CTC) for the multiple intersections using convex optimization subject to convex relaxation of the integer constraints for crossing each of the multiple intersections;

solve, individually for each of the multiple intersections, a multi-variable mixed-integer programming (MIP) problem in each of multiple intersection traffic controllers (ITCs) optimizing a cost function, and minimizing tracking errors in traffic flow values of a microscopic traffic flow model with respect to relaxed traffic flow values from the CTC, subject to the integer constraints to produce values of control commands changing states of each of the CAVs associated with an intersection of the multiple intersections and values of control commands changing states of each of the traffic signs associated with the intersection, wherein the cost function is optimized subject to a motion model of a CAV associated with the intersection described by a differential equation relating a control command to the CAV with a change of a state of the CAV, and subject to a motion model of an HDV described by a switch function relating a dynamic traffic rule for the HDV with a state of the HDV and a state of a corresponding traffic sign; and transmit the optimized values of the control commands to the corresponding CAVs and corresponding traffic signs; and control the CAVs and traffic signs based on the optimized values of the control commands.

2. The traffic control system of claim 1, wherein the switch function for each of the HDVs includes one or multiple motion models for one or multiple switching conditions, the one or multiple motion models including at least one of:

a first motion model for a stopping maneuver in a stopping zone at each of the multiple intersections of roads in a transportation network if a corresponding traffic sign is red for a crossing direction and the HDV is within a first safety distance from the stopping zone;

a second motion model for a safe leading vehicle following behavior if a leading vehicle is within a second safety distance in front of the HDV and the leading vehicle is in the same lane of the same road segment as the HDV; and a third motion model for traveling at a desired average speed if there is no leading vehicle within the second safety distance in front of the HDV and the leading vehicle is not in the same lane as the HDV, or the HDV is not within the first safety distance from the stopping zone and the corresponding traffic sign is not red.

3. The traffic control system of claim 1, wherein the multi-variable MIP problem in each of the multiple ITCs includes a mapping between multiple collision-free states of the traffic signs and values of the traffic signs for each crossing direction of the multiple intersections in a transportation network that is controlled by a hierarchical traffic control system.

4. The traffic control system of claim 3, wherein the multi-variable MIP problem in each of the multiple ITCs includes multiple mixed-integer equality and inequality constraints to enforce traffic rules for the CAVs and the HDVs driving in a neighborhood of each of the multiple intersections in the transportation network that is controlled by the hierarchical traffic control system, and the traffic rules include constraints for crossing through the intersection of the multiple intersections based on a collision-free state of a corresponding traffic sign, capacity limit constraints for each of the multiple intersections or each of road segments in the transportation network, collision avoidance constraints between pairs of vehicles, lane change constraints for overtaking of vehicles, speed limit constraints, and traffic sign timing constraints.

5. The traffic control system of claim 1, wherein the cost function of the multi-variable MIP problem in each of the multiple ITCs includes a maximization of traveled distance for each of the CAVs and HDVs driving in a neighborhood of one or more intersections of the multiple intersections in a transportation network, a minimization of an error between a current lane value and a preferred lane value for each of the CAVs and HDVs, a minimization of a number of lane changes for each of the CAVs and HDVs, a minimization of slack variables for one or multiple constraint violations, and a minimization of a least squares tracking error between predicted traffic flow values and reference CTC traffic flow values in a cost function adaptation method of a hierarchical traffic control system.

6. The traffic control system of claim 1, wherein the macroscopic traffic flow model in the CTC is described as a directed graph, each node of the directed graph corresponds to a road segment of multiple road segments and each edge of the directed graph corresponds to a connection between two road segments of the multiple road segments, and the connection between two road segments indicates a direction to cross through the intersection of the multiple intersections in a transportation network that is controlled by a hierarchical traffic control system.

7. The traffic control system of claim 6, wherein the macroscopic traffic flow model in the CTC is a set of discrete-time differential equations that include one or multiple differential state variables and one or multiple control input variables, and each of the one or multiple differential state variables and one or multiple control input variables is included in optimization variables of a convex optimization problem that is solved in the CTC.

8. The traffic control system of claim 7, wherein the one or multiple differential state variables include vehicle density variables that define a number of vehicles for each pair of a road segment of the multiple road segments and a traffic flow maneuver at each time step in a prediction time window of the CTC, and the one or multiple control input variables include in-flow and out-flow variables that define a number of vehicles entering and exiting, respectively, for each pair of the road segment and the traffic flow maneuver at each time step in the prediction time window of the CTC.

9. The traffic control system of claim 8, wherein a solution of the convex optimization problem is used by the CTC to compute a set of optimal traffic flow probability values subject to the convex relaxation of mixed-integer constraints for vehicles crossing each of the multiple intersections, switching behavior of the traffic signs, or collision-free states for the traffic signs of each of the multiple intersections, and the optimal traffic flow probability values of the CTC are used by a cost function adaptation method in each of the multiple ITCs to minimize a tracking error between predicted traffic flow values and CTC traffic flow values over a prediction time horizon of the ITCs for each crossing direction of the multiple intersections.

10. The traffic control system of claim 1, wherein the CTC solves a convex optimization problem with the cost function that includes at least one of a maximization of a sum of traffic flow variables or a minimization of a sum of traffic congestion variables in a transportation network that is controlled by a hierarchical traffic control system.

11. The traffic control system of claim 1, wherein in the macroscopic traffic flow model, the CTC predicts a number of external vehicles entering a transportation network from each of in-flow directions at each time step in a prediction time window, based on historical data that is collected for a similar transportation network during a time period in the past similar to the prediction time window.

12. The traffic control system of claim 1, wherein the CTC computes at least one of vehicle density or vehicle routing probability values for each pair of a road segment and a traffic flow maneuver in a transportation network for a prediction time window based on historical data that is collected for a similar transportation network during a time period in the past similar to the prediction time window.

13. The traffic control system of claim 1, wherein a sampling time period for a receding horizon implementation of the CTC is equal to or longer than a sampling time period for a receding horizon implementation for each of the ITCs in a hierarchical traffic control system, and a length of a prediction time window of the CTC is equal to or longer than a length of a prediction time window for each of the ITCs in the hierarchical traffic control system.

14. The traffic control system of claim 1, wherein the at least one processor cause the traffic control system to assign, based on one or multiple rules, a set of CAVs from the one or multiple CAVs and a set of HDVs from the one or multiple HDVs to each of the ITCs in a hierarchical traffic control system.

15. The traffic control system of claim 14, wherein an ITC of the multiple ITCs computes, based on the one or multiple rules for the assignment of vehicles to the multiple ITCs, velocity commands and lane change commands for each CAV of the one or multiple CAVs in the hierarchical traffic control system, and authority of controlling the velocity commands and the lane change commands is returned to on-board control architecture of a CAV of the one or multiple CAVs if the CAV is not assigned to any of the multiple ITCs.

16. The traffic control system of claim 14, wherein each CAV of the one or multiple CAVs is assigned to an ITC of the multiple ITCs for control, and the same CAV is assigned to one or multiple other ITCs for prediction based on a switched dynamical model that is similar to a switched dynamical model for the one or multiple HDVs.

17. The traffic control system of claim 1, wherein a convex optimization problem solved in the CTC is a convex linear programming (LP) or a convex quadratic programming (QP) problem, and the convex LP or the convex QP problem is solved using an active-set method, an interior point method, gradient method, operator splitting method, or an alternating direction method of multipliers (ADMM).

18. The traffic control system of claim 1, wherein the CTC is implemented using a reinforcement learning (RL) policy that is trained to compute optimal traffic flow actions given one or multiple state feedback signals from a transportation network, model-based or model-free RL techniques to maximize a reward function for reducing congestion, travel time, emissions or energy consumption for each of one or multiple CAVs and one or multiple HDVs in the transportation network.

19. The traffic control system of claim 1, wherein the multi-variable MIP problem in each of the multiple ITCs is solved using a branch-and-bound (B&B) optimization method that searches for a global optimal solution within a search space to produce an optimal control signal, and the B&B optimization method iteratively partitions the search space into a nested tree of regions to find a solution with a globally optimal objective value in each of the ITCs of the traffic control system.

20. The traffic control system of claim 1, wherein the multi-variable MIP problem in each of the multiple ITCs is solved using heuristic techniques, and the heuristic techniques include rounding schemes, feasibility pumping methods, approximate optimization algorithms, or machine learning techniques to predict an optimal solution of the multi-variable MIP problem.

21. A method for jointly controlling one or multiple connected and automated vehicles (CAVs) and one or multiple human-driven vehicles (HDVs) moving across multiple intersections of roads subject to integer constraints for crossing each of the multiple intersections, the method comprising:

collecting digital representation of states of each of the CAVs, each of the HDVs, and each of traffic signs regulating traffic on the roads;

solving an optimization problem jointly optimizing traffic flows based on a macroscopic traffic flow model in a centralized traffic controller (CTC) for the multiple intersections using convex optimization subject to convex relaxation of the integer constraints for crossing each of the multiple intersections;

solving, individually for each of the multiple intersections, a multi-variable mixed-integer programming (MIP) problem in each of multiple intersection traffic controllers (ITCs) optimizing a cost function, and minimizing tracking errors in traffic flow values of a microscopic traffic flow model with respect to relaxed traffic flow values from the CTC, subject to the integer constraints to produce values of control commands changing states of each of the CAVs associated with an intersection of the multiple intersections and values of control commands changing states of each of the traffic signs associated with the intersection, wherein the cost function is optimized subject to a motion model of a CAV associated with the intersection described by a differential equation relating a control command to the CAV with a change of a state of the CAV, and subject to a motion model of an HDV described by a switch function relating a dynamic traffic rule for the HDV with a state of the HDV and a state of a corresponding traffic sign;

transmitting the optimized values of the control commands to the corresponding CAVs and corresponding traffic signs; and controlling the CAVs and traffic signs based on the optimized values of the control commands.

22. A non-transitory computer-readable storage medium embodied thereon a program executable by a processor for performing a method for jointly controlling one or multiple connected and automated vehicles (CAVs) and one or multiple human-driven vehicles (HDVs) moving across multiple intersections of roads subject to integer constraints for crossing each of the multiple intersections, the method comprising:

collecting digital representation of states of each of the CAVs, each of the HDVs, and each of traffic signs regulating traffic on the roads;

solving an optimization problem jointly optimizing traffic flows based on a macroscopic traffic flow model in a centralized traffic controller (CTC) for the multiple intersections using convex optimization subject to convex relaxation of the integer constraints for crossing each of the multiple intersections;

solving, individually for each of the multiple intersections, a multi-variable mixed-integer programming (MIP) problem in each of multiple intersection traffic controllers (ITCs) optimizing a cost function, and minimizing tracking errors in traffic flow values of a microscopic traffic flow model with respect to relaxed traffic flow values from the CTC, subject to the integer constraints to produce values of control commands changing states of each of the CAVs associated with an intersection of the multiple intersections and values of control commands changing states of each of the traffic signs associated with the intersection, wherein the cost function is optimized subject to a motion model of a CAV associated with the intersection described by a differential equation relating a control command to the CAV with a change of a state of the CAV, and subject to a motion model of an HDV described by a switch function relating a dynamic traffic rule for the HDV with a state of the HDV and a state of a corresponding traffic sign;

transmitting the optimized values of the control commands to the corresponding CAVs and corresponding traffic signs; and controlling the CAVs and traffic signs based on the optimized values of the control commands.

* * * * *